(12) United States Patent
Kano

(10) Patent No.: US 8,284,655 B2
(45) Date of Patent: Oct. 9, 2012

(54) NODE APPARATUS, PROCESSING UNIT, AND CONTROL FRAME PROCESSING METHOD

(75) Inventor: Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 12/794,313

(22) Filed: Jun. 4, 2010

(65) Prior Publication Data

US 2010/0309777 A1  Dec. 9, 2010

(30) Foreign Application Priority Data

Jun. 5, 2009 (JP) ................................ 2009-136563

(51) Int. Cl.
*H04J 3/14* (2006.01)
(52) U.S. Cl. ........................................ 370/218; 370/242
(58) Field of Classification Search .......... 370/216–218, 370/241–245
See application file for complete search history.

(56) References Cited

U.S. PATENT DOCUMENTS

| 7,197,008 | B1 * | 3/2007 | Shabtay et al. | 370/218 |
| 2002/0172150 | A1 * | 11/2002 | Kano | 370/216 |
| 2003/0169684 | A1 * | 9/2003 | Yamanaka et al. | 370/216 |
| 2004/0233842 | A1 * | 11/2004 | Lanzone et al. | 370/216 |
| 2005/0088963 | A1 * | 4/2005 | Phelps et al. | 370/216 |
| 2008/0068988 | A1 | 3/2008 | Tochio | |

FOREIGN PATENT DOCUMENTS

| EP | 1 903 725 A1 | 3/2008 |
| JP | 3-226024 | 10/1991 |
| JP | 2003-134072 | 5/2003 |
| JP | 2003-298474 | 10/2003 |
| JP | 2008-104144 | 5/2008 |

OTHER PUBLICATIONS

"Ethernet Protection Switching"; Series G: Transmission Systems and Media, Digital Systems and Networks; Ethernet over Transport aspects—General aspects; Series Y: Global Information Infra-structure, Internet Protocol Aspects and Next-Generation Networks; Internet protocol aspects—Transport; ITU-T Recommendation G.8031/Y.1342; Jun. 2006; pp. i-iv, 1-42.

"Ethernet linear protection switching", Amendment 1; Series G: Transmis-sion Systems and Media, Digital Systems and Networks; Packet over Transport aspects—Ethernet over Transport aspects; Series Y: Global Information Infrastructure, Internet Protocol Aspects and Next-Generation Networks; Internet protocol aspects—Transport; ITU-T Recommendation G.8031./Y1342; Oct. 2007; pp. i-iii, 1-29.

United Kingdom Search Report issued on Oct. 8, 2010 in corresponding United Kingdom Patent Application 1009376.3

* cited by examiner

*Primary Examiner* — Hong Cho
(74) *Attorney, Agent, or Firm* — Staas & Halsey LLP

(57) ABSTRACT

A method for processing a control frame for controlling path protection switching between redundant paths including a working path and a protection path, which is executed at one of two node apparatuses coupled mutually via the redundant paths, the method comprising: at the time of switching of the redundant paths, stopping monitoring whether the control frame has been received via a previous working path which is the path used as the working path until the switching is completed; determining whether the other of the two node apparatuses has stopped transmitting the control frame via a new working path which is the path used as the working path after the switching is completed; and starting monitoring whether the control frame has been received via the new working path, when it is determined that the second apparatus has stopped transmitting the control frame via the new working path.

14 Claims, 49 Drawing Sheets

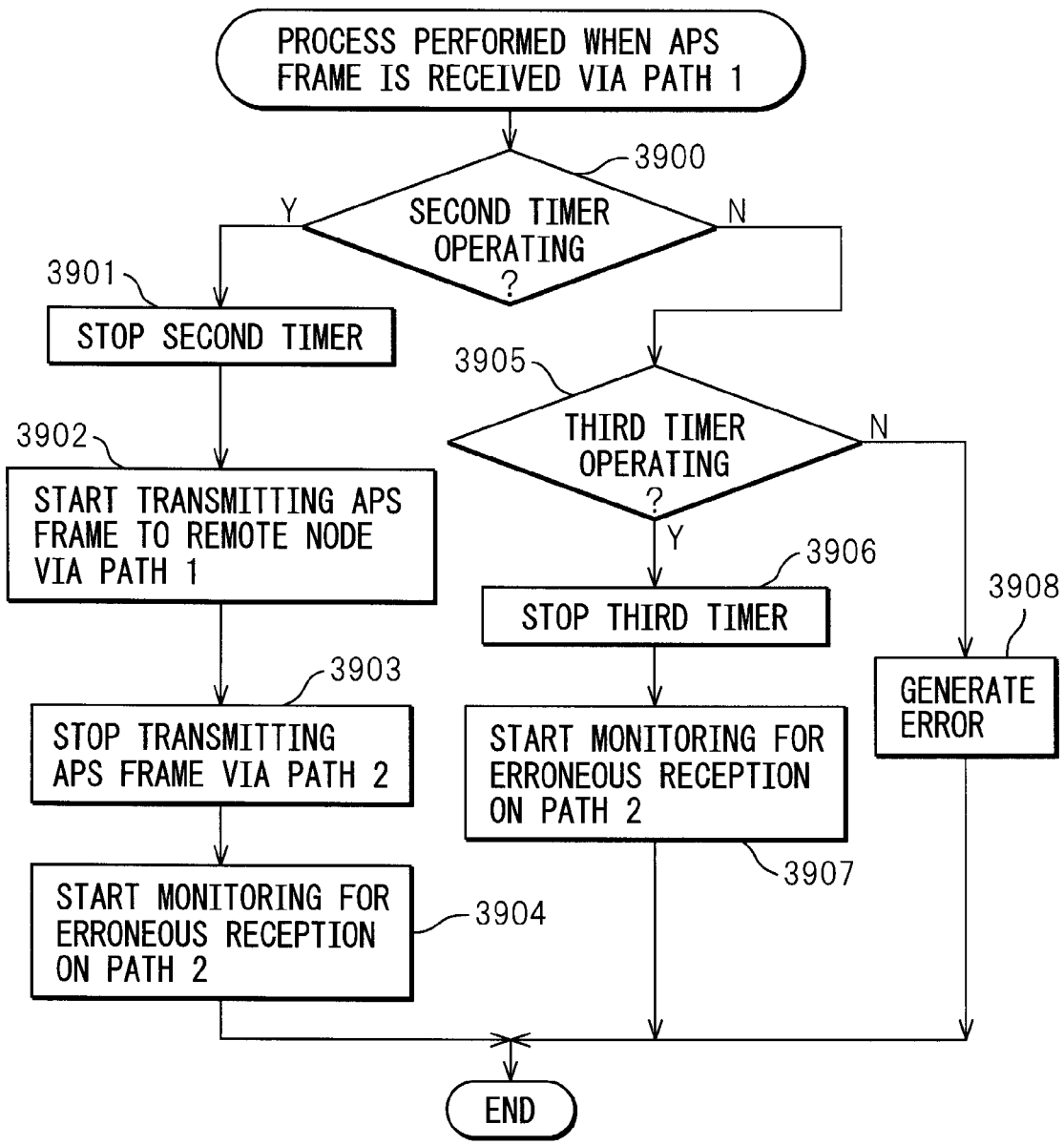
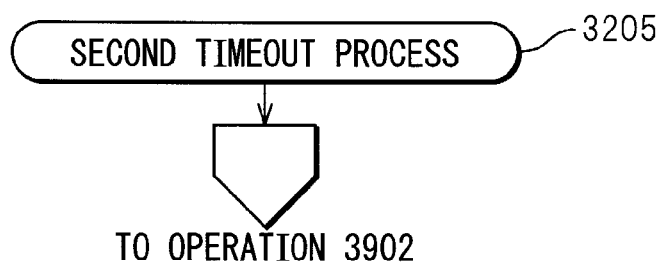

NODE APPARATUS, PROCESSING UNIT, AND CONTROL FRAME PROCESSING METHOD

CROSS-REFERENCE TO RELATED APPLICATIONS

This application is based upon and claims the benefit of priority of the prior Japanese Patent Application No. 2009-136563, filed on Jun. 5, 2009, the entire contents of which are incorporated herein by reference.

FIELD

The embodiments discussed herein are related to the signaling of a control frame for controlling protection switching between redundant paths which include a working path and a protection path.

BACKGROUND

Linear protection switching is known which couples a node apparatus and a remote node apparatus at the other end of the connection via redundant paths which include a working path and a protection path. In one method of linear protection switching, control information for controlling the protection switching is stored in a data frame of a prescribed format which is transferred over a working path or a protection path between node apparatuses. A data frame carrying such protection switching control information will hereinafter be described as the "control frame." An APS (Automatic Protection Switching) frame is an example of the control frame.

One implementation of such linear protection switching employs a method that prescribes that the control frame be transmitted over a fixed protection path predetermined in the initial setup and if the control frame is received via a working path, it is determined that an erroneous path setting is detected. The expression "erroneous path setting" here means that there is a discrepancy in the working/protection path setting between the node apparatuses at both ends coupled via the redundant paths.

Some linear protection switching methods support a non-revertive mode. In the non-revertive mode, once working traffic is switched to the protection path due to a failure of the working path, the traffic continues to transfer over the protection path, even if the working path is thereafter restored from the failure.

One example of the linear protection switching that employs the erroneous path setting detection method and that supports the non-revertive mode is Ethernet (registered trademark) Linear Protection Switching defined in ITU-T Recommendation G.8031. In Ethernet (registered trademark) Linear Protection Switching, control information for controlling the protection switching is transferred by storing it in an Ethernet (registered trademark) OAM (Operations, Administration, and Maintenance) frame called the APS frame.

In the prior art, a line identifying method for identifying each line in a system provided with a plurality of working lines and at least one protection line for transferring frames, each having a layer-structured header, between a terminal station and a relay station or between relay stations, wherein line switching is performed using a linear APS mechanism has been proposed. This method includes: an assigning step for assigning a code indicating an APS mode to each of the working and protection lines; a first creating step for creating a request frame for evaluating the condition of each line; a first transmitting step for transmitting the request frame via each line to a station at the other end of the line; a second creating step for creating a response frame based on the assigned code when responding to the request; a second transmitting step for transmitting the response frame via each line; a determining means that determines that a failure has occurred when the code contained in the received response frame does not match the assigned code.

Alternatively, the above method includes: an assigning step for assigning a trace byte to each of the working and protection lines; a creating step for creating a frame containing the assigned trace byte; a transmitting step for transmitting the frame via each line to a station at the other end of the line; and a determining step for comparing the frame byte contained in the received frame with the trace byte assigned to the corresponding line and for determining that a failure has occurred when the frame bytes do not match each other.

A method of packet communication between nodes in a network has also been proposed. In this method, a working communication path or a protection communication path that pass through two switching nodes is selected, and while transferring first traffic between the two switching nodes by using the selected communication path, the two switching nodes transfer via the protection communication path a switching control packet, containing working path identification information, that indicates whether or not the first traffic is flowing on the working communication path. If the working communication path is operating normally, the switching nodes select the working communication path as the communication path for the first traffic, but if the working communication path is faulty, the protection communication path is selected. A protection node located along the protection communication path, i.e., a node other than the switching nodes, checks the working path identification information contained in the switching control packet and determines whether or not the first traffic is flowing on the working communication path, and if the first traffic is flowing on the working communication path, second traffic, which is different from the first traffic, is deposited into the protection node which then transfers the second traffic to another protection node.

ITU-T Recommendation G.8031 defines the signaling of a control signal for performing automatic protection switching (APS) in the Ethernet (registered trademark) Linear Protection Switching.

Related art is disclosed in Japanese Unexamined Patent Publication No. 2003-298474, Japanese Unexamined Patent Publication No. 2008-104144, ITU-T Recommendation G.8031/Y. 1342 and ITU-T Recommendation G.8031/Y. 1342 Amendment 1.

SUMMARY

According to one mode of the embodiment, a node apparatus is provided, the node apparatus being one of two node apparatuses coupled mutually via redundant paths which include a working path and a protection path. The node apparatus includes: a monitoring unit which monitors whether or not a control frame for controlling path protection switching between the redundant paths has been received via the working path, and which generates an alarm when the control frame has been received via the working path; a monitoring stop unit which, at the time of working/protection switching of the redundant paths, causes the monitoring unit to stop monitoring whether or not the control frame has been received via a previous working path which is the path used as the working path until the switching is completed; a transmission stop determining unit which determines whether the other of the two node apparatuses has stopped transmitting the control frame via a new working path which is the path used as the working path after the switching is completed; and a monitoring start unit which causes the monitoring unit to start monitoring whether or not the control frame has been received via the new working path, when it is determined that the other node apparatus has stopped transmitting the control frame via the new working path.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWING(S)

FIG. 39 is an explanatory diagram illustrating a first example of the process performed when the APS frame is received via a path 1;

FIG. 40 is an explanatory diagram illustrating a second example of the second timeout handling process;

DESCRIPTION OF EMBODIMENT(S)

As previously described, in the prior art linear protection switching provided with a mechanism for erroneous path setting detection, the control frame is transferred only over a fixed protection path predetermined in the initial setup. Accordingly, in the non-revertive mode, if the traffic continues to be transferred using the protection path, the traffic and the control frame are transferred over the same path, which results in when a large amount of traffic occurs, the traffic may interfere with the transmission/reception of the control frame.

This problem can be avoided by switching the control frame transmission path to the other path, but this in turn results in an alarm being generated because of the erroneous setting detection mechanism. According to the embodiment disclosed herein, the switching of the control frame transmission path can be accomplished without causing the erroneous setting detection mechanism to generate an alarm.

Figure 1:
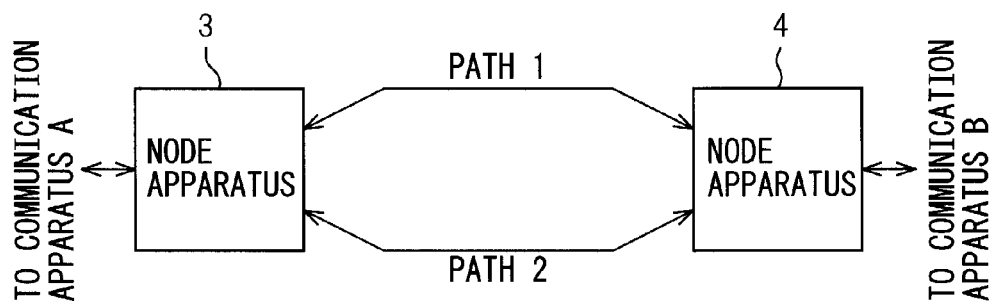
FIG. 1 is a diagram schematically illustrating the configuration of a communication network according to the embodiment.

The embodiment of the present invention will be described below with reference to the accompanying drawings. FIG. 1 is a diagram schematically illustrating the configuration of a communication network according to the embodiment. The communication network 10 includes node apparatuses 3 and 4 and a plurality of transmission lines coupling the node apparatuses.

The node apparatuses 3 and 4 are equipped with a linear protection switching mechanism that transfers traffic over redundant paths which include a working path and a protection path. In the illustrated example, the redundant paths for transferring traffic between communication apparatuses A and B via the node apparatuses 3 and 4 are set up on the transmission lines coupling the node apparatuses 3 and 4. The redundant paths include a path 1 and a path 2, in which when either one of the paths 1 and 2 is set as the working path for transferring traffic, the other path is the protection path that does not transfer traffic.

The linear protection switching mechanism incorporated in each of the node apparatuses 3 and 4 supports the non-revertive mode. When the node apparatuses 3 and 4 are operating in the non-revertive mode, if a failure occurs on the path 1 or the path 2, whichever is set as the working path in the initial setup, the traffic is switched to the other path that is set as the protection path in the initial setup, and even if recovery is made from the failure, the traffic continues to be transferred over the protection path, unless a new protection switching operation occurs thereafter.

Figure 2:
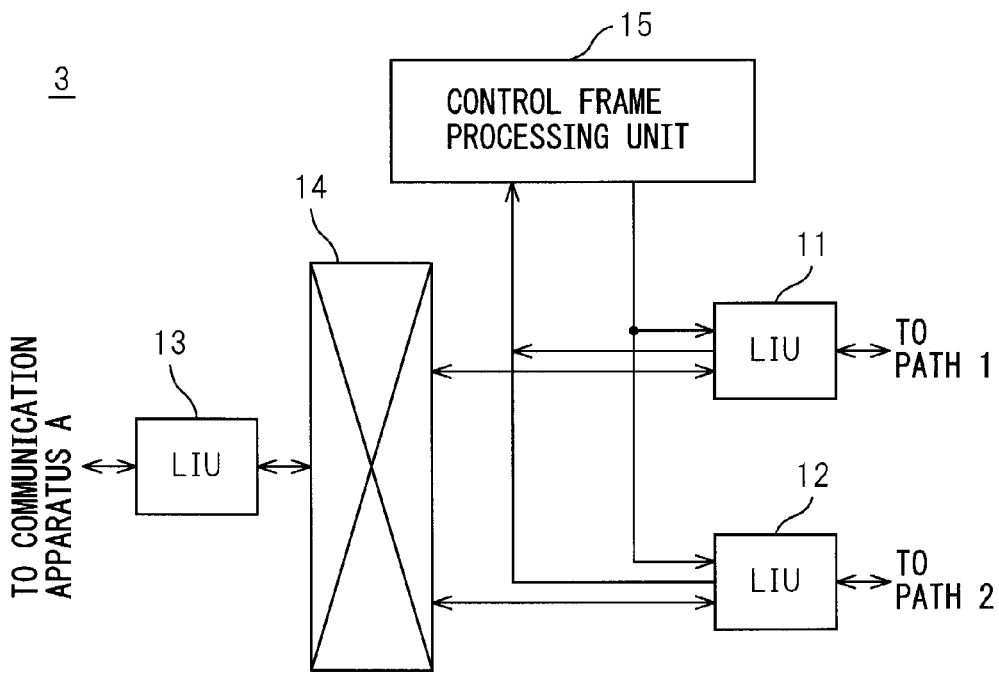
FIG. 2 is a diagram schematically illustrating a first configuration example of a node apparatus according to the embodiment.

FIG. 2 is a diagram schematically illustrating a first configuration example of the node apparatus according to the embodiment. Reference numerals 11, 12, and 13 are line interface units (LIU), 14 is a switch, and 15 is a control frame processing unit. The LIUs 11 to 13, the switch 14, and the control frame processing unit 15 together constitute the node apparatus 3. The node apparatus 4 may have the same configuration as the node apparatus 3.

The LIUs 11 and 12 are line interface units coupled to the transmission lines along which the paths 1 and 2 are set up, and used to transmit and receive data frames of prescribed format over the respective paths 1 and 2. The LIU 13 is a line interface unit coupled to a transmission line leading to the communication apparatus A, and used to transmit and receive data frames over the path set up along the transmission line.

The switch 14 receives frames from a plurality of LIUs, including the LIUs 11 to 13, and outputs them to the designated output LIUs. The control frame processing unit 15 performs processing associated with the control frame for controlling the protection switching on the redundant paths including the paths 1 and 2.

The configuration depicted in FIG. 2 is one example of the configuration of the node apparatus 3, and the embodiment is not necessarily limited to this particular configuration. For example, the component elements provided in each example of the control frame processing unit 15 described hereinafter may be distributed across the plurality of units provided in the node apparatus 3.

The control frame processing unit 15 may include a processor and a storage device for storing an operating program for the processor. All or some of the functions of the component elements provided in each example of the control frame processing unit 15 described hereinafter may be implemented by the processor executing the operating program. Further, all or some of the component elements provided in each example of the control frame processing unit 15 described hereinafter may be implemented on a dedicated hardware circuit.

The node apparatuses 3 and 4 may each be constructed as an Ethernet (registered trademark) transmission apparatus equipped with an Ethernet (registered trademark) linear protection mechanism defined in ITU-T Recommendation G.8031. Further, the control frame to be processed by the control frame processing unit 15 may be an Ethernet (registered trademark) OAM frame called the APS frame.

All the examples given hereinafter are described by assuming the case where the node apparatus 3 initiates the operation for the working/protection switching of the redundant paths, and the node apparatus 4 carries out the switching in response to the control frame received from the node apparatus 3. The switching operation here refers to the operation for switching the path 1 from the working path to the protection path and the path 2 from the protection path to the working path.

The node apparatus that initiates the switching operation for switching between the working and protection paths may be referred to as the "initiating node." The node apparatus that is located at the other end of the connection and that performs the switching in accordance with the control frame received from the node apparatus 3 may be referred to as the "remote node." According to the above assumption, the node apparatus 3 is the "initiating node," and the node apparatus 4 is the "remote node."

Further, the path used as the working path and the path used as the protection path until the working/protection switching is completed may be referred to as the "previous working path" and the "previous protection path," respectively. Likewise, the path used as the working path and the path used as the protection path after the working/protection switching is completed may be referred to as the "new working path" and the "new protection path," respectively. According to the above assumption, the "previous working path" and "new protection path" both refer to the path 1, and the "previous protection path" and "new working path" both refer to the path 2.

Figure 3:
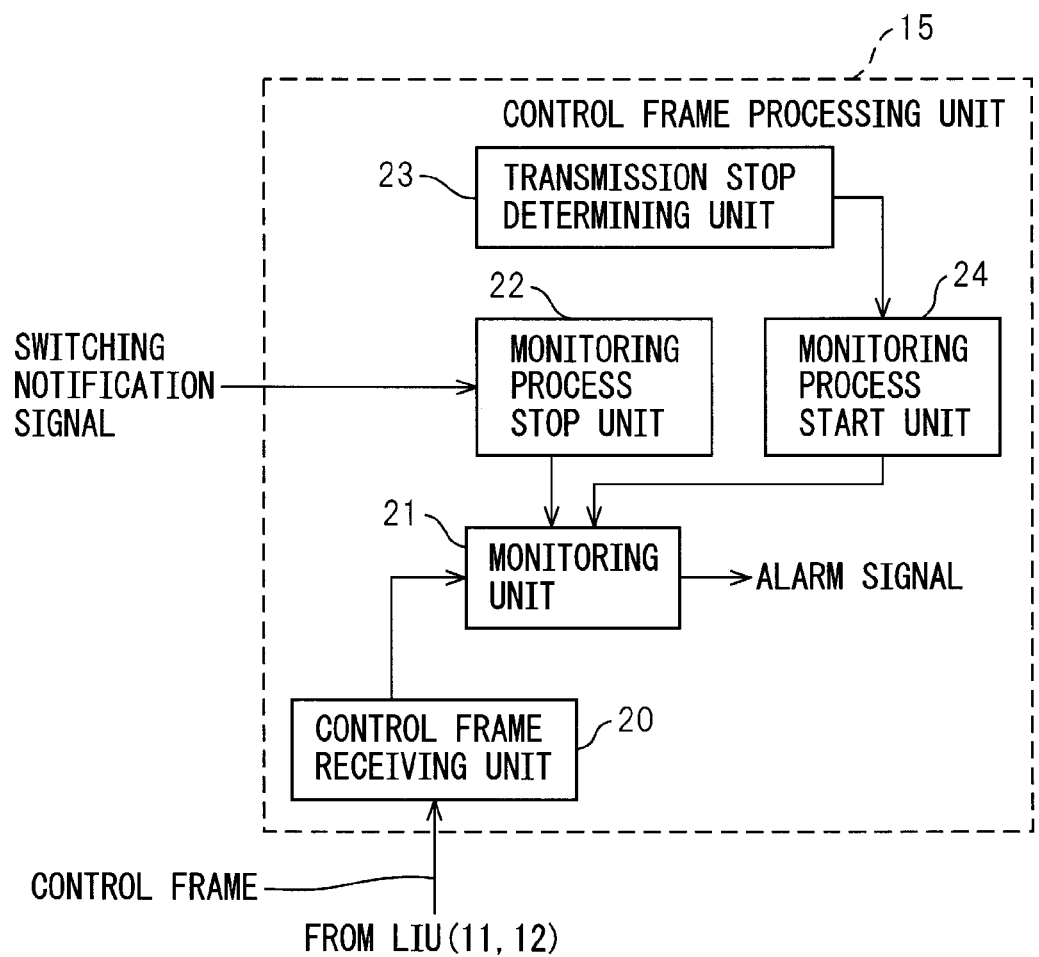
FIG. 3 is a diagram schematically illustrating a first configuration example of a control frame processing unit according to the embodiment.

FIG. 3 is a diagram schematically illustrating a first configuration example of the control frame processing unit according to the embodiment. The configuration of FIG. 3 illustrates the component elements used when the control frame processing unit 15 operates in the initiating node apparatus 3. Reference numeral 20 is a control frame receiving unit, 21 is a monitoring unit, 22 is a monitoring process stop unit, 23 is a transmission stop determining unit, and 24 is a monitoring process start unit.

The control frame processing unit 15 here includes the control frame receiving unit 20, monitoring unit 21, monitoring process stop unit 22, transmission stop determining unit 23, and monitoring process start unit 24.

The control frame receiving unit 20 receives from the LIU 11 and/or the LIU 12 the control frame that the node apparatus 4 transmitted on the path 1 and/or the path 2. The monitoring unit 21 monitors whether or not the control frame has been received via the path used as the working path. If the control frame has been received via the working path, the monitoring unit 21 generates an alarm by determining that an erroneous path setting is detected.

At the time of the working/protection switching, the monitoring process stop unit 22, in response to a working/protection redundant path switching notification signal, causes the monitoring unit 21 to stop monitoring whether or not the control frame has been received via the previous working path.

The transmission stop determining unit 23 determines whether the node apparatus 4 has stopped transmitting the control frame via the new working path. When the transmission stop determining unit 23 determines that the node apparatus 4 has stopped transmitting the control frame via the new working path, the monitoring process start unit 24 causes the monitoring unit 21 to start monitoring whether or not the control frame has been received via the new working path.

Figure 4:
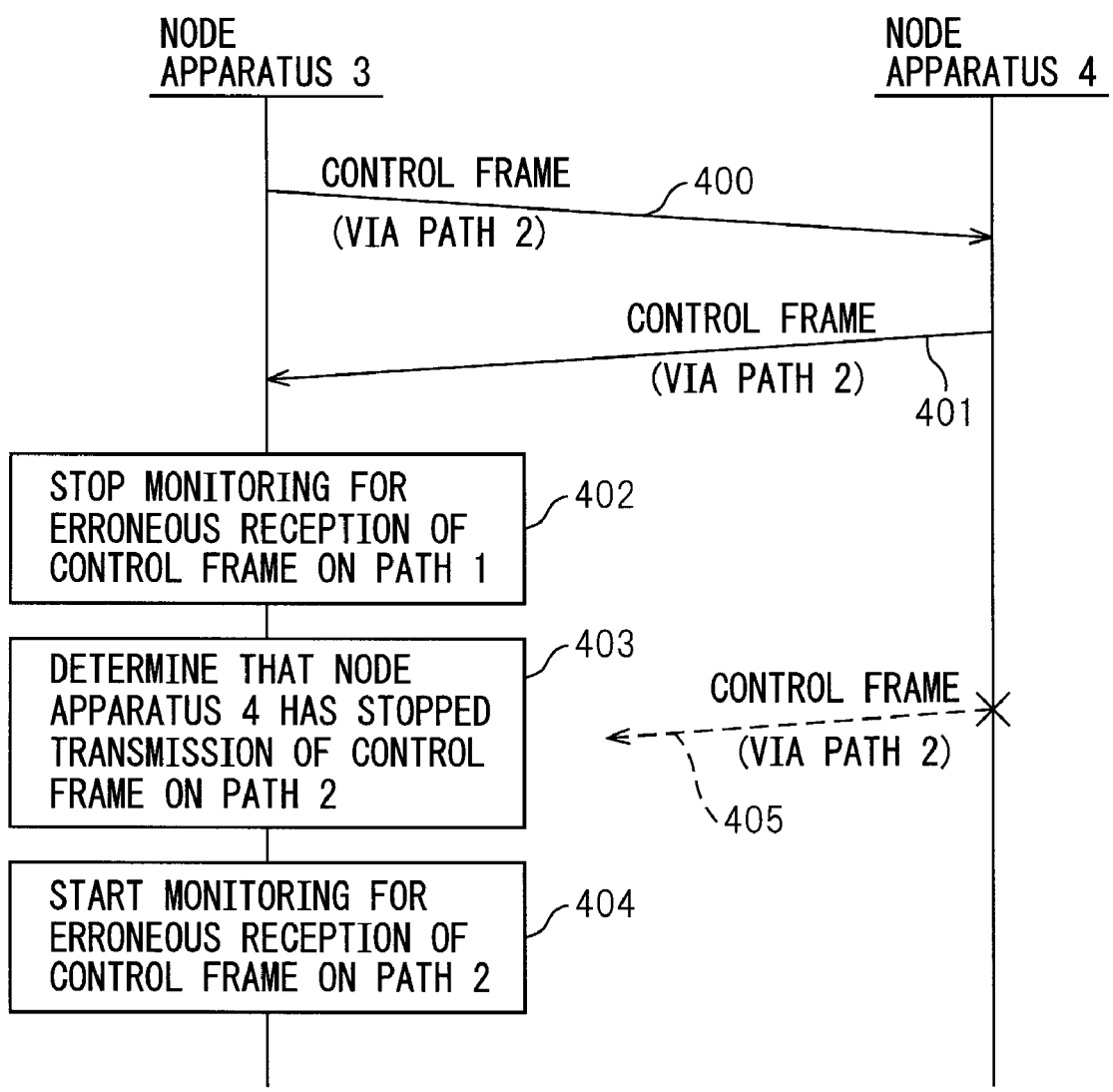
FIG. 4 is an explanatory diagram illustrating a first example of a control frame processing method according to the embodiment.

FIG. 4 is an explanatory diagram illustrating a first example of a control frame processing method according to the embodiment. In an alternative embodiment, the following operations 400 to 405 may be implemented as steps. At the time of the working/protection switching, the control frame is transferred via the path 2, i.e., the previous protection path, just like the control frame transmitted and received in operations 400 and 401, until the switching of the control frame transmission path is completed.

When the working/protection switching of the redundant paths occurs, the monitoring process stop unit 22 in operation 402 causes the monitoring unit 21 to stop monitoring whether or not the control frame has been received via the path 1.

In operation 403, the transmission stop determining unit 23 determines whether the node apparatus 4 has stopped transmitting the control frame via the path 2.

When the transmission stop determining unit 23 determines that the node apparatus 4 has stopped transmitting the control frame via the path 2, the monitoring process start unit 24 in operation 404 causes the monitoring unit 21 to start monitoring whether or not the control frame has been received via the path 2.

According to the above example, when the working/protection switching of the redundant paths occurs, the monitoring operation for monitoring whether or not the control frame has been received via the previous working path is stopped. This is done to prevent an alarm from being generated from the monitoring unit 21 when the remote node begins to transmit the control frame via the new protection path, i.e., the previous working path, after the switching of the control frame transmission path is completed.

According to the above example, the monitoring unit 21 resumes the monitoring operation after it is determined that the remote node has stopped transmitting the control frame via the new working path, i.e., the previous protection path, as indicated by reference numeral 405. The remote node 4 stops transmitting the control frame via the new working path, for example, in response to the switching of the control frame transmission path. This serves to avoid a situation where the monitoring unit 21 resumes the monitoring operation when the remote node is still transmitting the control frame via the new working path, and an alarm can thus be prevented from being generated from the monitoring unit 21.

Figure 5:
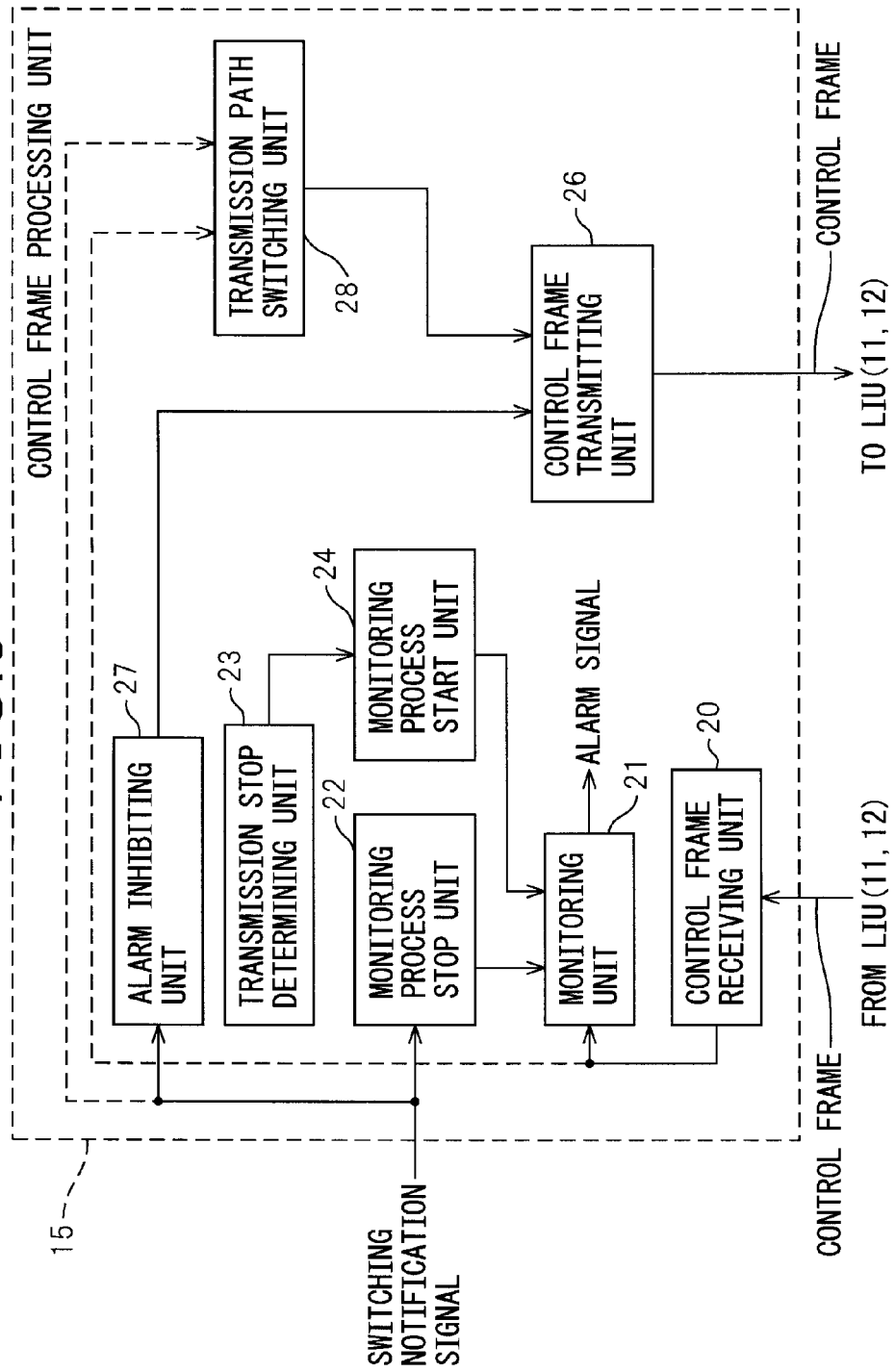
FIG. 5 is a diagram schematically illustrating a second configuration example of the control frame processing unit according to the embodiment.

FIG. 5 is a diagram schematically illustrating a second configuration example of the control frame processing unit according to the embodiment. The configuration of FIG. 5 illustrates the component elements used when the control frame processing unit 15 operates in the initiating node apparatus 3. The same component elements as those depicted in FIG. 3 are designated by the same reference numerals as those used in FIG. 3. Reference numeral 26 is a control frame transmitting unit, 27 is an alarm inhibiting unit, and 28 is a transmission path switching unit.

The control frame processing unit 15 includes the control frame receiving unit 20, monitoring unit 21, monitoring process stop unit 22, transmission stop determining unit 23, monitoring process start unit 24, control frame transmitting unit 26, alarm inhibiting unit 27, and transmission path switching unit 28.

Figure 6:
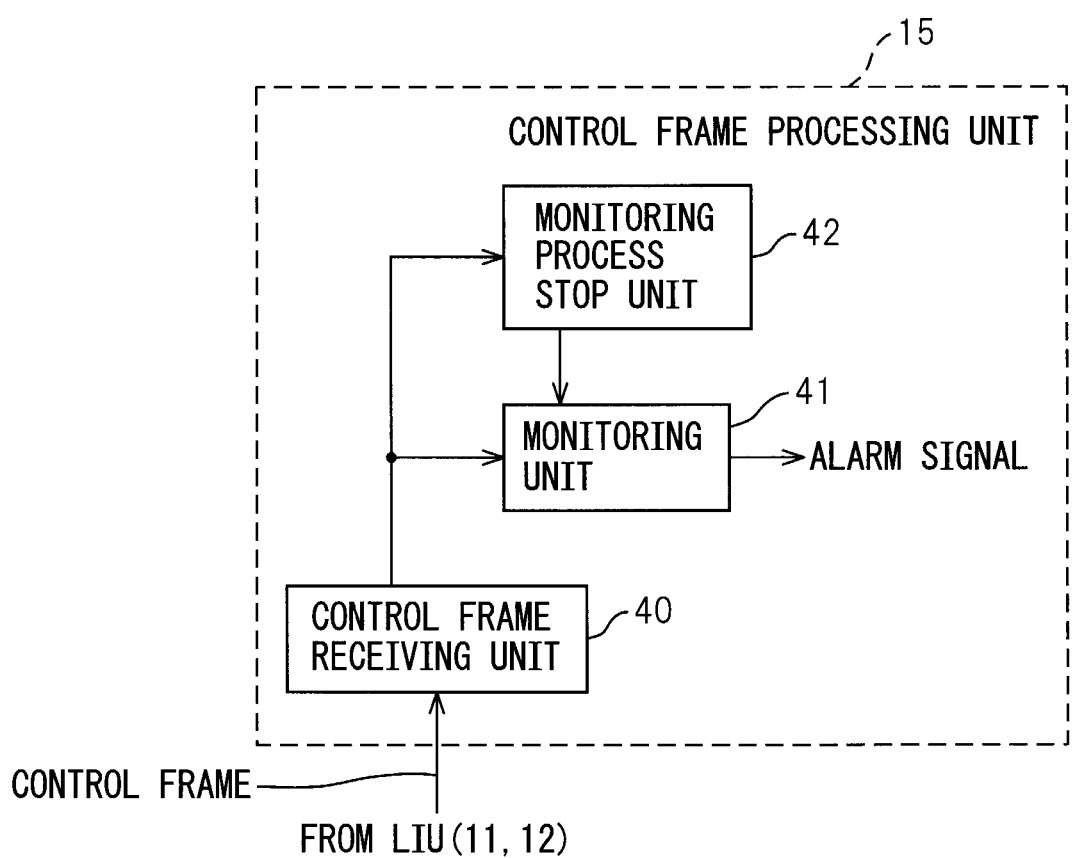
FIG. 6 is a diagram schematically illustrating a third configuration example of the control frame processing unit according to the embodiment.

FIG. 6 is a diagram schematically illustrating a third configuration example of the control frame processing unit according to the embodiment. The configuration of FIG. 6 illustrates the component elements used when the control frame processing unit 15 operates in the remote node apparatus 4. Reference numeral 40 is a control frame receiving unit, 41 is a monitoring unit, and 42 is a monitoring process stop unit. The control frame processing unit 15 thus includes the control frame receiving unit 40, monitoring unit 41, and monitoring process stop unit 42.

Reference is made to FIG. 5. The control frame transmitting unit 26 creates the control frame to be transmitted to the node apparatus 4, and transmits the created control frame to the node apparatus 4 via the path 1 and/or the path 2.

The alarm inhibiting unit 27, in response to the switching notification signal, inhibits the alarm from being generated by the monitoring unit 41 in the node apparatus 4 at the time of the working/protection switching. The transmission path switching unit 28 switches the control frame transmission path from the path 1 to the path 2 or vice versa. The transmission path switching unit 28 may switch the transmission path, for example, when the switching notification signal is received. Alternatively, the transmission path switching unit 28 may switch the transmission path when a specific control frame is received from the remote node.

Reference is made to FIG. 6. The control frame receiving unit 40 receives from the LIU 11 and/or the LIU 12 the control frame that the node apparatus 3 transmitted on the path 1 and/or the path 2.

The monitoring unit 41 monitors whether or not the control frame has been received via the path used as the working path. If the control frame is received via the working path, the monitoring unit 41 generates an alarm by determining that an erroneous path setting is detected.

The monitoring process stop unit 42 causes the monitoring unit 41 to stop monitoring whether or not the control frame has been received via the previous working path, i.e., the path 1, in accordance with the control frame received from the initiating node.

The alarm inhibiting unit 27 may notify the monitoring process stop unit 42 to stop the monitoring operation of the monitoring unit 41, by transmitting a specific control frame to the remote node from the control frame transmitting unit 26. When the specific control frame is received, the monitoring process stop unit 42 causes the monitoring unit 41 to stop monitoring whether or not the control frame has been received via the path 1.

Figure 7:
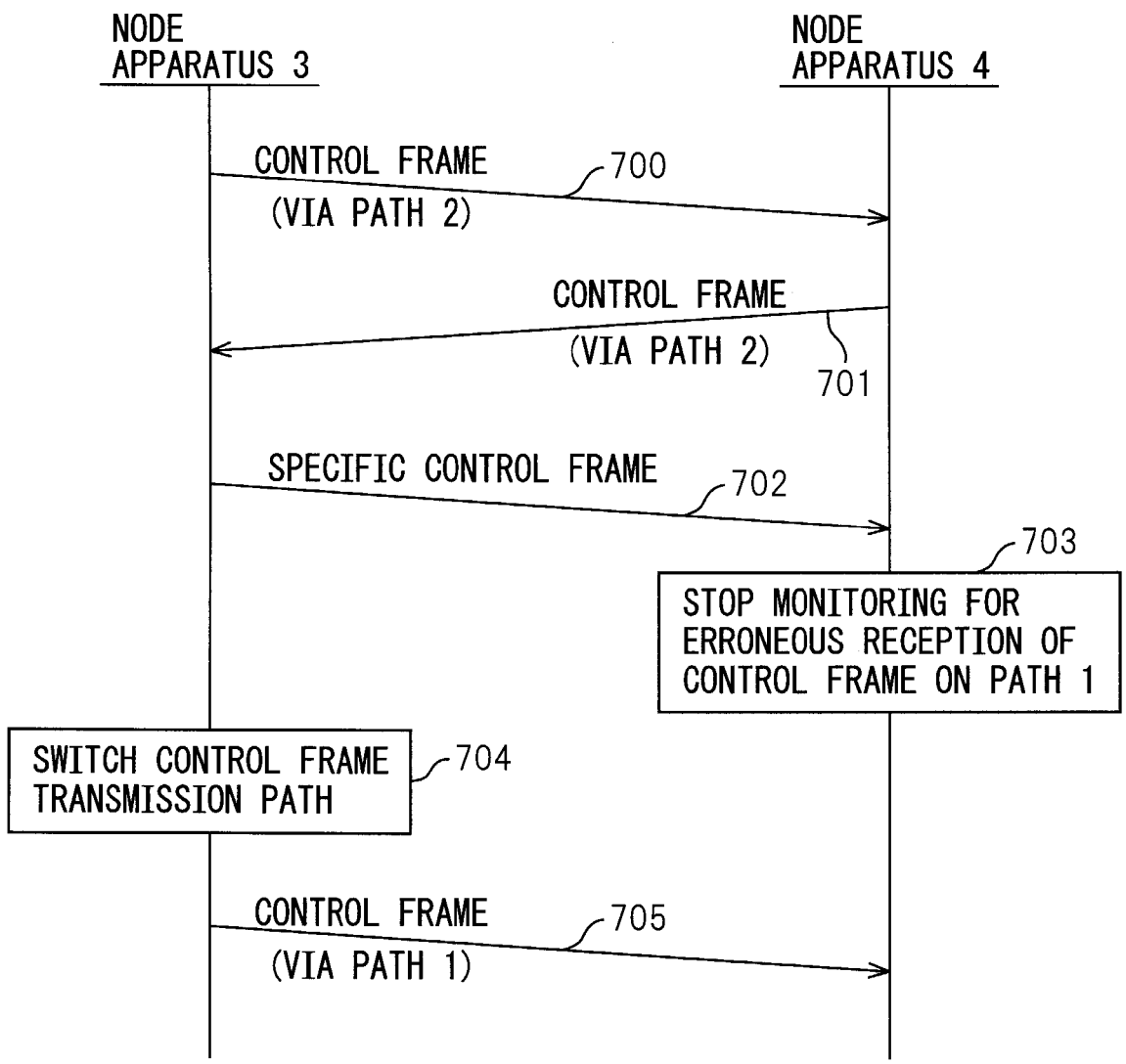
FIG. 7 is an explanatory diagram illustrating a second example of the control frame processing method according to the embodiment.

FIG. 7 is an explanatory diagram illustrating a second example of the control frame processing method according to the embodiment. The following operations 700 to 705 may be implemented as steps. At the time of the working/protection switching, the control frame is transferred via the path 2, i.e., the previous protection path, just like the control frame transmitted and received in operations 700 and 701, until the switching of the control frame transmission path is completed.

In operation 702, the alarm inhibiting unit 27 instructs the control frame transmitting unit 26 to transmit a specific control frame to the node apparatus 4. The specific control frame may be created, for example, by setting a specific flag stored as control information in the control frame.

When the specific control frame is received, the monitoring process stop unit 42 in operation 703 causes the monitoring unit 41 to stop monitoring whether or not the control frame has been received via the path 1. In operation 704, the transmission path switching unit 28 switches the control frame transmission path from the path 2 to path 1. In operation 705, the control frame transmitting unit 26 transmits the control frame to the node apparatus 4 via the new protection path, i.e., the path 1.

According to the above example, when switching the control frame transmission path, the monitoring unit 41 in the remote node apparatus 4 can be caused to stop monitoring the reception of the control frame on the new protection path. This serves to prevent an alarm from being generated when switching the control frame transmission path.

As an alternative example, the alarm inhibiting unit 27 may instruct the control frame transmitting unit 26 to create the control frame by including therein specific information for inhibiting the monitoring unit 41 from issuing an alarm. In this case, the control frame transmitting unit 26 transmits the control frame to the remote node by including therein the specific information. When the control frame with the specific information included therein is received, the monitoring unit 41 does not issue an alarm even if the control frame is received via the working path.

Figure 8:
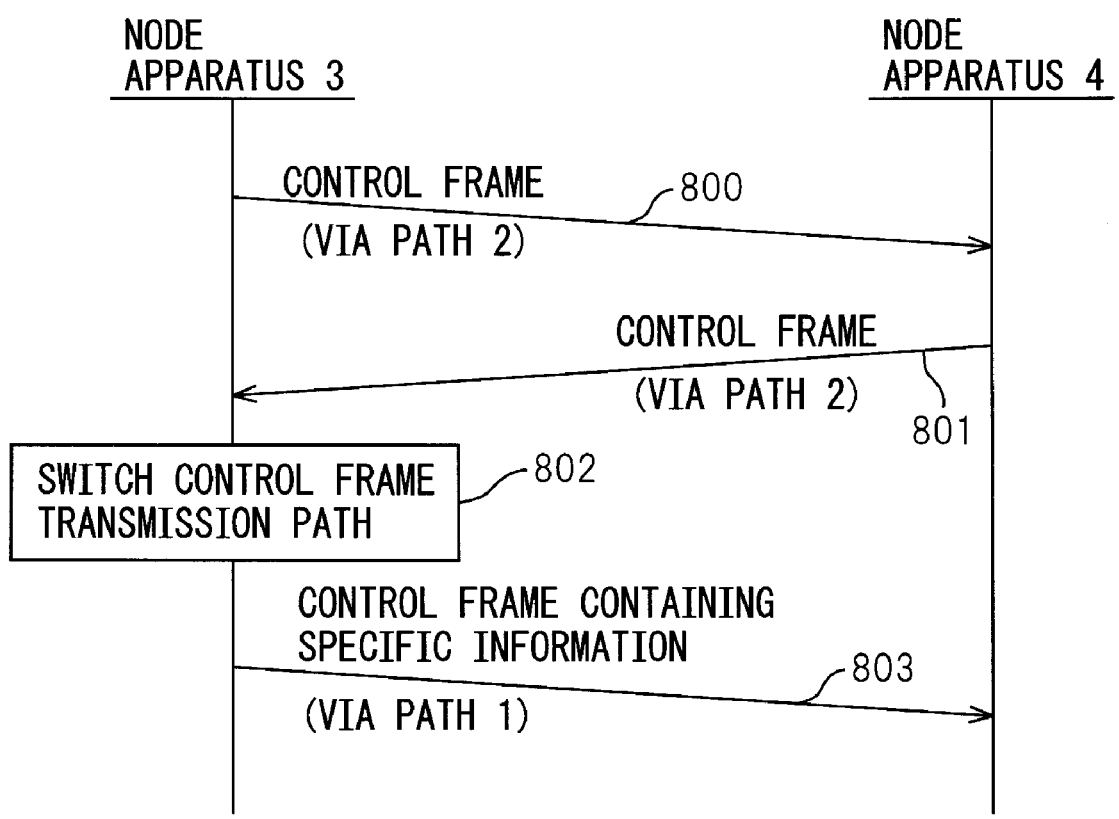
FIG. 8 is an explanatory diagram illustrating a third example of the control frame processing method according to the embodiment.

FIG. 8 is an explanatory diagram illustrating a third example of the control frame processing method according to the embodiment. The following operations 800 to 803 may be implemented as steps. At the time of the working/protection switching, the control frame is transferred via the path 2, i.e., the previous protection path, just like the control frame transmitted and received in operations 800 and 801, until the switching of the control frame transmission path is completed.

In operation 802, the transmission path switching unit 28 switches the control frame transmission path from the path 2 to path 1.

In operation 803, the alarm inhibiting unit 27 instructs the control frame transmitting unit 26 to create the control frame by including therein specific information for inhibiting the monitoring unit 41 from issuing an alarm. The specific information may be created by setting a specific flag stored as control information in the control frame. The control frame transmitted to the node apparatus 4 via the path 1 thus includes the specific information. Here, the order of operations 802 and 803 may be interchanged.

The monitoring unit 41 receives the control frame via the previous working path, i.e., the path 1. Since the control frame includes the specific information, the monitoring unit 41 does not issue an alarm even if the control frame is received via the working path. In this way, the generation of an alarm can be prevented without having to cause the monitoring unit 41 to stop monitoring the reception of the control frame on the path 1 before the control frame is received via the path 1 in operation 803.

According to the above example, the initiating node can effect the control frame transmission path switching before causing the monitoring unit 41 in the remote node to stop monitoring the reception of the control frame on the working path. Since the control frame transmission path can be switched at an early stage, it becomes possible to reduce the period of time during which the traffic and the control frame flow on the same path.

Figure 9:
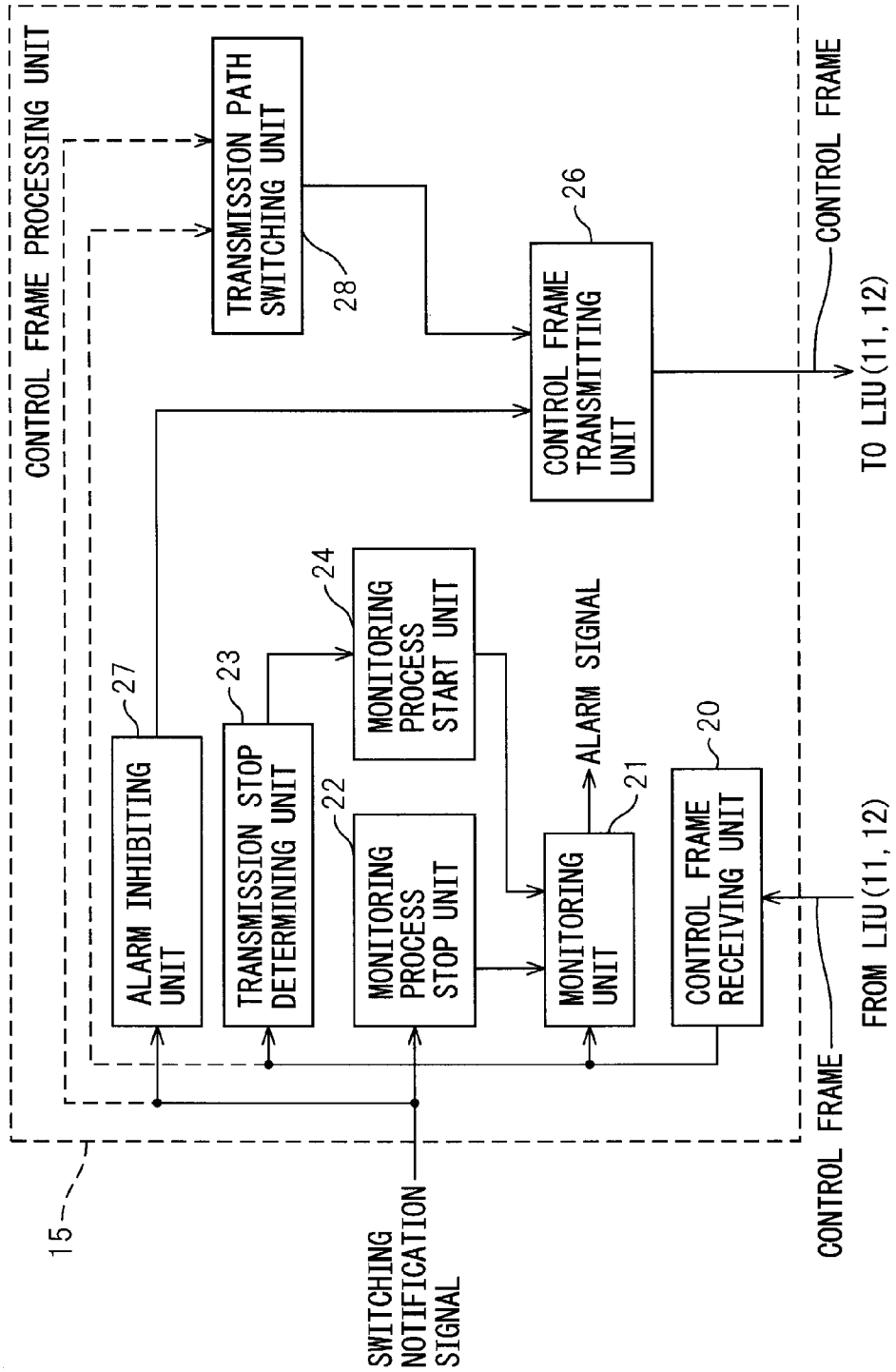
FIG. 9 is a diagram schematically illustrating a fourth configuration example of the control frame processing unit according to the embodiment.

FIG. 9 is a diagram schematically illustrating a fourth configuration example of the control frame processing unit according to the embodiment. The configuration of FIG. 9 illustrates the component elements used when the control frame processing unit 15 operates in the initiating node apparatus 3. The same component elements as those depicted in FIG. 5 are designated by the same reference numerals as those used in FIG. 5. The control frame processing unit 15 here includes the control frame receiving unit 20, monitoring unit 21, monitoring process stop unit 22, transmission stop determining unit 23, monitoring process start unit 24, control frame transmitting unit 26, alarm inhibiting unit 27, and transmission path switching unit 28.

Figure 10:
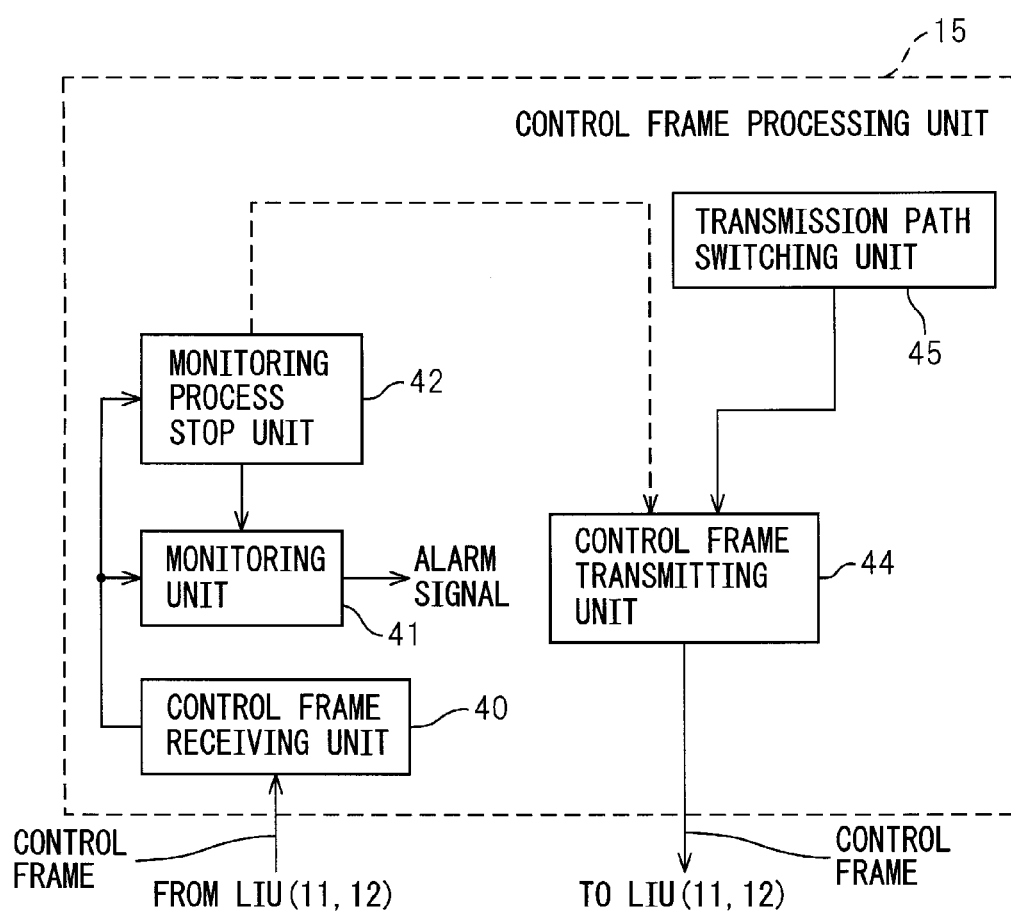
FIG. 10 is a diagram schematically illustrating a fifth configuration example of the control frame processing unit according to the embodiment.

FIG. 10 is a diagram schematically illustrating a fifth configuration example of the control frame processing unit according to the embodiment. The configuration of FIG. 10 illustrates the component elements used when the control frame processing unit 15 operates in the remote node apparatus 4. The same component elements as those depicted in FIG. 6 are designated by the same reference numerals as those used in FIG. 6.

Reference numeral 44 is a control frame transmitting unit, and 45 is a transmission path switching unit. The control frame processing unit 15 thus includes the control frame receiving unit 40, monitoring unit 41, monitoring process stop unit 42, control frame transmitting unit 44, and transmission path switching unit 45.

The control frame transmitting unit 44 creates the control frame to be transmitted to the node apparatus 3, and transmits the created control frame to the node apparatus 3 via the path 1 and/or the path 2. The transmission path switching unit 45 switches the control frame transmission path from the path 1 to the path 2 or vice versa.

Referring to FIG. 9. The transmission stop determining unit 23 that received the control frame transmitted from the control frame transmitting unit 44 in the remote node apparatus 4 determines whether the node apparatus 4 has stopped transmitting the control frame via the new working path, i.e., the path 2.

For example, when a specific control frame is received from the node apparatus 4, the transmission stop determining unit 23 may determine that the node apparatus 4 has stopped transmitting the control frame via the path 2. The specific control frame may be created, for example, by setting a specific flag stored as control information in the control frame.

Figure 11:
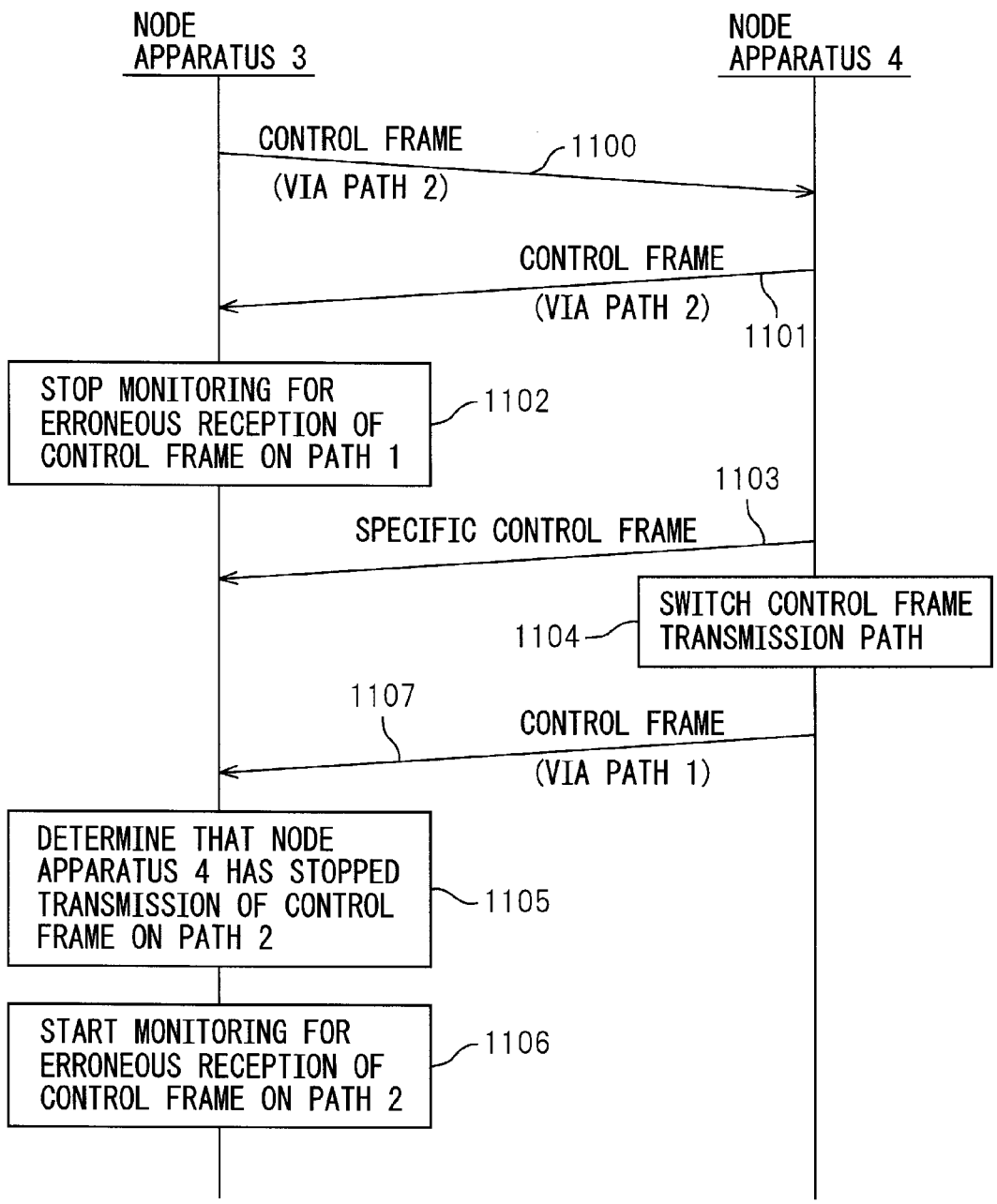
FIG. 11 is an explanatory diagram illustrating a fourth example of the control frame processing method according to the embodiment.

FIG. 11 is an explanatory diagram illustrating a fourth example of the control frame processing method according to the embodiment. The following operations 1000 to 1107 may be implemented as steps. At the time of the working/protection switching, the control frame is transferred via the path 2, i.e., the previous protection path, just like the control frame transmitted and received in operations 1100 and 1101, until the switching of the control frame transmission path is completed.

When the working/protection switching of the redundant paths occurs, the monitoring process stop unit 22 in operation 1102 causes the monitoring unit 21 to stop monitoring whether or not the control frame has been received via the path 1.

In operation 1103, the control frame transmitting unit 44 in the node apparatus 4 creates a specific control frame and transmits it to the node apparatus 3. In operation 1104, the transmission path switching unit 45 switches the control frame transmission path from the path 2 to the path 1. The order of operations 1103 and 1104 may be interchanged. After that, the node apparatus 4 transmits the control frame via the path 1, as indicated by reference numeral 1107, thus stopping the transmission of the control frame on the path 2.

When the specific control frame is received from the node apparatus 4, the transmission stop determining unit 23 in operation 1105 determines that the node apparatus 4 has stopped transmitting the control frame via the path 2. In operation 1106, the monitoring process start unit 24 causes the monitoring unit 21 to start monitoring whether or not the control frame has been received via the path 2.

According to the above example, when the specific control frame transmitted from the node apparatus 4 is received by the node apparatus 3, the transmission stop determining unit 23 can determine that the node apparatus 4 has stopped transmitting the control frame via the path 2.

As an alternative example, the alarm inhibiting unit 27 may instruct the control frame transmitting unit 26 to create the control frame, for example, by including therein specific information for inhibiting the monitoring unit 41 in the node apparatus 4 from issuing an alarm. When the control frame with the specific information included therein is received, the monitoring unit 41 does not issue an alarm even if the control frame is received via the working path.

When the control frame with the specific information included therein is received, the monitoring process stop unit 42 in the node apparatus 4 causes the monitoring unit 41 to stop monitoring whether or not the control frame has been received via the path 1. When the control frame with the specific information included therein is received, the control frame transmitting unit 44 transmits the control frame with the specific information included therein to the node apparatus 3. By receiving the control frame with the specific information included therein, the node apparatus 3 can detect that the node apparatus 4 has stopped monitoring the reception of the control frame on the path 1, and that it is not need to include the specific information in the control frame to be transmitted to the node apparatus 4.

The transmission path switching unit 45 switches the control frame transmission path from the path 2 to the path 1. The transmission of the control frame on the path 2 is thus stopped. Then, the control frame transmitting unit 44 transmits the control frame with the specific information not included therein to the node apparatus 3.

The transmission stop determining unit 23 may detect the change of state in the node apparatus 4 when the control frame with the specific information not included therein is received from the node apparatus 4 after receiving the control frame with the specific information included therein from the node apparatus 4. The change of state here may represent, for example, the fact that the node apparatus 4 has stopped the transmission of the control frame on the path 2.

The specific information may be created by setting a specific flag stored as control information in the control frame. The control frame with the specific information not included therein may refer to the control frame in which the specific flag is reset.

Figure 12:
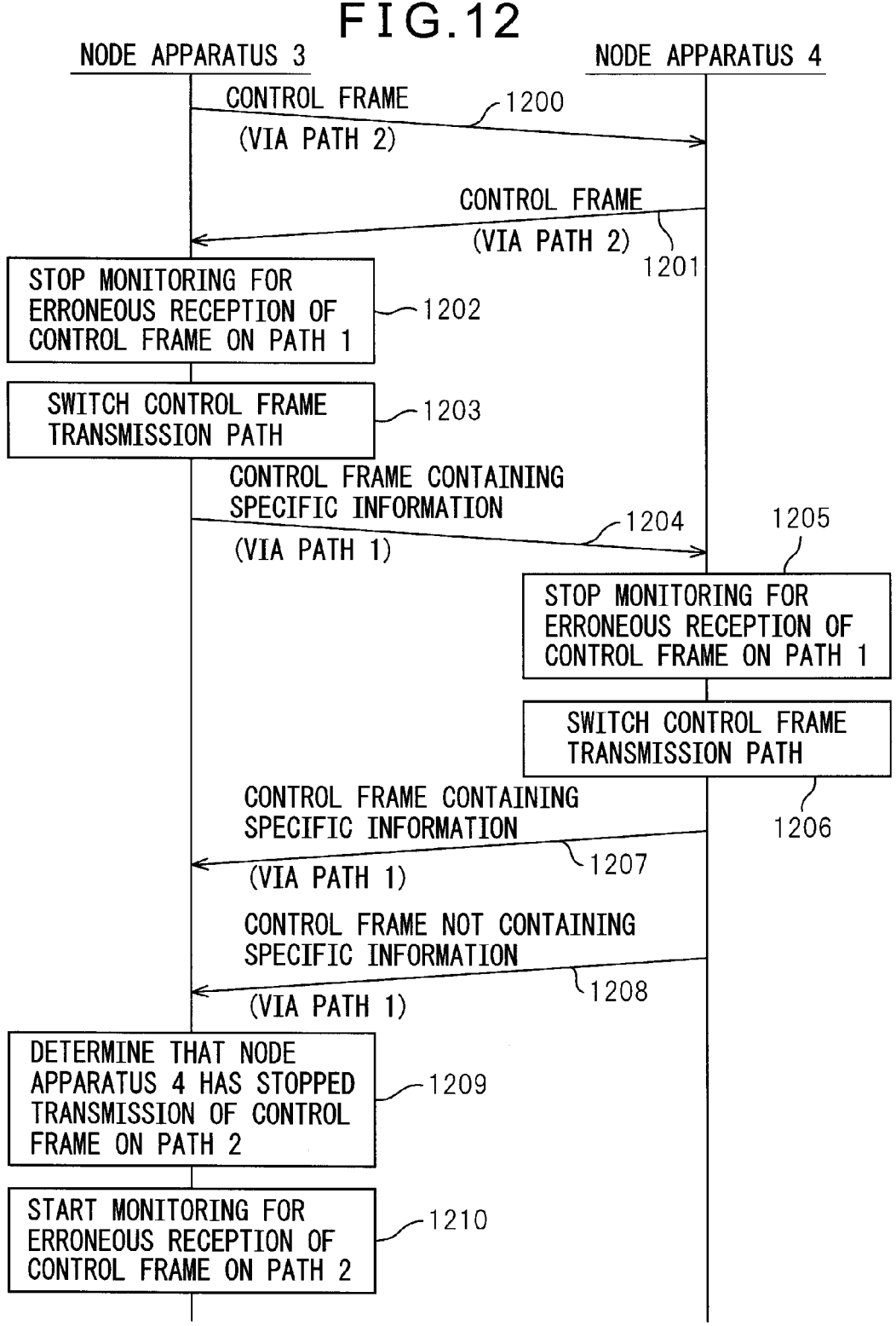
FIG. 12 is an explanatory diagram illustrating a fifth example of the control frame processing method according to the embodiment.

FIG. 12 is an explanatory diagram illustrating a fifth example of the control frame processing method according to the embodiment. The following operations 1200 to 1210 may be implemented as steps. At the time of the working/protection switching, the control frame is transferred via the path 2, i.e., the previous protection path, just like the control frame transmitted and received in operations 1200 and 1201, until the switching of the control frame transmission path is completed.

When the working/protection switching of the redundant paths occurs, the monitoring process stop unit 22 in operation 1202 causes the monitoring unit 21 to stop monitoring whether or not the control frame has been received via the path 1. In operation 1203, the transmission path switching unit 28 switches the control frame transmission path from the path 2 to path 1.

In operation 1204, the alarm inhibiting unit 27 instructs the control frame transmitting unit 26 to create the control frame by including therein specific information for inhibiting the monitoring unit 41 from issuing an alarm. The control frame transmitting unit 26 transmits the control frame with the specific information included therein to the node apparatus 4 via the path 1. The monitoring unit 41 does not issue an alarm even if the control frame is received via the working path.

When the control frame with the specific information included therein is received, the monitoring process stop unit 42 in operation 1205 causes the monitoring unit 41 to stop monitoring whether or not the control frame has been received via the path 1. In operation 1206, the transmission path switching unit 45 switches the control frame transmission path from the path 2 to path 1.

In operation 1207, the control frame transmitting unit 44 transmits the control frame with the specific information included therein to the node apparatus 3 via the path 1. Operations 1205 to 1207 may be carried out in any order. In operation 1208, the control frame transmitting unit 44 transmits the control frame with the specific information not included therein to the node apparatus 3.

When the control frame with the specific information not included therein is received after receiving the control frame with the specific information included therein, the transmission stop determining unit 23 determines in operation 1209 that the node apparatus 4 has stopped the transmission of the control frame on the path 2. In operation 1210, the monitoring process start unit 24 causes the monitoring unit 21 to start monitoring whether or not the control frame has been received via the path 2.

According to the above example, by including in the control frame the specific information for inhibiting the monitoring unit 41 from issuing an alarm, the control frame transmission path can be switched before the monitoring unit 41 in the remote node stops the monitoring operation.

According to the above example, the node apparatus transmits the control frame to the initiating node by including the specific information therein, and thereafter transmits the control frame with the specific information not included therein. By changing the control frame in this manner, the node apparatus can notify that it has stopped the transmission of the control frame on the new working path. By thus using the specific information to notify the initiating node, the number of kinds of information to be stored in the control frame can be reduced.

As an alternative example, the transmission stop determining unit 23 may determine that the node apparatus 4 has stopped the transmission of the control frame on the path 2 when the path via which the control frame is received from the node apparatus 4 has changed from the path 2, i.e., the new working path, to the path 1, i.e., the previous working path.

Figure 13:
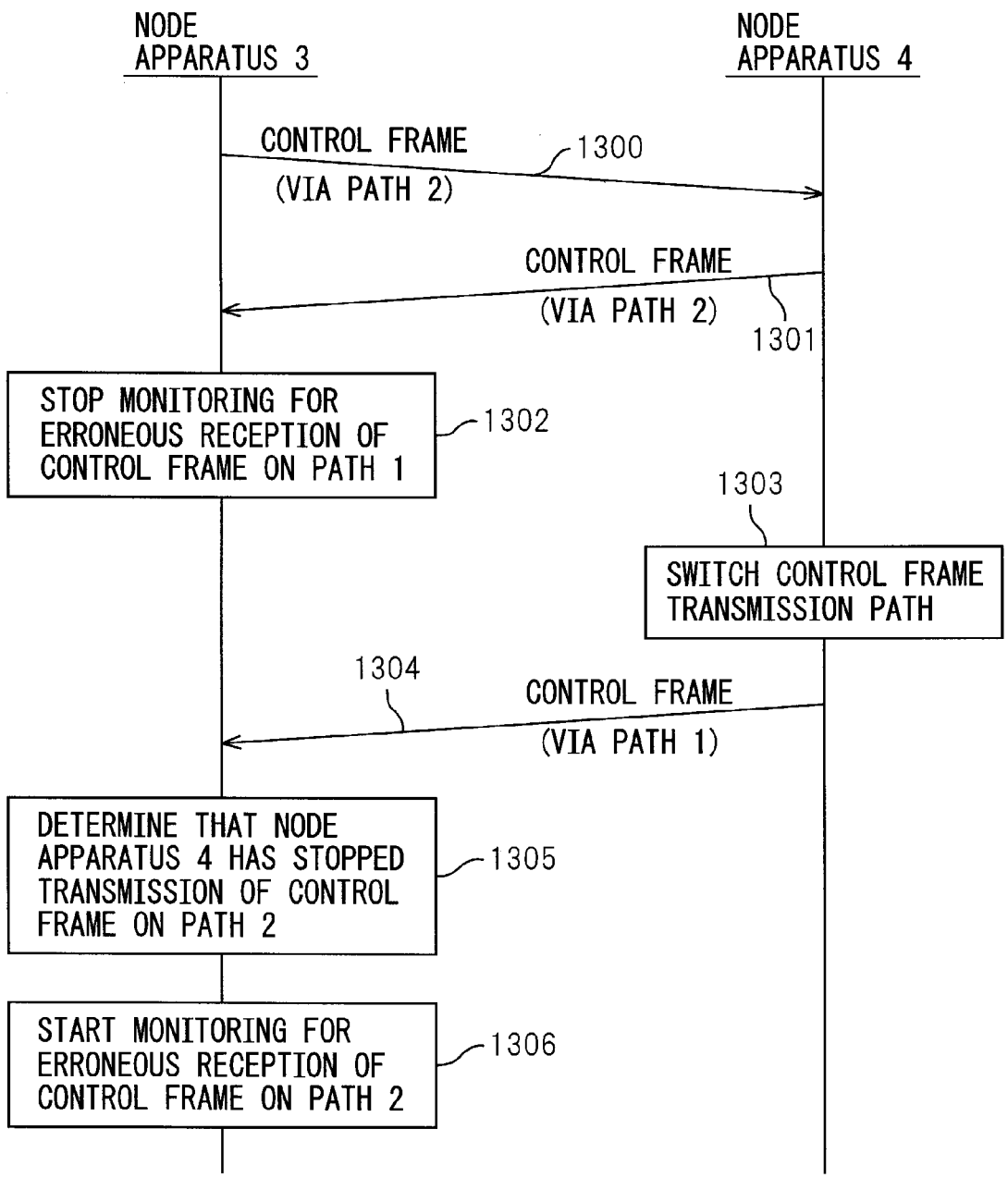
FIG. 13 is an explanatory diagram illustrating a sixth example of the control frame processing method according to the embodiment.

FIG. 13 is an explanatory diagram illustrating a sixth example of the control frame processing method according to the embodiment. The following operations 1300 to 1306 may be implemented as steps. At the time of the working/protection switching, the control frame is transferred via the path 2, i.e., the previous protection path, just like the control frame transmitted and received in operations 1300 and 1301, until the switching of the control frame transmission path is completed.

When the working/protection switching of the redundant paths occurs, the monitoring process stop unit 22 in operation 1302 causes the monitoring unit 21 to stop monitoring whether or not the control frame has been received via the path 1.

In operation 1303, the transmission path switching unit 45 switches the control frame transmission path from the path 2 to path 1. In operation 1304, the control frame transmitting unit 44 transmits the control frame to the node apparatus 3 via the new protection path 1, i.e., the previous working path.

When the path via which the control frame is received has changed from the path 2, i.e., the new working path, to the path 1, i.e., the previous working path, the transmission stop determining unit 23 determines in operation 1305 that the node apparatus 4 has stopped the transmission of the control frame on the path 2. In operation 1306, the monitoring process start unit 24 causes the monitoring unit 21 to start monitoring whether or not the control frame has been received via the path 2.

According to the above example, notification that the transmission of the control frame on the new working path has been stopped can be provided without using any specific control frame. This serves to reduce the number of kinds of information to be stored in the control frame and enhance the efficiency in the use of bits in the control frame.

Figure 14:
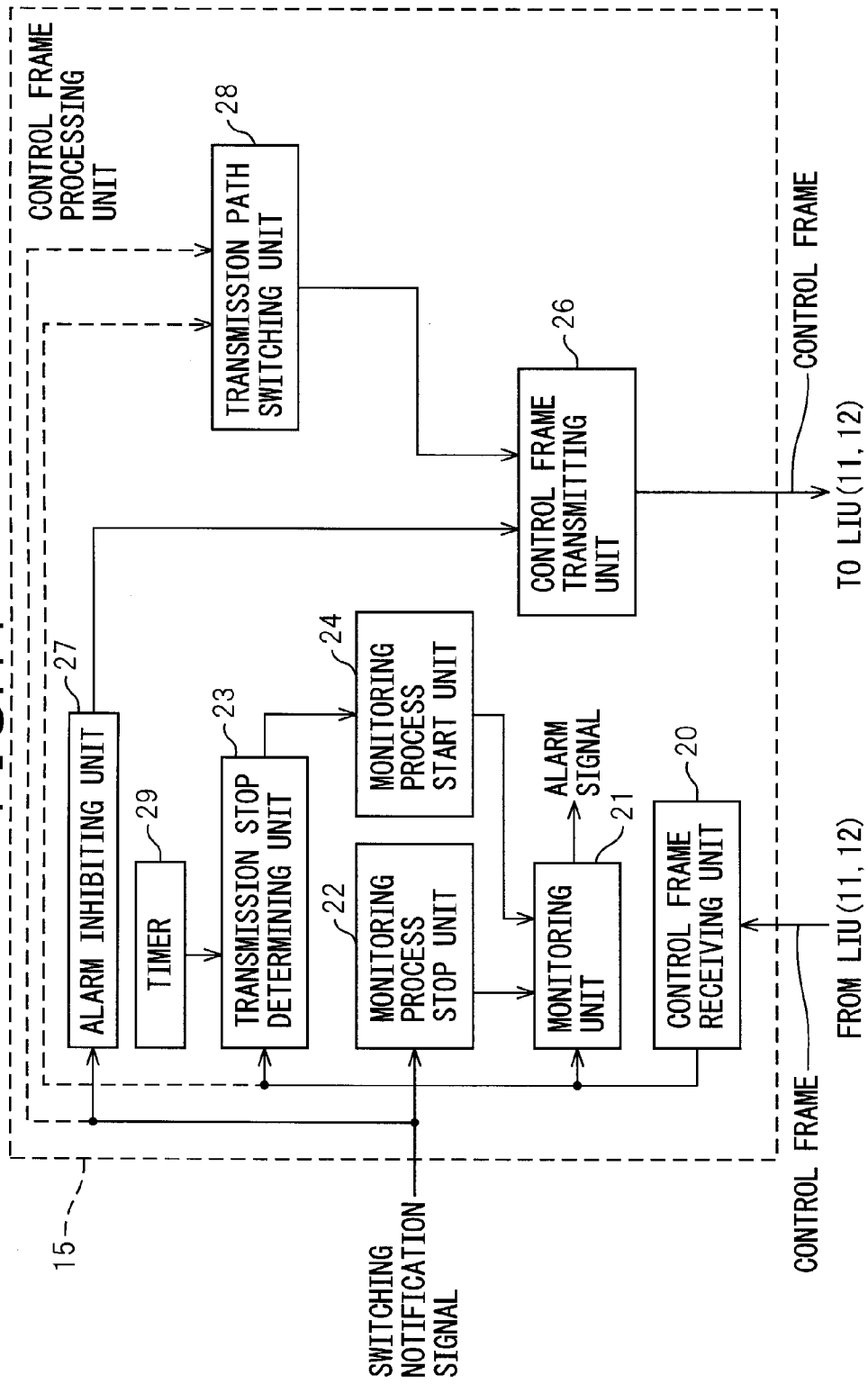
FIG. 14 is a diagram schematically illustrating a sixth configuration example of the control frame processing unit according to the embodiment.

FIG. 14 is a diagram schematically illustrating a sixth configuration example of the control frame processing unit according to the embodiment. The configuration of FIG. 14 illustrates the component elements used when the control frame processing unit 15 operates in the initiating node apparatus 3. The same component elements as those depicted in FIG. 9 are designated by the same reference numerals as those used in FIG. 9. Reference numeral 29 is a timer.

The control frame processing unit 15 here includes the control frame receiving unit 20, monitoring unit 21, monitoring process stop unit 22, transmission stop determining unit 23, and monitoring process start unit 24. The control frame processing unit 15 further includes the control frame transmitting unit 26, alarm inhibiting unit 27, transmission path switching unit 28, and timer 29.

The timer 29 monitors a certain time period that elapses during the working/protection switching of the redundant paths. The period of time from the start of the time counting by the timer 29 to the expiration of the timer 29 will be referred to as the "maximum waiting time period." If the control frame is received via the previous working path 1 before the timer 29 expires, the transmission stop determining unit 23 determines that the node apparatus 4 has stopped the transmission of the control frame on the path 2.

If the timer 29 has expired before the control frame is received via the path 1, the monitoring process start unit 24 causes the monitoring unit 21 to resume the monitoring operation for monitoring whether or not the control frame has been received via the path 1.

Figure 15:
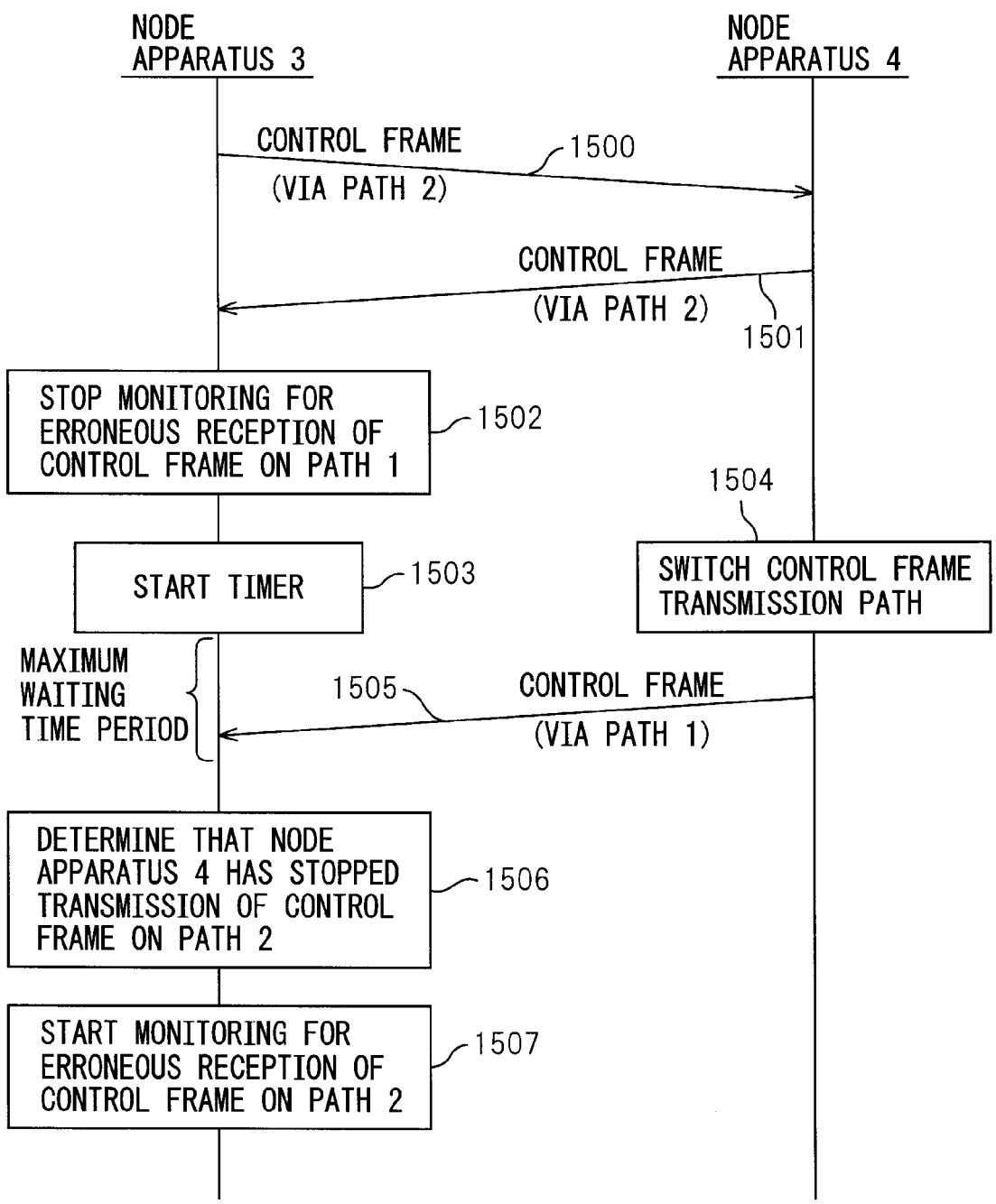
FIG. 15 is an explanatory diagram illustrating a seventh example of the control frame processing method according to the embodiment.

FIG. 15 is an explanatory diagram illustrating a seventh example of the control frame processing method according to the embodiment. The following operations 1500 to 1507 may be implemented as steps. At the time of the working/protection switching, the control frame is transferred via the path 2, i.e., the previous protection path, just like the control frame transmitted and received in operations 1500 and 1501, until the switching of the control frame transmission path is completed.

When the working/protection switching of the redundant paths occurs, the monitoring process stop unit 22 in operation 1502 causes the monitoring unit 21 to stop monitoring whether or not the control frame has been received via the path 1. In operation 1503, the timer 29 starts to count the time. The order of operations 1502 and 1503 may be interchanged.

In operation 1504, the switching of the control frame transmission path is performed at the node apparatus 4. The switching of the control frame transmission path in operation 1504 may not necessarily be performed in interlinking fashion with some operation that the node apparatus 3 performs using the control frame. For example, the node apparatus 4 may perform the switching of the control frame transmission path in response to an operator's manual operation or to an input signal from some other external apparatus.

After the switching is done in operation 1504, the node apparatus 4 in operation 1505 transmits the control frame to the node apparatus 3 via the new protection path, i.e., the previous working path 1. If the control frame is received via the previous working path 1 before the timer 29 expires, the transmission stop determining unit 23 determines in operation 1506 that the node apparatus 4 has stopped the transmission of the control frame on the path 2. In operation 1507, the monitoring process start unit 24 causes the monitoring unit 21 to start monitoring whether or not the control frame has been received via the path 2.

According to the above example, if the switching of the control frame transmission path is effected at the node apparatus 4 without interlinking the switching operation with some operation that the node apparatus 3 performs using the control frame, the monitoring unit 21 can be prevented from generating an alarm. Accordingly, even when the remote node is a node apparatus that is not able to perform the processing according to the present embodiment, the switching of the control frame transmission path can be effected without causing the monitoring unit 21 to generate an alarm.

Figure 16:
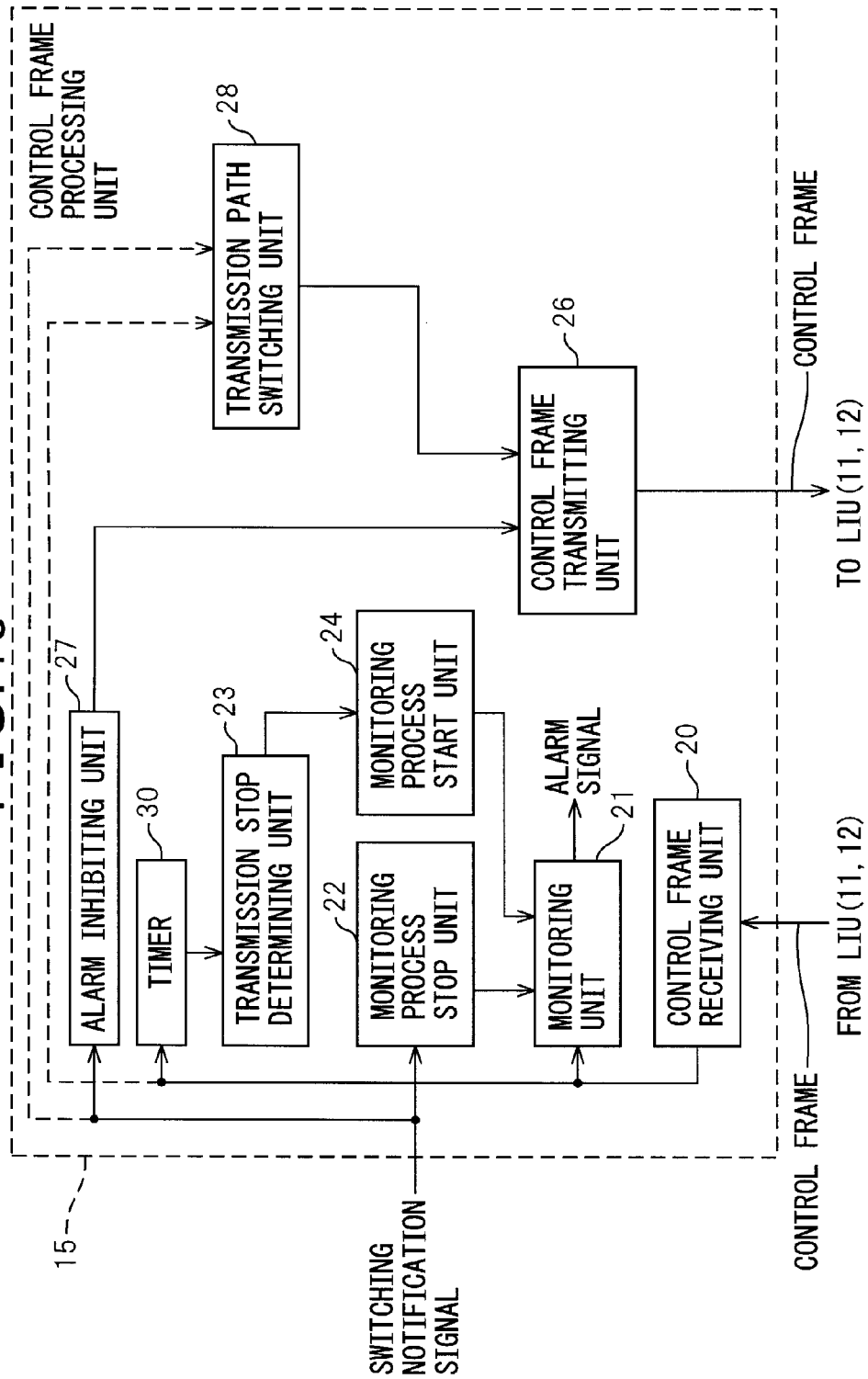
FIG. 16 is a diagram schematically illustrating a seventh configuration example of the control frame processing unit according to the embodiment.

FIG. 16 is a diagram schematically illustrating a seventh configuration example of the control frame processing unit according to the embodiment. The configuration of FIG. 16 illustrates the component elements used when the control frame processing unit 15 operates in the initiating node apparatus 3. The same component elements as those depicted in FIG. 9 are designated by the same reference numerals as those used in FIG. 9. Reference numeral 30 is a timer.

The control frame processing unit 15 here includes the control frame receiving unit 20, monitoring unit 21, monitoring process stop unit 22, transmission stop determining unit 23, and monitoring process start unit 24. The control frame processing unit 15 further includes the control frame transmitting unit 26, alarm inhibiting unit 27, transmission path switching unit 28, and timer 30.

Figure 17:
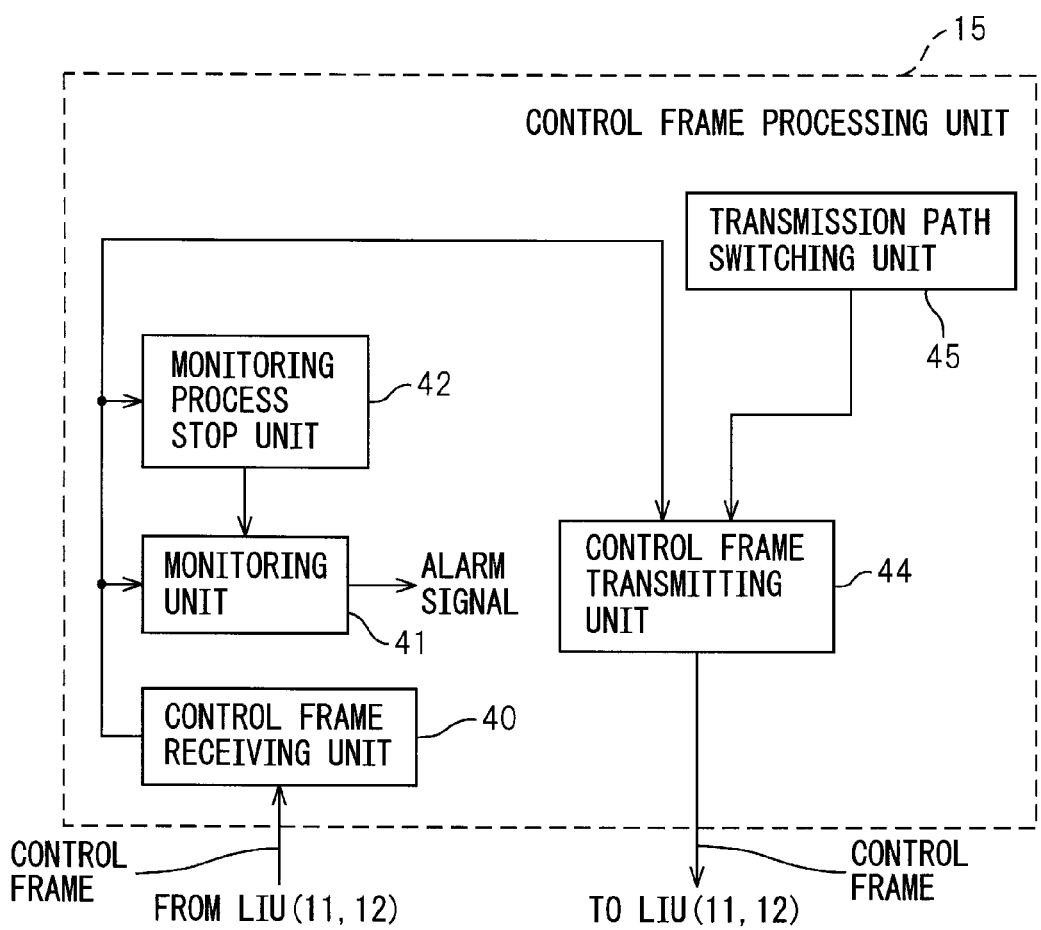
FIG. 17 is a diagram schematically illustrating an eighth configuration example of the control frame processing unit according to the embodiment.

FIG. 17 is a diagram schematically illustrating an eighth configuration example of the control frame processing unit according to the embodiment. The configuration of FIG. 17 illustrates the component elements used when the control frame processing unit 15 operates in the remote node apparatus 4. The same component elements as those depicted in FIG. 10 are designated by the same reference numerals as those used in FIG. 10. The control frame processing unit 15 includes the control frame receiving unit 40, monitoring unit 41, monitoring process stop unit 42, control frame transmitting unit 44, and transmission path switching unit 45.

The control frame transmitting unit 26 in the node apparatus 3 of FIG. 16 creates a specific control frame and transmits it to the node apparatus 4.

When the specific control frame transmitted from the node apparatus 3 is received by the node apparatus 4, the transmission stop determining unit in the node apparatus 4 of FIG. 17 creates a response frame for the control frame and transmits the response frame to the node apparatus 3.

When the response frame is received at the node apparatus 3, the timer 30 in FIG. 16 starts to count the time. The timer 30 monitors a certain time period to elapse. When the timer 30 expires, the transmission stop determining unit 23 determines that the node apparatus 4 has stopped the transmission of the control frame on the path 2.

Figure 18:
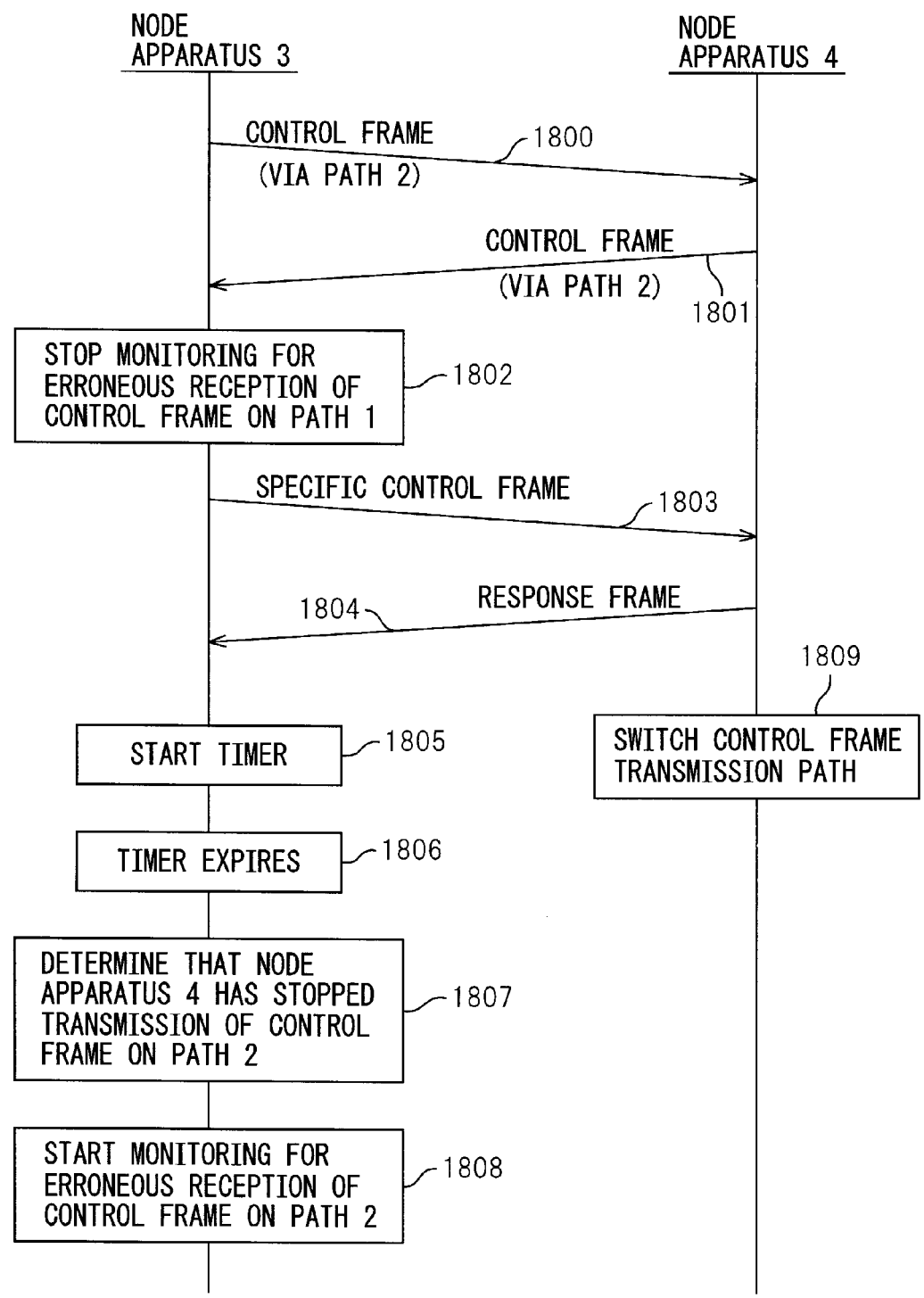
FIG. 18 is an explanatory diagram illustrating an eighth example of the control frame processing method according to the embodiment.

FIG. 18 is an explanatory diagram illustrating an eighth example of the control frame processing method according to the embodiment. The following operations 1800 to 1809 may be implemented as steps. At the time of the working/protection switching, the control frame is transferred via the path 2, i.e., the previous protection path, just like the control frame transmitted and received in operations 1800 and 1801, until the switching of the control frame transmission path is completed.

When the working/protection switching of the redundant paths occurs, the monitoring process stop unit 22 in operation 1802 causes the monitoring unit 21 to stop monitoring whether or not the control frame has been received via the path 1.

In operation 1803, the control frame transmitting unit 26 transmits the specific control frame to the node apparatus 4. By receiving the specific control frame, the node apparatus 4 can detect that there is a need to switch the control frame transmission path. The specific control frame may be created, for example, by setting a specific flag stored as control information in the control frame. In operation 1804, the control frame transmitting unit 44 creates a response frame for the specific control frame and transmits the response frame to the node apparatus 3.

In operation 1805, the timer 30 starts to count the time. In operation 1806, the timer 30 expires. When the timer 30 expires, the transmission stop determining unit 23 determines in operation 1807 that the node apparatus 4 has stopped the transmission of the control frame on the path 2. In operation 1808, the monitoring process start unit 24 causes the monitoring unit 21 to start monitoring whether or not the control frame has been received via the path 2.

The node apparatus 4 can be configured so that the switching of the control frame transmission path is completed before a certain time elapses after receiving the specific control frame in operation 1803. The expiration time of the timer 30 is set so that the timer 30 continues to count the time until the node apparatus 4 completes the switching of the control frame transmission path in operation 1809. Therefore, when the timer 30 expires, the transmission stop determining unit 23 can determine that the node apparatus 4 has stopped the transmission of the control frame on the path 2. Here, the order of operations 1802 and 1803 may be interchanged. Further, the order of operations 1804 and 1809 may also be interchanged.

According to the above example, whether the node apparatus 4 has stopped the transmission of the control frame on the path 2 can be determined without using the control frame. This serves, for example, to reduce the number of kinds of information to be stored in the control frame and enhance the efficiency in the use of bits in the control frame.

Figure 19:
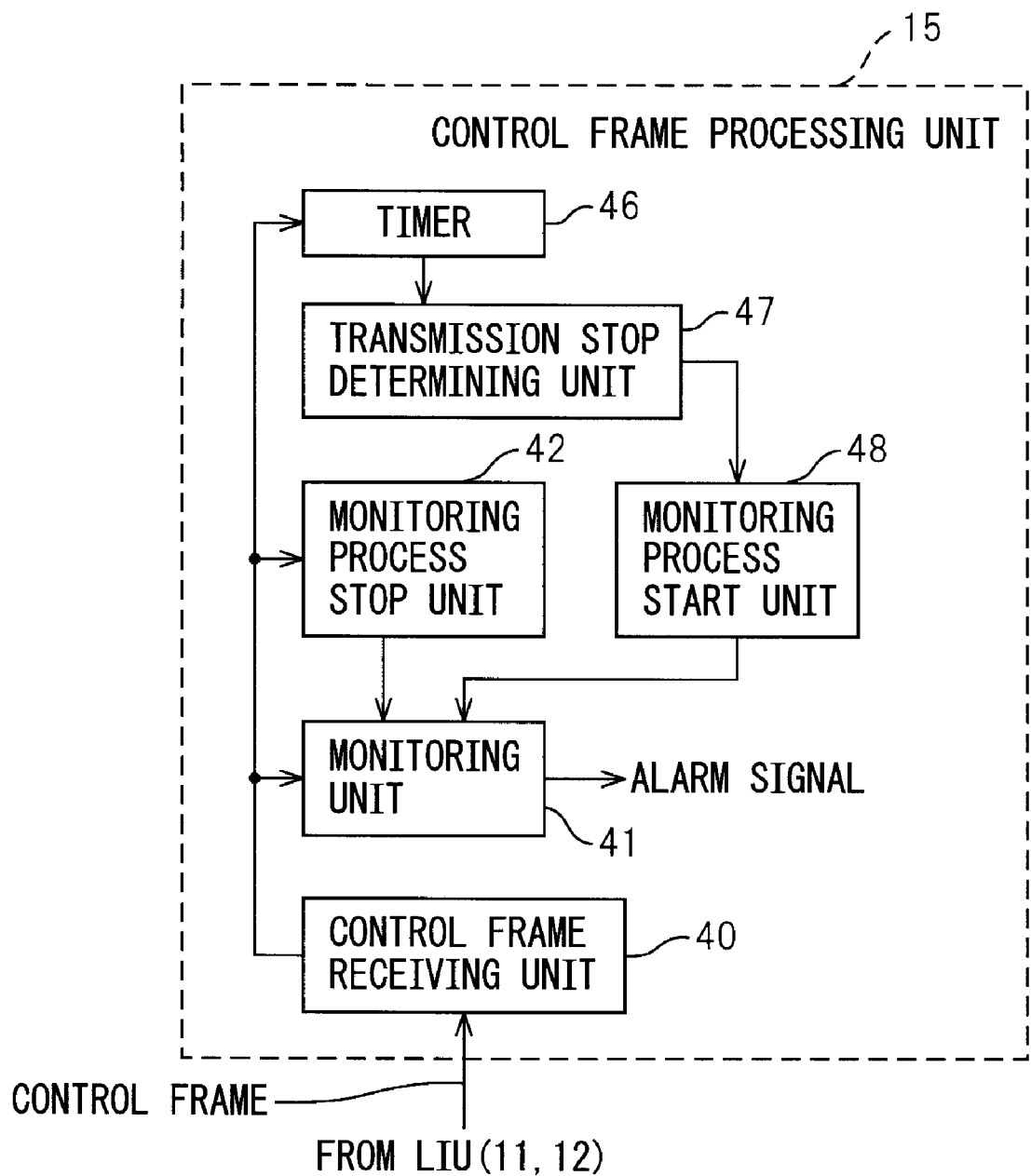
FIG. 19 is a diagram schematically illustrating a ninth configuration example of the control frame processing unit according to the embodiment.

FIG. 19 is a diagram schematically illustrating a ninth configuration example of the control frame processing unit according to the embodiment. The configuration of FIG. 19 illustrates the component elements used when the control frame processing unit 15 operates in the remote node apparatus 4. The same component elements as those depicted in FIG. 6 are designated by the same reference numerals as those used in FIG. 6.

Reference numeral 46 is a timer, 47 is a transmission stop determining unit, and 48 is a monitoring process start unit. The control frame processing unit 15 thus includes the control frame receiving unit 40, monitoring unit 41, monitoring process stop unit 42, timer 46, transmission stop determining unit 47, and monitoring process start unit 48.

The timer 46 starts the time counting when the specific control frame is received from the node apparatus 3, and expires after a certain expiration time. The specific control frame is, for example, a control frame that instructs the node apparatus 4 to cause the monitoring unit 41 to stop monitoring whether or not the control frame has been received via the previous working path, i.e., the path 1.

When the timer 46 expires, the transmission stop determining unit 47 determines that the node apparatus 3 has stopped the transmission of the control frame on the path 2. The monitoring process start unit 48 causes the monitoring unit 41 to start monitoring whether or not the control frame has been received via the new working path, i.e., the path 2.

Figure 20:
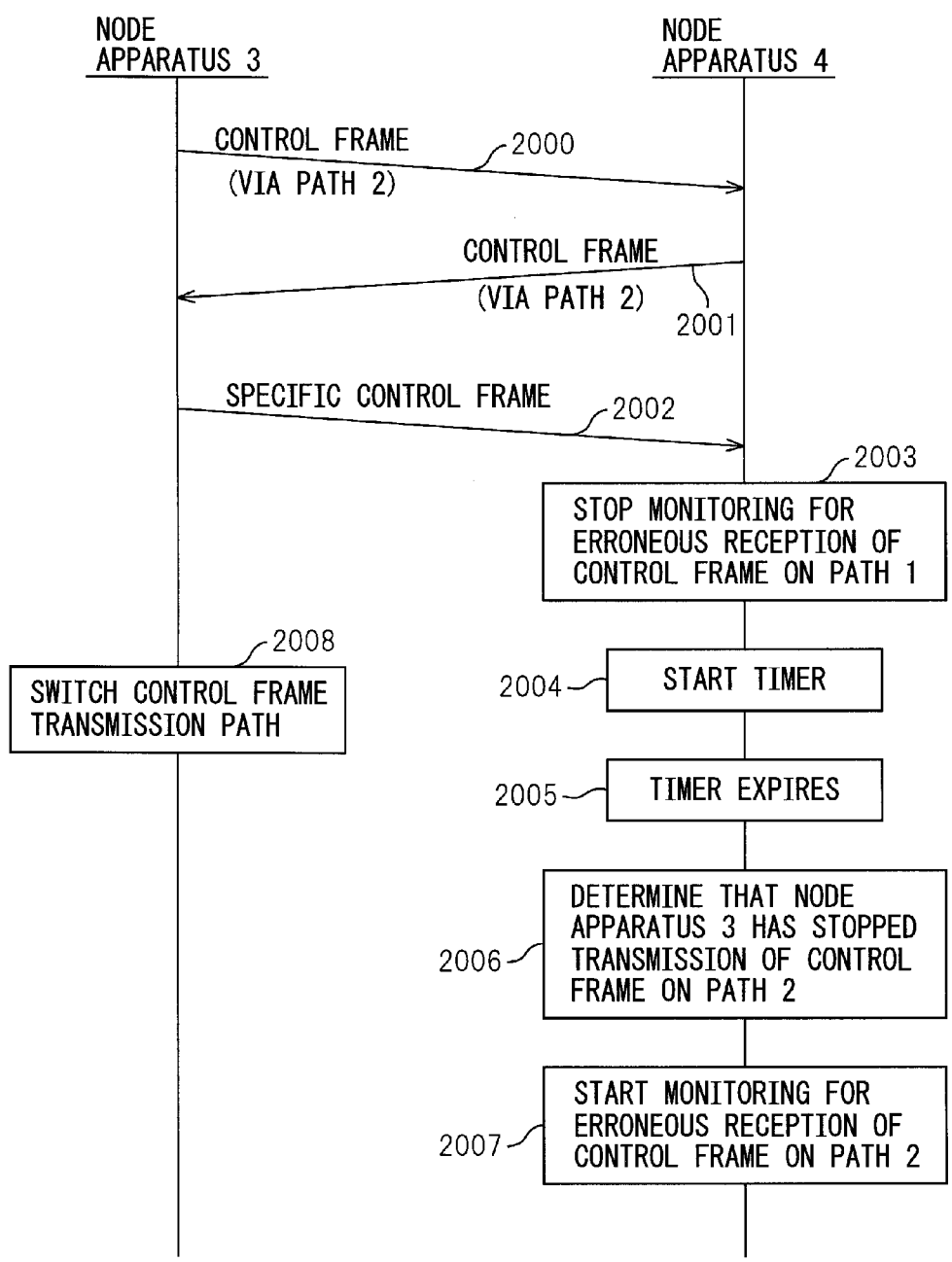
FIG. 20 is an explanatory diagram illustrating a ninth example of the control frame processing method according to the embodiment.

FIG. 20 is an explanatory diagram illustrating a ninth example of the control frame processing method according to the embodiment. The following operations 2000 to 2008 may be implemented as steps. At the time of the working/protection switching, the control frame is transferred via the path 2, i.e., the previous protection path, just like the control frame transmitted and received in operations 2000 and 2001, until the switching of the control frame transmission path is completed.

In operation 2002, the node apparatus 4 receives the specific control frame. The specific control frame may be created, for example, by setting a specific flag stored as control information in the control frame. In the following description, the specific control frame is, for example, a control frame used for the purpose of instructing the node apparatus 4 to cause monitoring unit 41 to stop monitoring whether or not the control frame has been received via the previous working path, i.e., the path 1. However, the specific control frame is not limited to the control frame used for this specific purpose. A control frame used for some other purpose may be used as the specific control frame.

When the specific control frame is received, the monitoring process stop unit 42 in operation 2003 causes the monitoring unit 41 to stop monitoring whether or not the control frame has been received via the path 1. In operation 2004, the timer 46 starts to count the time. In operation 2005, the timer 46 expires. When the timer 46 expires, the transmission stop determining unit 47 determines in operation 2006 that the node apparatus 3 has stopped the transmission of the control frame on the path 2. In operation 2007, the monitoring process start unit 48 causes the monitoring unit 41 to start monitoring whether or not the control frame has been received via the path 2.

The node apparatus 3 can be configured so that the switching of the control frame transmission path is completed before a certain time elapses after transmitting the specific control frame in operation 2002. The expiration time of the timer 46 is set so that the timer 46 continues to count the time until the node apparatus 3 completes the switching of the control frame transmission path in operation 2008. Therefore, when the timer 46 expires, the transmission stop determining unit 47 can determine that the node apparatus 3 has stopped the transmission of the control frame on the path 2. Here, the order of operations 2002 and 2008 may be interchanged. Further, the order of operations 2003 and 2004 may also be interchanged.

According to the above example, whether the node apparatus 3 has stopped the transmission of the control frame on the path 2 can be determined without using the control frame. This serves, for example, to reduce the number of kinds of information to be stored in the control frame and enhance the efficiency in the use of bits in the control frame.

Figure 21:
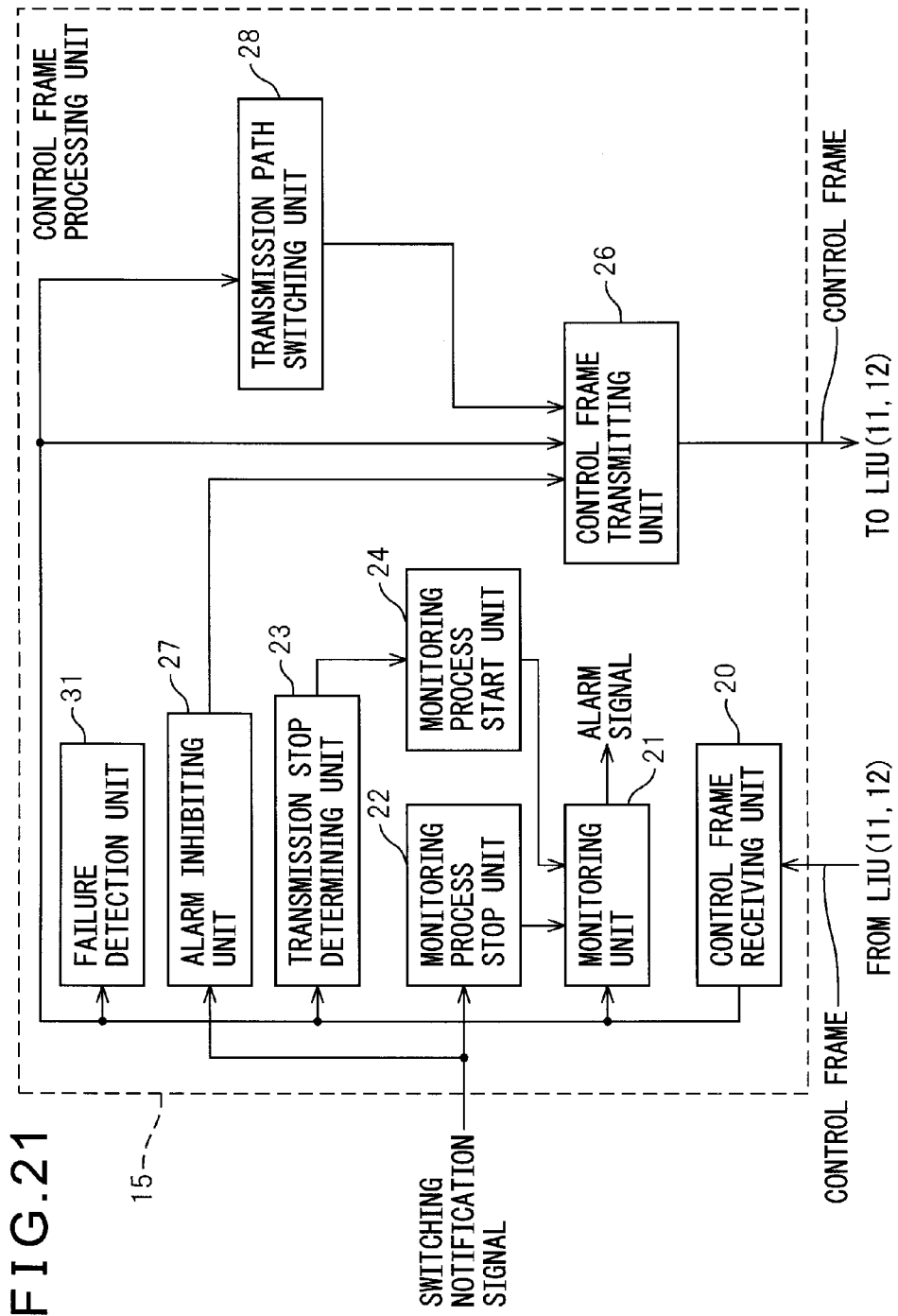
FIG. 21 is a diagram schematically illustrating a 10th configuration example of the control frame processing unit according to the embodiment.

FIG. 21 is a diagram schematically illustrating a 10th configuration example of the control frame processing unit according to the embodiment. The configuration of FIG. 21 illustrates the component elements used when the control frame processing unit 15 operates in the initiating node apparatus 3. The same component elements as those depicted in FIG. 9 are designated by the same reference numerals as those used in FIG. 9. Reference numeral 31 is a failure detection unit.

The control frame processing unit 15 here includes the control frame receiving unit 20, monitoring unit 21, monitoring process stop unit 22, transmission stop determining unit 23, and monitoring process start unit 24. The control frame processing unit 15 further includes the control frame transmitting unit 26, alarm inhibiting unit 27, transmission path switching unit 28, and failure detection unit 31.

Figure 22:
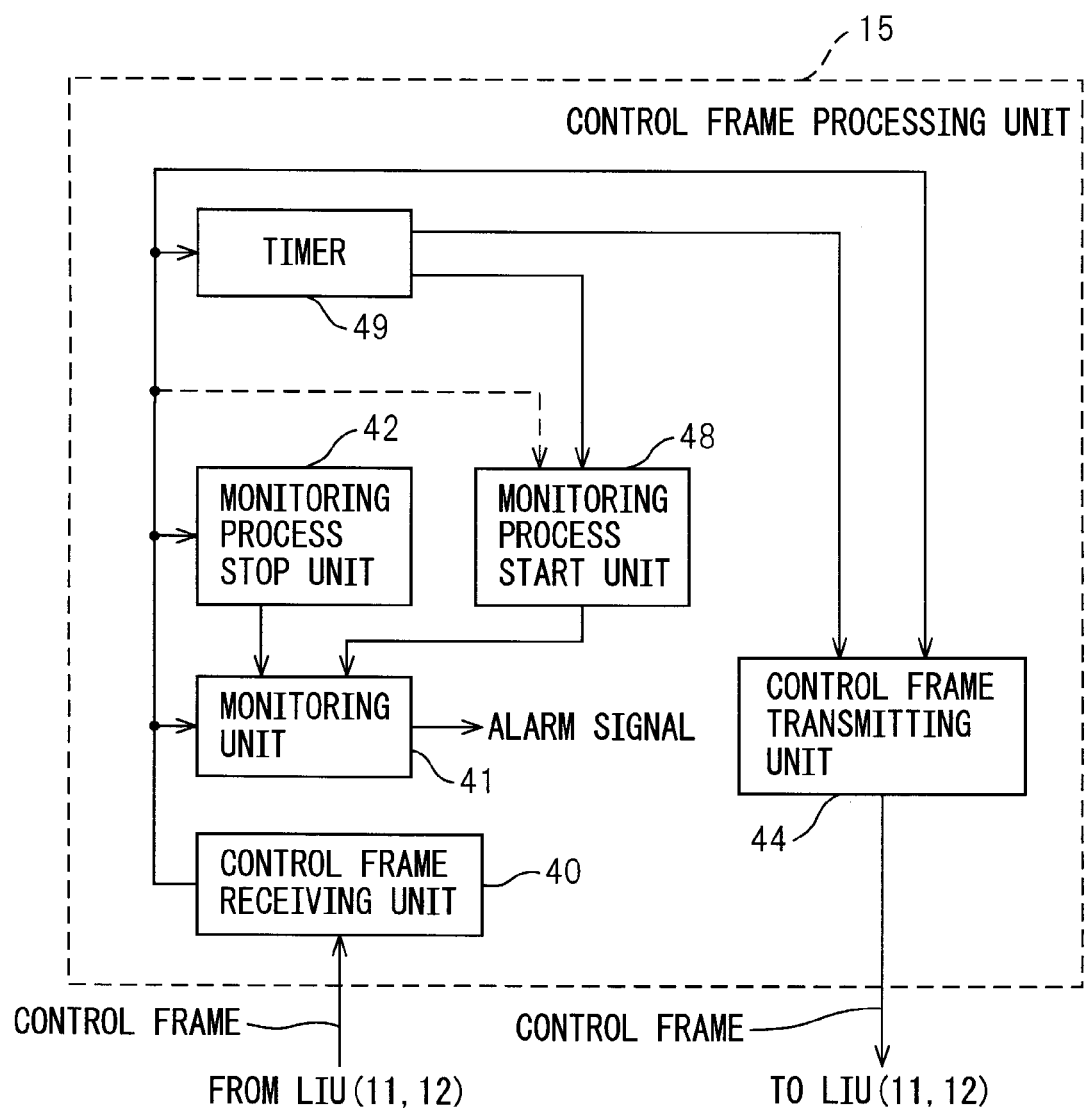
FIG. 22 is a diagram schematically illustrating an 11th configuration example of the control frame processing unit according to the embodiment.

FIG. 22 is a diagram schematically illustrating an 11th configuration example of the control frame processing unit according to the embodiment. The configuration of FIG. 22 illustrates the component elements used when the control frame processing unit 15 operates in the remote node apparatus 4. The same component elements as those depicted in FIG. 10 are designated by the same reference numerals as those used in FIG. 10. Reference numeral 48 is a monitoring process start unit, and 49 is a timer. The control frame processing unit 15 includes the control frame receiving unit 40, monitoring unit 41, monitoring process stop unit 42, and control frame transmitting unit 44. The control frame processing unit 15 further includes the monitoring process start unit 48 and timer 49.

The control frame transmitting unit 26 in the node apparatus 3 of FIG. 21 creates a first specific control frame. The first control frame is a control frame used for the purpose of instructing the monitoring process stop unit 42 to cause the monitoring unit 41 to stop monitoring whether or not the control frame has been received via the previous working path, i.e., the path 1.

When the response frame transmitted from the node apparatus 4 in response to the first specific control frame is received at the node apparatus 3, the control frame transmitting unit 26 creates a second specific control frame. In the following description, the second specific control frame is a control frame used for the purpose of notifying the node apparatus 4 that the node apparatus 3 has stopped the transmission of the control frame on the new working path, i.e., the path 2. However, the second specific control frame is not limited to the control frame used for this specific purpose. A control frame used for some other purpose may be used as the specific control frame. The first and second specific control frames are transmitted from the control frame transmitting unit 26 to the node apparatus 4.

If the node apparatus has received a response for the second specific control frame before receiving a response for the first specific control frame, the failure detection unit 31 determines that a failure has occurred. The control frame transmitting unit 44 in the node apparatus 4 of FIG. 22 creates the response frames for the first and second specific control frames, and transmits the respective response frames to the node apparatus 3.

The timer 49 starts the time counting when the first specific control frame is received from the node apparatus 3, and expires after a certain expiration time. The timer 49 may start the time counting either upon reception of the first specific control frame or upon transmission of the response frame for the first specific control frame. Alternatively, the timer 49 may be configured to start the time counting when the monitoring process stop unit 42 has stopped the monitoring operation of the monitoring unit 41 by responding to the reception of the first specific control frame.

When the second specific control frame is received from the node apparatus 3, the monitoring process start unit 48 causes the monitoring unit 41 to start monitoring whether or not the control frame has been received via the new working path, i.e., the path 2. When the timer 49 expires, the monitoring process start unit 48 likewise causes the monitoring unit 41 to start monitoring whether or not the control frame has been received via the new working path, i.e., the path 2. When the timer 49 expires, the control frame transmitting unit 44 creates the response frame for the second specific control frame, and transmits the response frame to the node apparatus 3.

Figure 23:
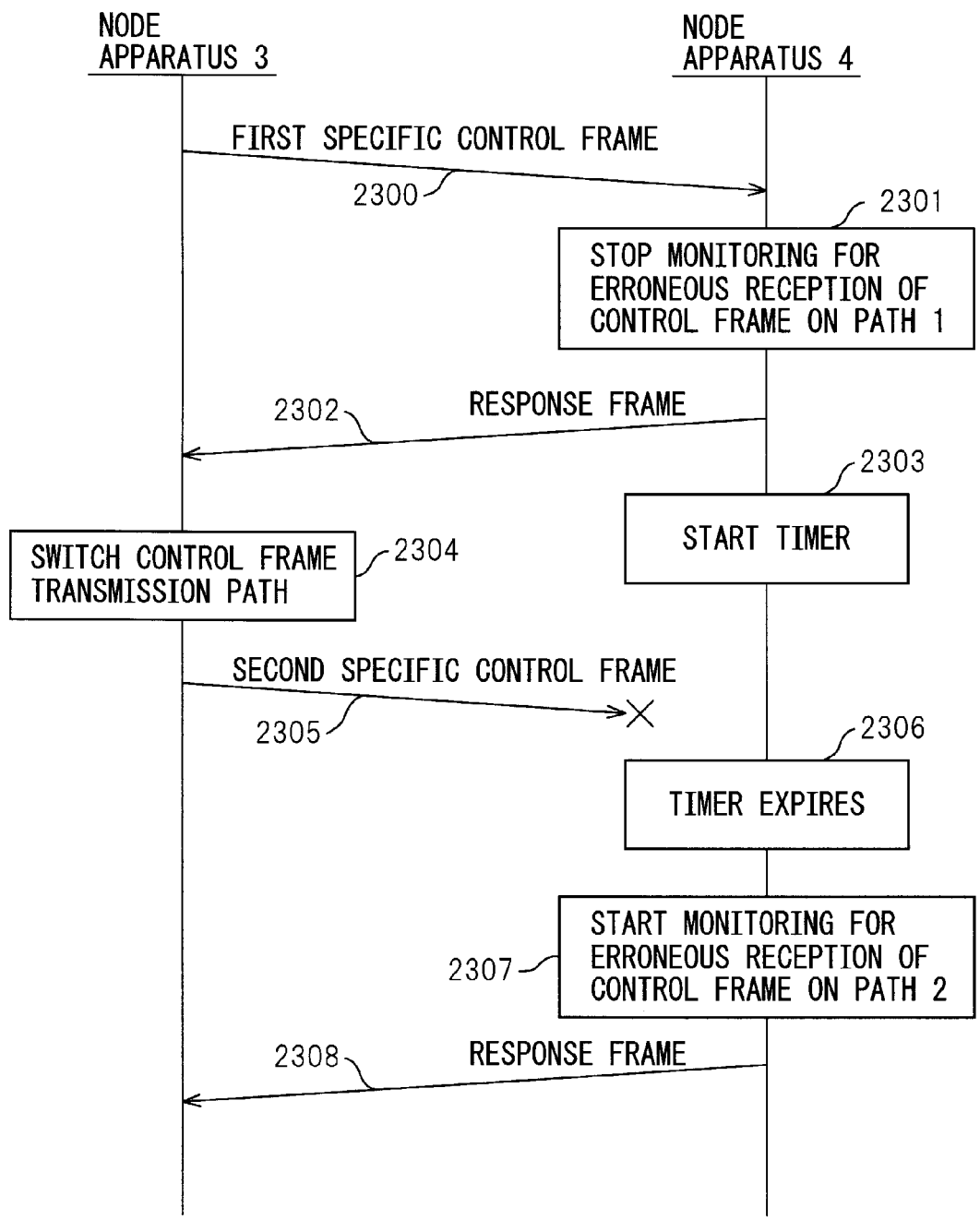
FIG. 23 is an explanatory diagram illustrating a 10th example of the control frame processing method according to the embodiment.
Figure 24:
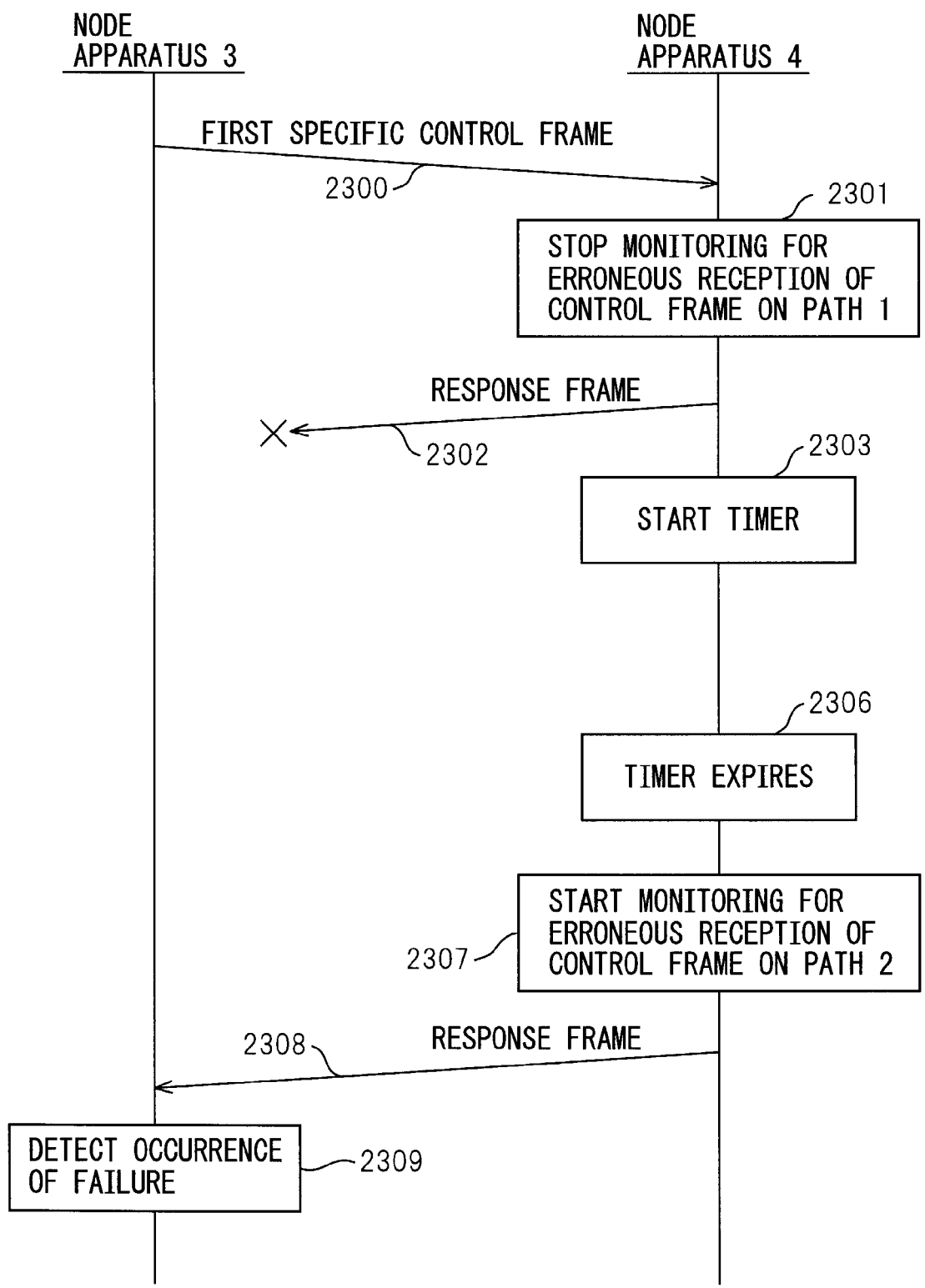
FIG. 24 is an explanatory diagram illustrating an 11th example of the control frame processing method according to the embodiment.

FIGS. 23 and 24 are explanatory diagrams illustrating 10th and 11th examples of the control frame processing method according to the embodiment. The following operations 2300 to 2309 may be implemented as steps.

Reference is made to FIG. 23. In operation 2300, the control frame transmitting unit 26 creates the first specific control frame. The first specific control frame is transmitted from the control frame transmitting unit 26 to the node apparatus 4. In operation 2301, the monitoring process stop unit 42 causes the monitoring unit 41 to stop monitoring whether or not the control frame has been received via the previous working path, i.e., the path 1.

In operation 2302, the control frame transmitting unit 44 in the node apparatus 4 creates the response frame for the first specific control frame, and transmits the response frame to the node apparatus 3. In operation 2303, the timer 49 starts to count the time. Operations 2301 to 2303 may be carried out in any order.

In the example of FIG. 23, the response frame for the first specific control frame arrives at the node apparatus 3. When the response frame for the first specific control frame is received at the node apparatus 3, the transmission path switching unit 28 in operation 2304 switches the control frame transmission path from the path 2 to path 1. Thus, the node apparatus 3 stops transmitting the control frame to the node apparatus 4 via the path 2. In operation 2305, the control frame transmitting unit 26 creates the second specific control frame and transmits it to the node apparatus 4. Here, the order of operations 2304 and 2305 may be interchanged.

In the example of FIG. 23, the second specific control frame is lost in the transmission and thus fails to arrive at the node apparatus 4. In operation 2306, the timer 49 expires, whereupon in operation 2307 the monitoring process start unit 48 causes the monitoring unit 41 to start monitoring whether or not the control frame has been received via the new working path, i.e., the path 2. In operation 2308, the control frame transmitting unit 44 creates the response frame for the second control frame, and transmits the response frame to the node apparatus 3. The order of operations 2307 and 2308 may be interchanged.

In the example of FIG. 23, when the timer 49 expires, the node apparatus 4 operates in the same manner as when the second specific control frame is received. Accordingly, if the second specific control frame fails to arrive at the node apparatus 4 because it is lost in the transmission, discrepancy can be prevented from arising between the operation of the node apparatus 3 and the operation of the node apparatus 4.

In the example of FIG. 24, the response frame transmitted in operation 2302 by responding to the first specific control frame is lost. In this case, since the response frame is not received, the node apparatus 3 does not transmit the second specific control frame. As a result, the timer 49 expires in operation 2306, and the response frame for the second specific control frame is transmitted to the node apparatus 3 in operation 2308.

In operation 2309, the failure detection unit 31 detects that a failure has occurred, because the response for the second specific control frame is received before receiving the response for the first specific control frame.

The possible cause for the node apparatus 4 failing to receive the second specific control frame it was expecting is either the loss of the response frame transmitted by responding to the first specific control frame or the loss of the second specific control frame in the transmission. In the illustrated example, if the node apparatus 4 fails to receive the second control frame, the timer 49 expires, whereupon the node apparatus 4 operates in the same manner as when the second specific control frame is received.

With this arrangement, in the case of the loss of the second control frame, no discrepancy arises between the operation of the node apparatus 3 and the operation of the node apparatus 4. On the other hand, in the case of the loss of the response frame for the first specific control frame, the failure can be detected by the failure detection unit 31 in the node apparatus 3.

In the present embodiment, the working/protection switching is initiated by the initiating node apparatus 3, and the remote node apparatus 4 carries out the switching in response to the control frame received from the node apparatus 3. Accordingly, by making provisions so that errors can be detected at the initiating node 3, not at the remote node 4, error handling in the control program for performing the switching operation can be facilitated.

Figure 25:
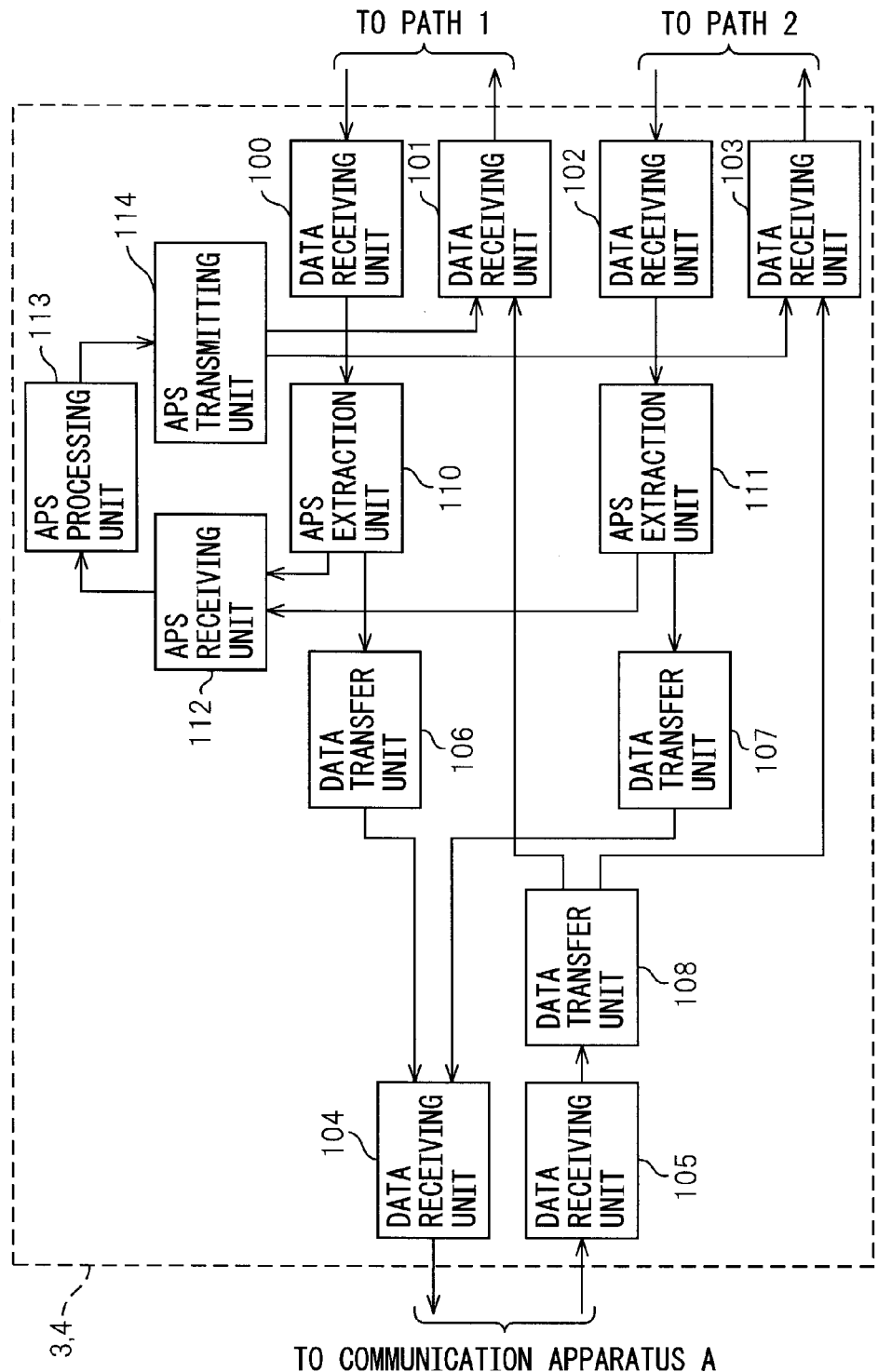
FIG. 25 is a diagram schematically illustrating a second configuration example of the node apparatus according to the embodiment.

FIG. 25 is a diagram schematically illustrating a second configuration example of the node apparatus according to the embodiment. Reference numerals 100, 102, and 105 are data receiving units, 101, 103, and 104 are data transmitting units, and 106 to 108 are data transfer units. Further, reference numerals 110 and 111 are APS extraction units, 112 is an APS receiving unit, 113 is an APS processing unit, and 114 is an APS transmitting unit.

The node apparatus 3 depicted in FIG. 1 includes the data receiving units 100, 102, and 105, data transmitting units 101, 103, and 104, and data transfer units 106 to 108. The node apparatus 3 further includes the APS extraction units 110 and 111, APS receiving unit 112, APS processing unit 113, and APS transmitting unit 114. The node apparatus 4 has the same configuration as the node apparatus 3.

The node apparatuses 3 and 4 may each be constructed, for example, as an Ethernet (registered trademark) transmission apparatus equipped with an Ethernet (registered trademark) linear protection mechanism defined in ITU-T Recommendation G.8031. The node apparatuses 3 and 4 control the protection switching by using APS frames. The APS frames may, for example, be Ethernet (registered trademark) OAM frames.

The data receiving units 100 and 102 are coupled to the transmission lines along which the paths 1 and 2 are set up, and receive data frames of prescribed format transmitted over the respective paths 1 and 2. The data receiving unit 105 is coupled to a transmission line leading to the communication apparatus A, and receives data frames transmitted over the path set up along the transmission line. The data transmitting units 101 and 103 are coupled to the transmission lines along which the paths 1 and 2 are set up, and transmit data frames of prescribed format over the respective paths 1 and 2. The data transmitting unit 104 is coupled to the transmission line leading to the communication apparatus A, and transmits data frames over the path set up along the transmission line.

The data transfer units 106, 107, and 108 determine the transfer routes for the data frames received by the respective data receiving units 100, 102, and 105, based on the header information carried in the respective data frames, and transfer the data frames to the appropriate data transmitting units 101, 103, and 104 according to their destinations.

The APS extraction units 110 and 110 extracts APS frames from the data frames received by the respective data receiving units 100 and 102, and transfer the extracted APS frames to the APS receiving unit 112.

The APS receiving unit 112 receives the APS frames from the APS extraction units 110 and 110, analyzes the frames, and supplies the control signals included in the APS frames to the APS processing unit 113. The APS receiving unit 112 also notifies the APS processing unit 113 of the ports coupled to the transmission lines over which the respective APS frames were received.

In accordance with the information stored in each APS frame, the APS processing unit 113 determines the path for transferring the traffic and the path for transferring the APS frame. If the APS frame is received via the working path, the APS processing unit 113 generates an alarm signal by detecting the erroneous path setting. Further, the APS processing unit 113 performs the APS-frame-related operations to be described hereinafter. The APS transmitting unit 114 creates APS frames in accordance with an instruction from the APS processing unit 113, and transfers them to the appropriate data transmitting units according to their destinations.

The above component elements 100 to 114 may be distributed across the plurality of units provided in the node apparatus 3. For example, in one configuration example, the component elements 100 to 114 are arranged in the following manner. The APS receiving unit 112, APS processing unit 113, and APS transmitting unit 114 may be provided in the control frame processing unit 15 depicted in FIG. 2.

The data receiving unit 100, data transmitting unit 101, and APS extraction unit 110 may be provided in the LIU 11 depicted in FIG. 2. The data receiving unit 102, data transmitting unit 103, and APS extraction unit 111 may be provided in the LIU 12. The data receiving unit 105 and data transmitting unit 104 may be provided in the LIU 13.

The data transfer unit 106 may be implemented using the switch 14 in combination with a function that assigns at the LIU 11 the identifier for identifying the interface of the switch 14 to which the LIU corresponding to the destination address carried in the header information of the received frame is coupled. Likewise, the data transfer unit 107 may be implemented using the switch 14 in combination with a function that assigns at the LIU 12 the identifier for identifying the interface of the switch 14 to which the LIU corresponding to the destination address carried in the header information of the received frame is coupled.

The above arrangement is only one example, and the component elements 100 to 114 can be arranged in various other ways in the node apparatus 3.

Figure 26:
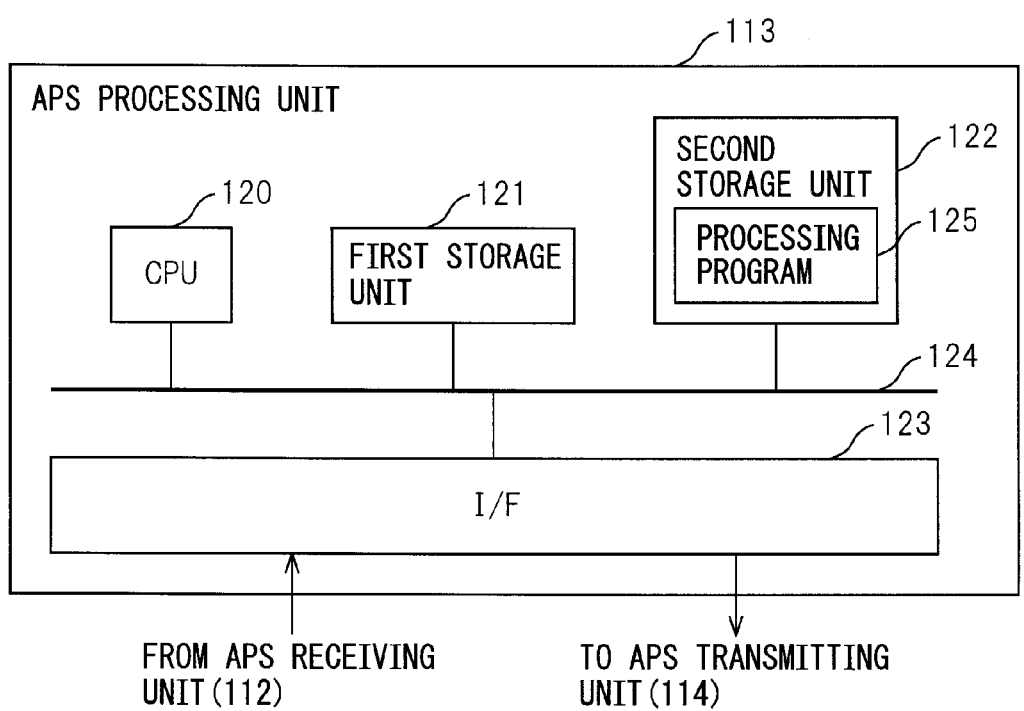
FIG. 26 is a diagram illustrating a hardware configuration in which an APS processing unit according to the embodiment is implemented using a CPU.

FIG. 26 is a diagram illustrating a hardware configuration in which the APS processing unit 113 according to the embodiment is implemented using a CPU. Reference numeral 120 is the CPU, 121 is a first storage unit, 122 is a second storage unit, and 123 is an interface. The first storage unit 12, the second storage unit 122, and the interface 123 are coupled to the CPU 120 via a bus 124.

The APS processing unit 113 thus includes the CPU 120, first storage unit 12, second storage unit 122, and interface 123. The CPU 120 controls the operation of the APS processing unit 113 by executing a processing program 125 stored in the second storage unit 122. The first storage unit 121 stores data for the execution of the processing program 125 by the CPU 120 and temporary data generated during the execution of the processing program 125. The first storage unit 121 may be constructed, for example, from a random-access memory. The second storage unit 122 is a nonvolatile storage unit that stores the processing program 125 and various kinds of setup data for the operation of the APS processing unit 113.

The interface 123 is an interface unit for transferring data between the APS processing unit 113 and the APS receiving unit 112 and APS transmitting unit 114. The functions of the APS receiving unit 112 and APS transmitting unit 114 may be implemented by the CPU 120 executing the processing program 125. In this case, the interface 123 is an interface unit for transferring data between the APS processing unit 113 and the APS extraction units 110 and 111 and data transmitting units 101 and 103.

Figure 27:
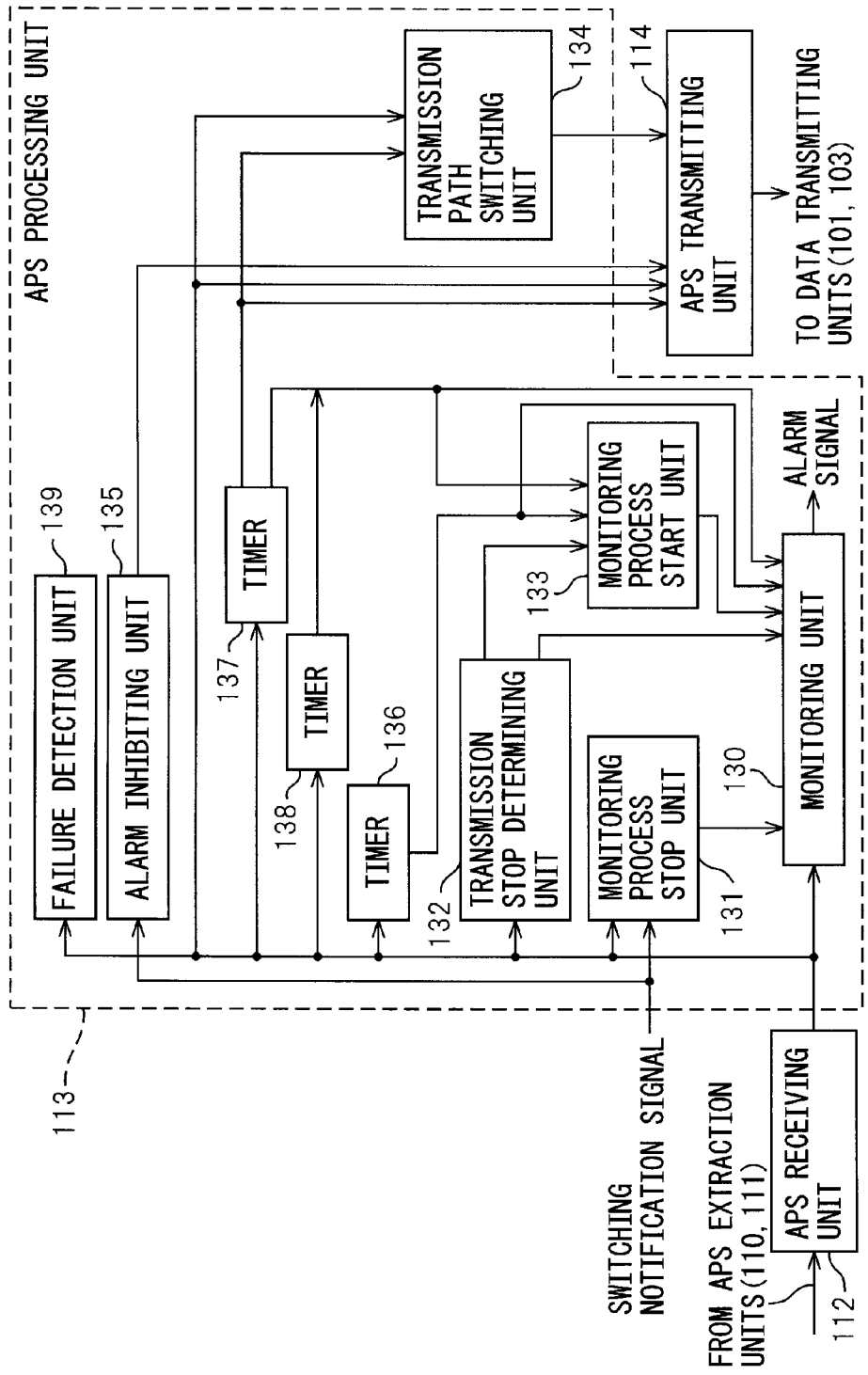
FIG. 27 is a block diagram illustrating a first example of the APS processing unit according to the embodiment.

FIG. 27 is a block diagram illustrating a first example of the APS processing unit 113 according to the embodiment. Reference numeral 130 is a monitoring unit, 131 is a monitoring process stop unit, 132 is a transmission stop determining unit, 133 is a monitoring process start unit, and 134 is a transmission path switching unit.

Reference numeral 135 is an alarm inhibiting unit, 136 is a first timer, 137 is a second timer, 138 is a third timer, and 139 is a failure detection unit. The functions of the component elements 130 to 139 are implemented by the CPU 120 of FIG. 26 executing the processing program 125. The functions of the component elements 130 to 139 will be described below.

The APS processing unit 113 thus includes the monitoring unit 130, monitoring process stop unit 131, transmission stop determining unit 132, monitoring process start unit 133, and transmission path switching unit 134. The APS processing unit 113 further includes the alarm inhibiting unit 135, first timer 136, second timer 137, third timer 138, and failure detection unit 139.

The monitoring unit 130 monitors whether or not the APS frame has been received via the path used as the working path. If the APS frame has been received via the working path, the monitoring unit 130 generates an alarm by determining that an erroneous path setting is detected.

At the time of the working/protection switching, the monitoring process stop unit 131, in response to a switching notification signal, causes the monitoring unit 130 to stop monitoring whether or not the APS frame has been received via the previous working path. Further, when a switching notification frame is received from the initiating node, the monitoring process stop unit 131 causes the monitoring unit 130 to stop monitoring whether or not the APS frame has been received via the previous working path.

The switching notification frame is an APS frame that is transmitted from the initiating node to the remote node when performing the working/protection switching. For example, the switching notification frame may be an APS frame in which a switching flag is set as illustrated below.

Figure 28:
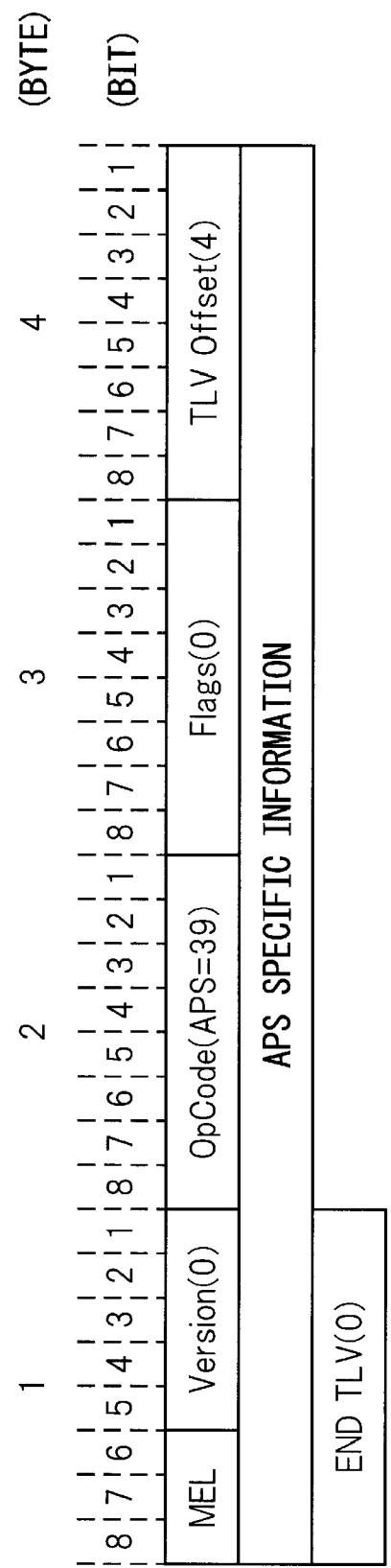
FIG. 28 is an explanatory diagram of an APS frame.

FIG. 28 is an explanatory diagram of the APS frame. The OAM frame used as the APS frame includes a "MEL" field, a "Version" field, an "OpCode" field, a "Flags" field, a "TLV Offset" field, an "APS specific information" field, and an "END TLV" field.

The "MEL" field carries a maintenance entity group level for the start and end node apparatuses between which redundant paths are formed. In the case of the APS frame, values "0", "39", "0", "4", and "0" are stored in the "Version" field, the "OpCode" field, the "Flags" field, the "TLV Offset" field, and the "END TLV" field, respectively.

Figure 29:
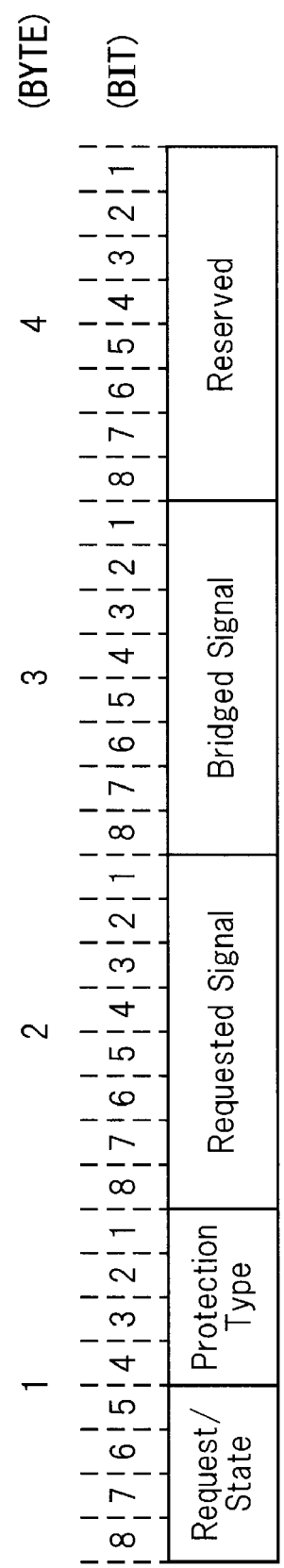
FIG. 29 is an explanatory diagram illustrating the format of APS specific information contained in the APS frame.

FIG. 29 is an explanatory diagram illustrating the format of the APS specific information carried in the APS frame. The APS specific information includes a "Request/State" field, a "Protection Type" field, a "Requested Signal" field, a "Bridged Signal" field, and a "Reserved" field.

The "Request/State" field carries control information indicating a switching request or state. In the illustrated example, the "Request/State" field is assigned a four-bit data area. The switching flag may be set by storing a prescribed value in the "Request/State" field. The prescribed value here may be, for example, "0110" which is not currently used.

Reference is made to FIG. 27. When a stop notification frame is received from the initiating node, the transmission stop determining unit 132 determines that the initiating node has stopped transmitting the APS frame via the new working path or when a stop response frame is received from the remote node, the transmission stop determining unit 132 determines that the remote node has stopped transmitting the APS frame via the new working path.

The stop notification frame is the APS frame that the initiating node transmits to the remote node when the initiating node has stopped the transmission of the APS frame on the new working path. The stop response frame is an APS frame responding to the stop notification frame, and is transmitted from the remote node to the initiating node when the remote node has stopped the transmission of the APS frame on the new working path.

The stop notification frame and the stop response frame may each be created by setting a stop flag in the APS frame by storing a prescribed value in the "Request/State" field. The prescribed value here may be, for example, "0011" which is not currently used.

When the transmission stop determining unit 132 determines that the transmission of the APS frame on the new working path has been stopped, the monitoring process start unit 133 causes the monitoring unit 130 to start monitoring whether or not the APS frame has been received via the new working path. On the other hand, if the first timer 136 expires, the monitoring process start unit 133 causes the monitoring unit 130 to resume the monitoring process for monitoring whether or not the APS frame has been received via the previous working path. Further, if the second timer 137 or the third timer 138 expires, the monitoring process start unit 133 causes the monitoring unit 130 to start monitoring whether or not the APS frame has been received via the new working path.

When a switching response frame is received from the remote node, the transmission path switching unit 134 switches the APS frame transmission path from the previous protection path to the new protection path. That is, the transmission path switching unit 134 switches the transmission path from the new working path to the previous working path.

The switching response frame is an APS frame responding to the switching notification frame, and is transmitted when the monitoring unit 130 in the remote node has stopped the monitoring process for monitoring whether or not the APS frame has been received via the previous working path. The switching response frame may be created, for example, by setting the switching flag in the APS frame.

Further, when the second timer 127 expires, the transmission path switching unit 134 switches the APS frame transmission path from the previous protection path to the new protection path.

The alarm inhibiting unit 135 inhibits the alarm from being generated by the monitoring unit 130 in the remote node, by transmitting the switching notification frame from the APS transmitting unit 114 to the remote node at the time of the working/protection switching.

The first timer 136 in the initiating node monitors an allowable waiting time that can elapse from the transmission of the switching notification frame until the switching response frame responding to the switching notification frame is received. The second timer 137 in the remote node monitors an allowable waiting time that can elapse from the transmission of the switching response frame until the stop notification frame is received from the initiating node that received the switching response frame. The third timer 138 in the initiating node monitors an allowable waiting time that can elapse from the transmission of the stop notification frame until the stop response frame responding to the stop notification frame is received.

The APS transmitting unit 114 creates the switching notification frame and transmits it to the remote node in accordance with an instruction from the alarm inhibiting unit 135. When the switching notification frame or the stop notification frame is received, the APS transmitting unit 114 creates the switching response frame or the stop response frame, respectively, and transmits the response frame to the initiating node. When the switching response frame is received, the APS transmitting unit 114 creates the stop notification frame and transmits it to the remote node. If the second timer 137 has expired, the APS transmitting unit 114 creates the switching response frame and transmits it to the initiating node.

If the stop response frame is received from the remote node before receiving the switching response frame, the failure detection unit 139 determines that a failure has occurred that can cause a discrepancy between the operation of the initiating node and the operation of the remote node. The failure detection unit 139 may determine that the above failure has occurred, for example, if the stop response frame is received from the remote node when the third timer 138 has not yet started to count the time.

Figure 30:
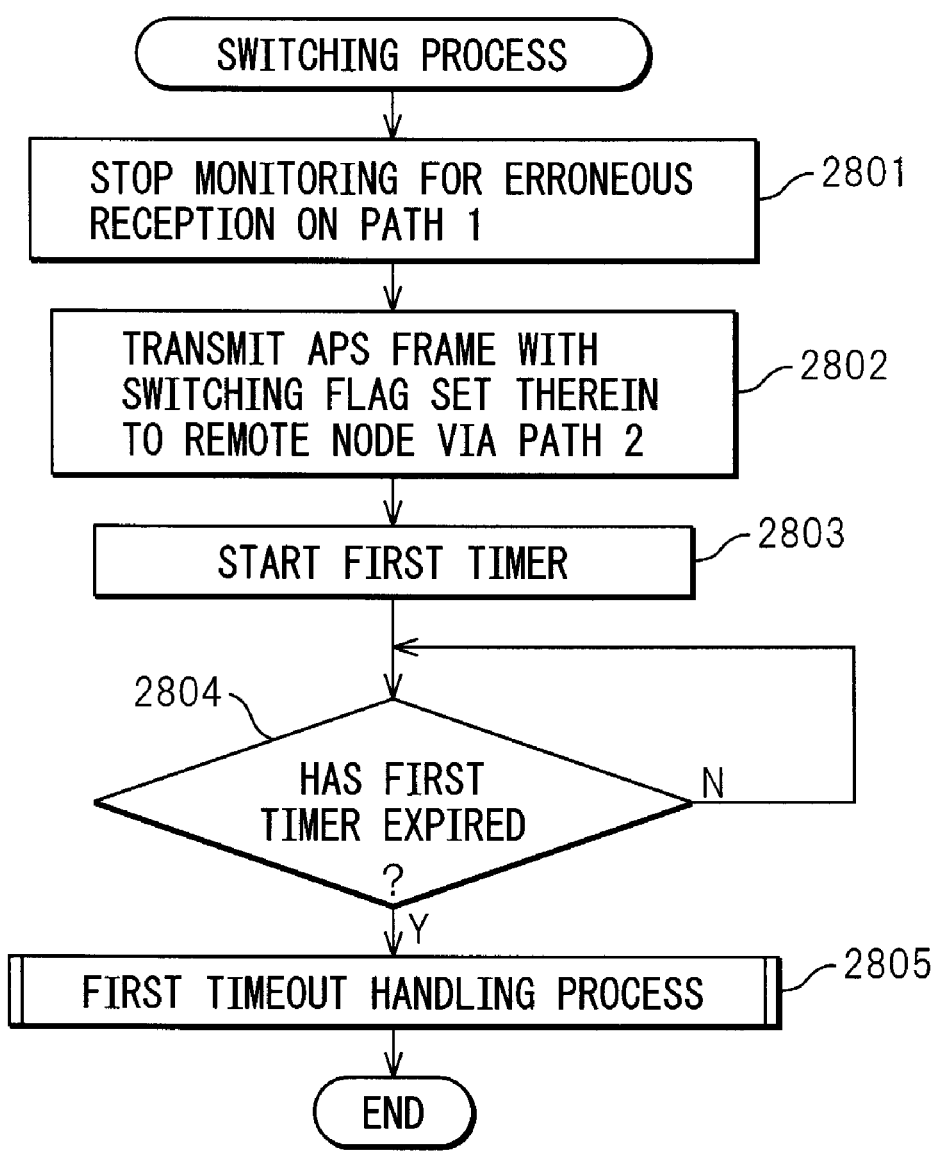
FIG. 30 is an explanatory diagram illustrating a first example of a switching process performed at an initiating node.

FIG. 30 is an explanatory diagram illustrating a first example of a switching process performed at the initiating node. In an alternative embodiment, the following operations 2801 to 2805 may be implemented as steps.

In operation 2801, when the working/protection switching of the redundant paths occurs, the monitoring process stop unit 131 in the node apparatus 3 causes the monitoring unit 130 to stop monitoring whether or not the control frame has been received via the path 1.

Figure 31:
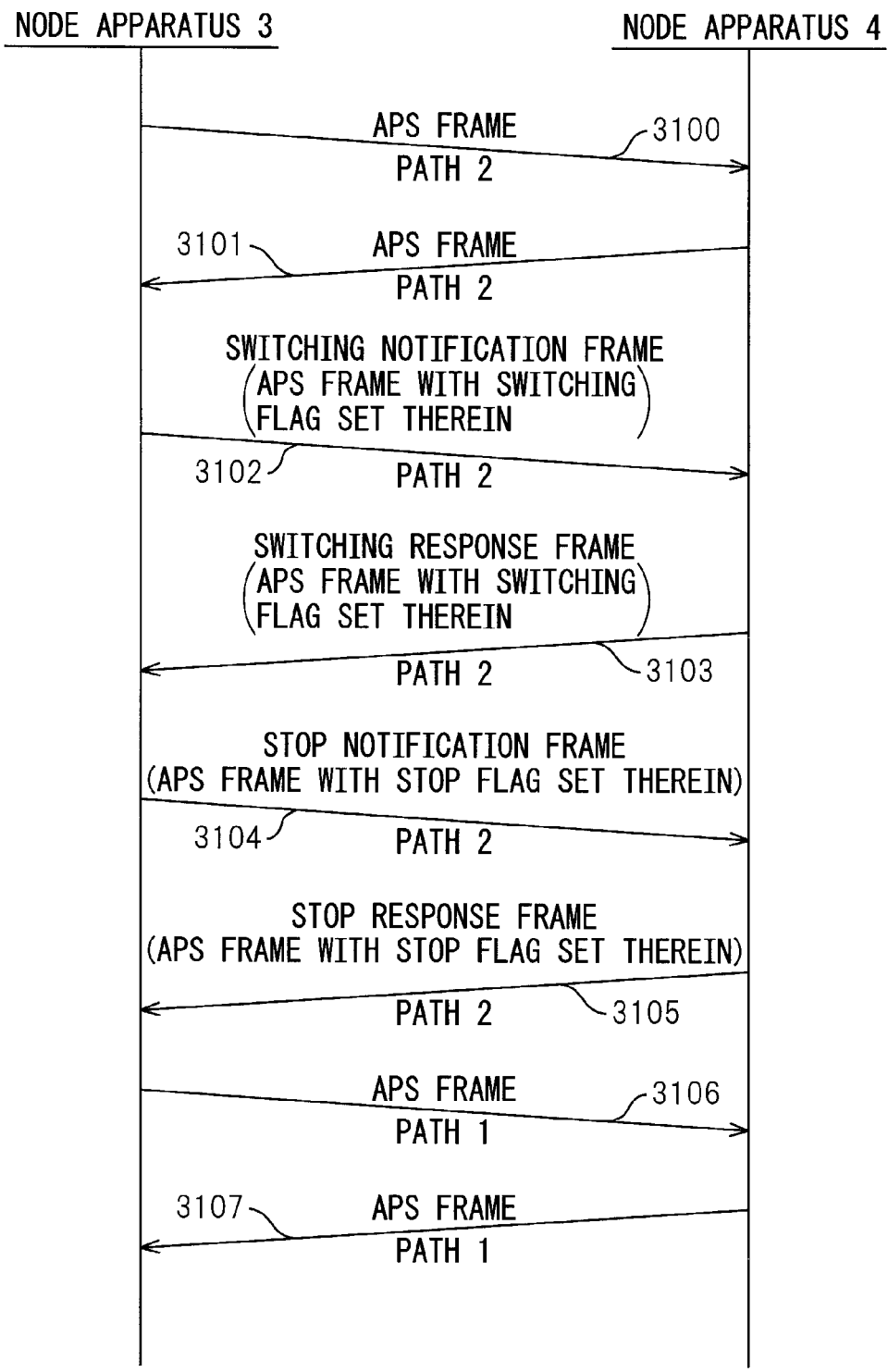
FIG. 31 is an explanatory diagram illustrating a first example of an APS frame transmit/receive process according to the embodiment.

In operation 2802, the alarm inhibiting unit 135 instructs the control frame transmitting unit 114 to transmit the switching notification frame to the node apparatus 4. FIG. 31 is an explanatory diagram illustrating a first example of an APS frame transmit/receive process according to the embodiment. In an alternative embodiment, the following operations 3100 to 3107 may be implemented as steps.

At the time of the working/protection switching, the APS frame is transferred via the path 2, i.e., the previous protection path, as indicated in operations 3100 and 3101, until the switching of the APS frame transmission path is completed. In operation 2802 of FIG. 30, the switching notification frame is transmitted from the node apparatus 3 to the node apparatus 4, as indicated in operation 3102 of FIG. 31.

Reference is made to FIG. 30. In operation 2803, the first timer 136 starts. The order of operations 2802 and 2803 may be interchanged. In operation 2804, the first timer 136 monitors whether the certain allowable waiting time has elapsed or not. If the certain allowable waiting time has elapsed (Y in operation 2804), the node apparatus 3 performs in operation 2805 a first timeout handling process to be described later. If the certain allowable waiting time has not yet elapsed (N in operation 2804), the node apparatus 3 repeats operation 2804 to wait for the switching response frame to arrive.

Figure 32:
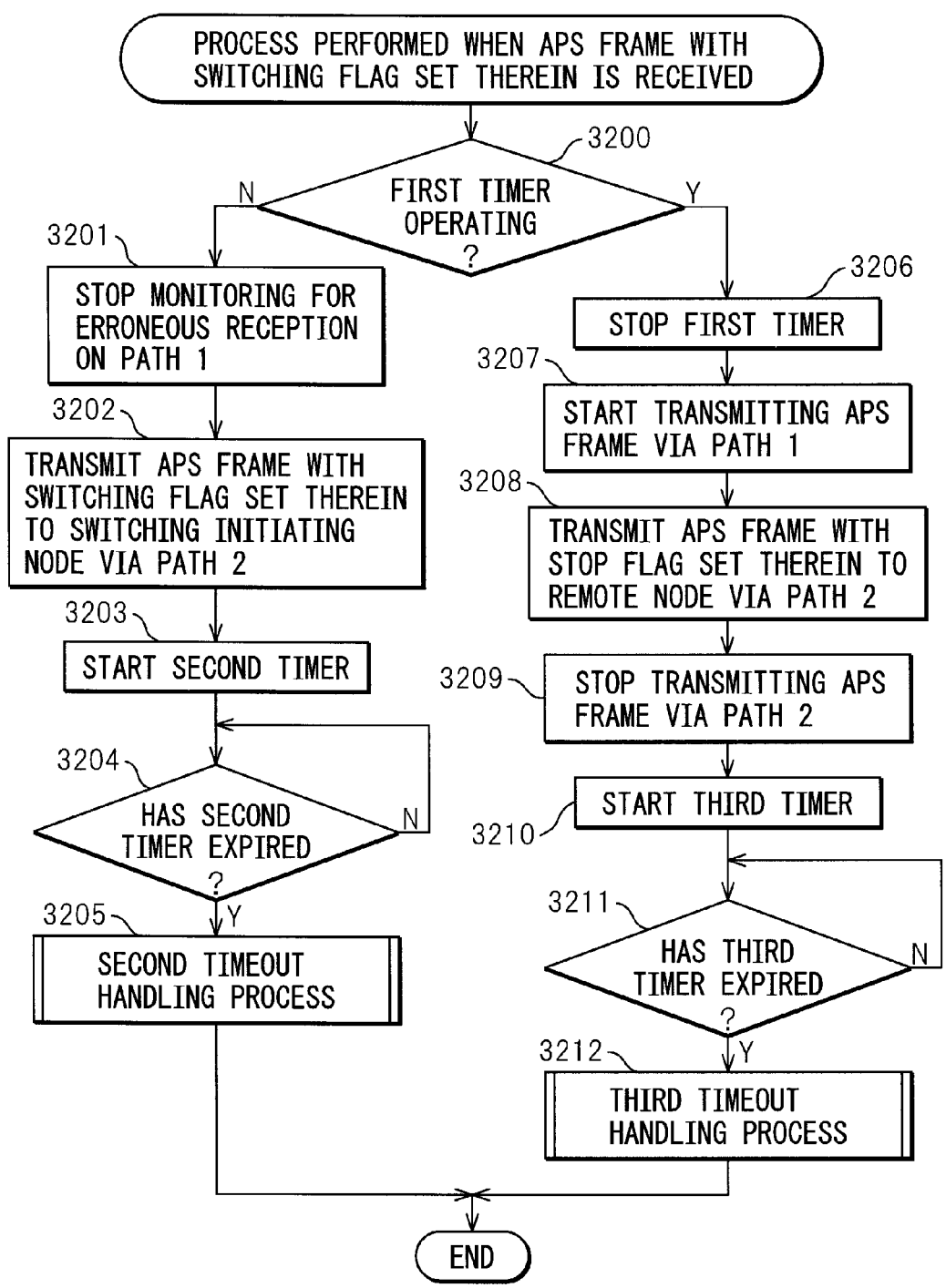
FIG. 32 is an explanatory diagram illustrating a first example of the process performed when an APS frame in which a switching flag is set is received.

FIG. 32 is an explanatory diagram illustrating a first example of the process performed when the APS frame in which the switching flag is set is received. The APS frame in which the switching flag is set is either the switching notification frame or the switching response frame. In an alternative embodiment, the following operations 3200 to 3212 may be implemented as steps.

In operation 3200, the APS processing unit 113 in the node apparatus that received the APS frame in which the switching flag is set checks to see whether the first timer 136 is operating or not. If the first timer 136 is not operating (N in operation 3200), the receiving node apparatus is the remote node; therefore, the APS processing unit 113 proceeds to operation 3201. On the other hand, if the first timer 136 is operating (Y in operation 3200), the receiving node apparatus is the initiating node; therefore, the APS processing unit 113 proceeds to operation 3206.

Operations 3201 to 3205 are carried out at the node apparatus 4 which is the remote node. In operation 3201, the monitoring process stop unit 131 causes the monitoring unit 130 to stop monitoring whether or not the APS frame has been received via the path 1.

In operation 3202, the APS frame transmitting unit 114 transmits the switching response frame to the node apparatus 3 via the path 2. In operation 3202, the switching response frame is transmitted from the node apparatus 4 to the node apparatus 3, as indicated in operation 3103 of FIG. 31.

In operation 3203 of FIG. 32, the second timer 137 starts. Operations 3201 to 3203 may be carried out in any order. In operation 3204, the second timer 137 monitors whether the certain allowable waiting time has elapsed or not. If the certain allowable waiting time has elapsed (Y in operation 3204), the node apparatus 4 performs in operation 3205 a second timeout handling process to be described later. If the certain allowable waiting time has not yet elapsed (N in operation 3204), the node apparatus 4 repeats operation 3204 to wait for the stop notification frame to arrive.

Operations 3206 to 3212 are carried out at the node apparatus 3 which is the initiating node. In operation 3206, the time counting operation of the first timer 136 is stopped. In operation 3207, the transmission path switching unit 134 causes the APS transmitting unit 114 to start transmitting the APS frame via the path 1, by switching the APS frame transmission path from the path 2 to the path 1.

In operation 3208, the APS transmitting unit 114 transmits the stop notification frame to the node apparatus 4 via the path 2. In operation 3208, the stop notification frame is transmitted from the node apparatus 3 to the node apparatus 4, as indicated in operation 3104 of FIG. 31.

In operation 3209 of FIG. 32, the APS transmitting unit 114 stops transmitting the APS frame via the path 2 as the APS frame transmission path is switched. In operation 3210, the third timer 138 starts. Operations 3207 to 3210 may be carried out in any order.

In operation 3211, the third timer 138 monitors whether the certain allowable waiting time has elapsed or not. If the certain allowable waiting time has elapsed (Y in operation 3211), the node apparatus 3 performs in operation 3212 a third timeout handling process to be described later. If the certain allowable waiting time has not yet elapsed (N in operation 3211), the node apparatus 3 repeats operation 3211 to wait for the stop response frame to arrive.

Figure 33:
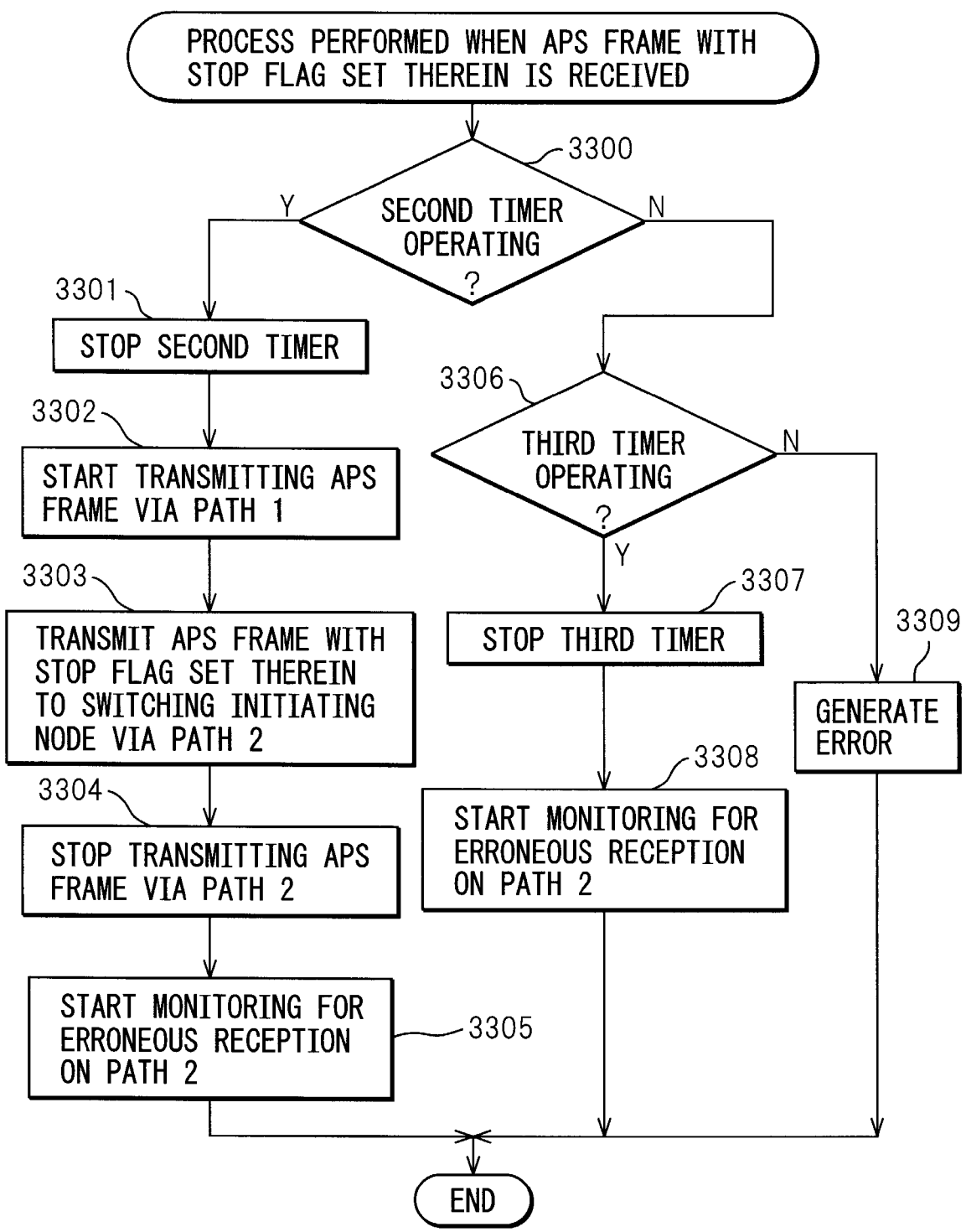
FIG. 33 is an explanatory diagram illustrating an example of the process performed when an APS frame in which a stop flag is set is received.

FIG. 33 is an explanatory diagram illustrating an example of the process performed when the APS frame in which the stop flag is set is received. The APS frame in which the stop flag is set is either the stop notification frame or the stop response frame. In an alternative embodiment, the following operations 3300 to 3309 may be implemented as steps.

In operation 3300, the APS processing unit 113 in the node apparatus that received the APS frame in which the stop flag is set checks to see whether the second timer 137 is operating or not. If the second timer 137 is operating (Y in operation 3300), the receiving node apparatus is the remote node; therefore, the APS processing unit 113 proceeds to operation 3301. On the other hand, if the second timer 137 is not operating (N in operation 3300), the receiving node apparatus is the initiating node; therefore, the APS processing unit 113 proceeds to operation 3306.

Operations 3301 to 3305 are carried out at the node apparatus 4 which is the remote node. In operation 3301, the time counting operation of the second timer 137 is stopped. In operation 3302, the transmission path switching unit 134 causes the APS transmitting unit 114 to start transmitting the APS frame via the path 1, by switching the APS frame transmission path from the path 2 to the path 1.

In operation 3303, the APS transmitting unit 114 transmits the stop response frame to the node apparatus 3 via the path 2. In operation 3303, the stop response frame is transmitted from the node apparatus 4 to the node apparatus 3, as indicated in operation 3105 of FIG. 31. Since the APS frame transmission path is thus switched at both the node apparatus 3 and the node apparatus 4, the APS frame is transmitted via the path 1, i.e., the new protection path, as indicated by operations 3106 and 3107.

Reference is made to FIG. 33. In operation 3304, the APS transmitting unit 114 stops transmitting the APS frame via the path 2 as the APS frame transmission path is switched. In operation 3305, the transmission stop determining unit 132 that received the stop notification frame determines that the node apparatus 3 has stopped transmitting the APS frame via the path 2. The monitoring process start unit 133 causes the monitoring unit 130 to start monitoring whether or not the APS frame has been received via the path 2. Here, operations 3301 to 3305 may be carried out in any order.

Operations 3306 to 3309 are carried out at the node apparatus 3 which is the initiating node. In operation 3306, the failure detection unit 139 checks to see whether the third timer 138 is operating or not. If the third timer 138 is operating (Y in operation 3306), the process proceeds to operation 3307. On the other hand, if the third timer 138 is not operating (N in operation 3306), the process proceeds to operation 3309.

In operation 3307, the time counting operation of the third timer 138 is stopped. In operation 3308, the transmission stop determining unit 132 that received the stop response frame determines that the node apparatus 4 has stopped transmitting the APS frame via the path 2. The monitoring process start unit 133 causes the monitoring unit 130 to start monitoring whether or not the APS frame has been received via the path 2. The order of operations 3307 and 3308 may be interchanged. In operation 3309, the failure detection unit 139 determines that a failure has occurred that can cause a discrepancy between the operation of the initiating node and the operation of the remote node.

Figure 34:
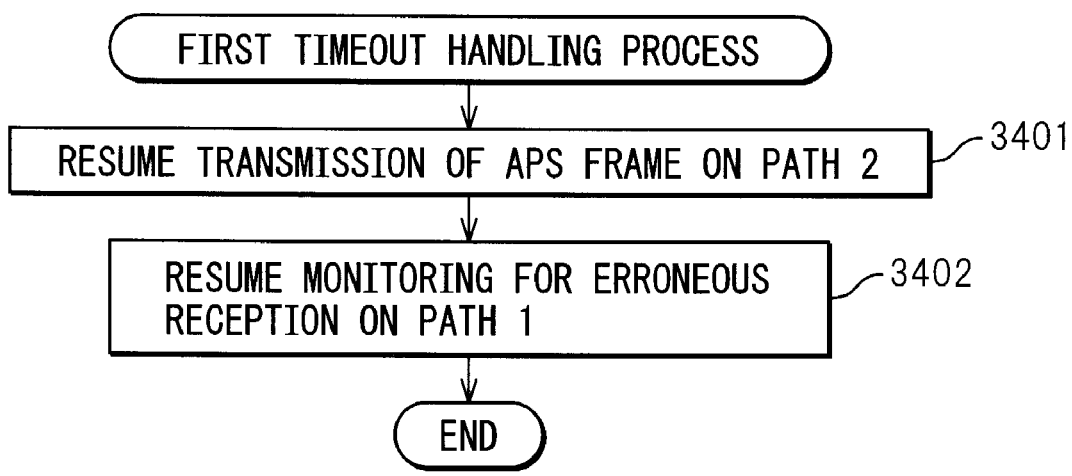
FIG. 34 is an explanatory diagram of a first timeout handling process.

FIG. 34 is an explanatory diagram of the first timeout handling process 2805. The following operations 3401 and 3402 may be implemented as steps. If the first timer 136 has expired, i.e., if the node apparatus 3 has failed to receive the switching response frame, the node apparatus 3 aborts the APS-frame transmission path switching process once started. Therefore, in operation 3401, the APS transmitting unit 114 in the node apparatus 3 resumes the transmission of the APS frame on the path 2. In operation 3402, the monitoring process start unit 133 in the node apparatus 3 causes the monitoring unit 130 to resume the monitoring process for monitoring whether or not the APS frame has been received via the path 1, i.e., the previous working path.

The cause for the failure to receive the switching response frame is either the loss of the switching notification frame or the loss of the switching response frame. Supposing that the node apparatus 3 proceeded with the APS-frame transmission path switching process by erroneously determining that the cause for the failure to receive the switching response frame was the loss of the switching response frame when the actual cause was the loss of the switching notification frame. In this case, a discrepancy would occur between the operation of the node apparatus 3 that proceeded with the switching process and the operation of the node apparatus 4 that had not yet initiated the switching process.

The switching notification frame is the first APS frame to be transmitted when performing the APS-frame transmission path switching process between the initiating node and the remote node according to the embodiment. Therefore, when transmitting the switching response frame, it may not be known whether the path used to convey the switching notification frame is in a condition that can transmit the APS frame properly.

If this is the case, it is reasonable to assume that the cause for the failure to receive the switching response frame is the loss of the switching notification frame rather than the loss of the switching response frame. Accordingly, by aborting the APS-frame transmission path switching process when the node has failed to receive the switching response frame, it becomes possible to reduce the possibility of a discrepancy arising between the operation of the node apparatus 3 and the operation of the node apparatus 4.

Figure 35A:
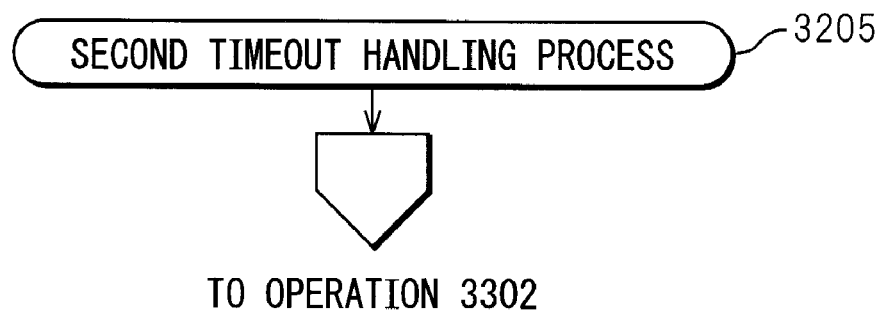
FIG. 35A is an explanatory diagram illustrating a first example of a second timeout handling process.

FIG. 35A is an explanatory diagram illustrating a first example of the second timeout handling process 3205. If the second timer 137 has expired, i.e., if the node apparatus 4 has failed to receive the stop notification frame, the node apparatus 4 proceeds to carry out the process from operation 3302 onward, as in the case where the stop notification frame has been successfully received.

Figure 36:
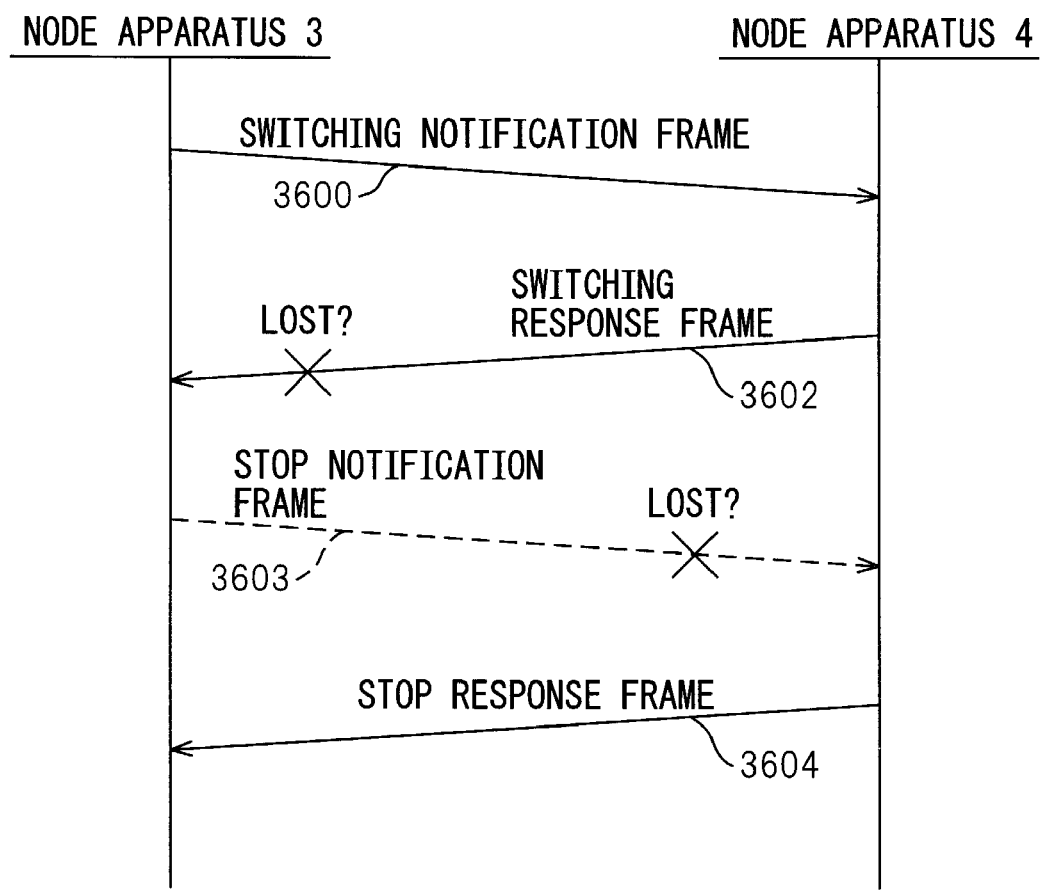
FIG. 36 is an explanatory diagram for the case where the node apparatus fails to receive a stop notification frame.

The cause for the failure to receive the stop notification frame is either the loss of the switching response frame or the loss of the stop notification frame. FIG. 36 is an explanatory diagram for the case where the node apparatus 4 fails to receive the stop notification frame. The node apparatus 3 transmits the switching notification frame to the node apparatus 4 in operation 3600, and in response, the node apparatus 4 returns the switching response frame to the node apparatus 3 in operation 3602.

The node apparatus 3 that received the switching response frame transmits the stop notification frame to the node apparatus 4 in operation 3603. In view of this, the possible cause for the expiration of the second timer 137 that started operation upon reception of the switching notification frame is either the loss of the switching response frame or the loss of the stop notification frame.

When the switching response frame is lost, the node apparatus 3 aborts the switching process as earlier described. Therefore, if the node apparatus 4 also aborts the switching process, discrepancy can be prevented from arising between the operation of the node apparatus 3 and the operation of the node apparatus 4. On the other hand, when the stop notification frame is lost, the node apparatus 3 continues to carry out the switching process; therefore, if the node apparatus 4 also continues to carry out the switching process, discrepancy can be prevented from arising between the operation of the node apparatus 3 and the operation of the node apparatus 4.

Here, when the stop notification frame is lost, if the node apparatus 4 aborts the switching process, there arise a discrepancy between the operation of the node apparatus 3 and the operation of the node apparatus 4. The same is true for the case where the node apparatus 4 continues to carry out the switching process when the switching response frame is lost. In such cases, some kind of error handling is desirable to address the discrepancy arising between the operation of the node apparatus 3 and the operation of the node apparatus 4.

Assuming the case where the second timer 137 has timed out due to the loss of the switching response frame and the node apparatus 4 continues to carry out the switching process. When the node apparatus 4 continues to carry out the switching process because of the timeout of the second timer 137, the node apparatus 4 transmits the stop response frame to the node apparatus 3 in operation 3604. The node apparatus 3 that received the stop response frame rather than the switching response frame it was expecting can detect the discrepancy between the operation of the node apparatus 3 and the operation of the node apparatus 4.

In the present embodiment, the switching process is initiated by the initiating node apparatus 3, and the remote node apparatus 4 carries out the switching process in such a manner as to respond to the process being performed by the node apparatus 3. Accordingly, by making provisions to detect at the node apparatus 3 any discrepancy arising between the operation of the node apparatus 3 and the operation of the node apparatus 4, as in the above example, the processing of the control program for performing the switching process can be facilitated.

Figure 35B:
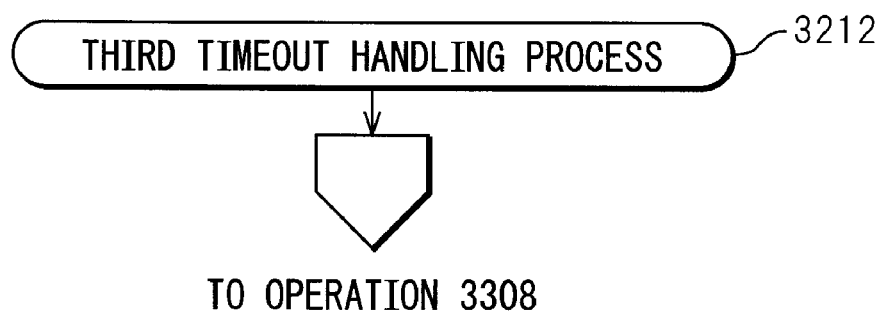
FIG. 35B is an explanatory diagram illustrating a first example of a third timeout handling process.

FIG. 35B is an explanatory diagram illustrating a first example of the third timeout handling process 3212. If the third timer 138 has expired, i.e., if the node apparatus 3 has failed to receive the stop response frame, the node apparatus 3 proceeds to carry out the process from operation 3308 onward, as in the case where the stop response frame has been successfully received.

When the node apparatus 3 is waiting for the arrival of the stop response frame, the node apparatus 4 had already received the switching notification frame. In this case, the node apparatus 4 continues to carry out the switching process, as described above, even when the stop notification frame does not arrive as expected. Therefore, by allowing the node apparatus 3 to continue to carry out the switching process even when the stop response frame does not arrive as expected, discrepancy can be prevented from arising between the operation of the node apparatus 3 and the operation of the node apparatus 4.

According to the above example, the switching of the APS frame transmission path can be accomplished without causing the erroneous setting detection mechanism to generate an alarm.

Figure 37:
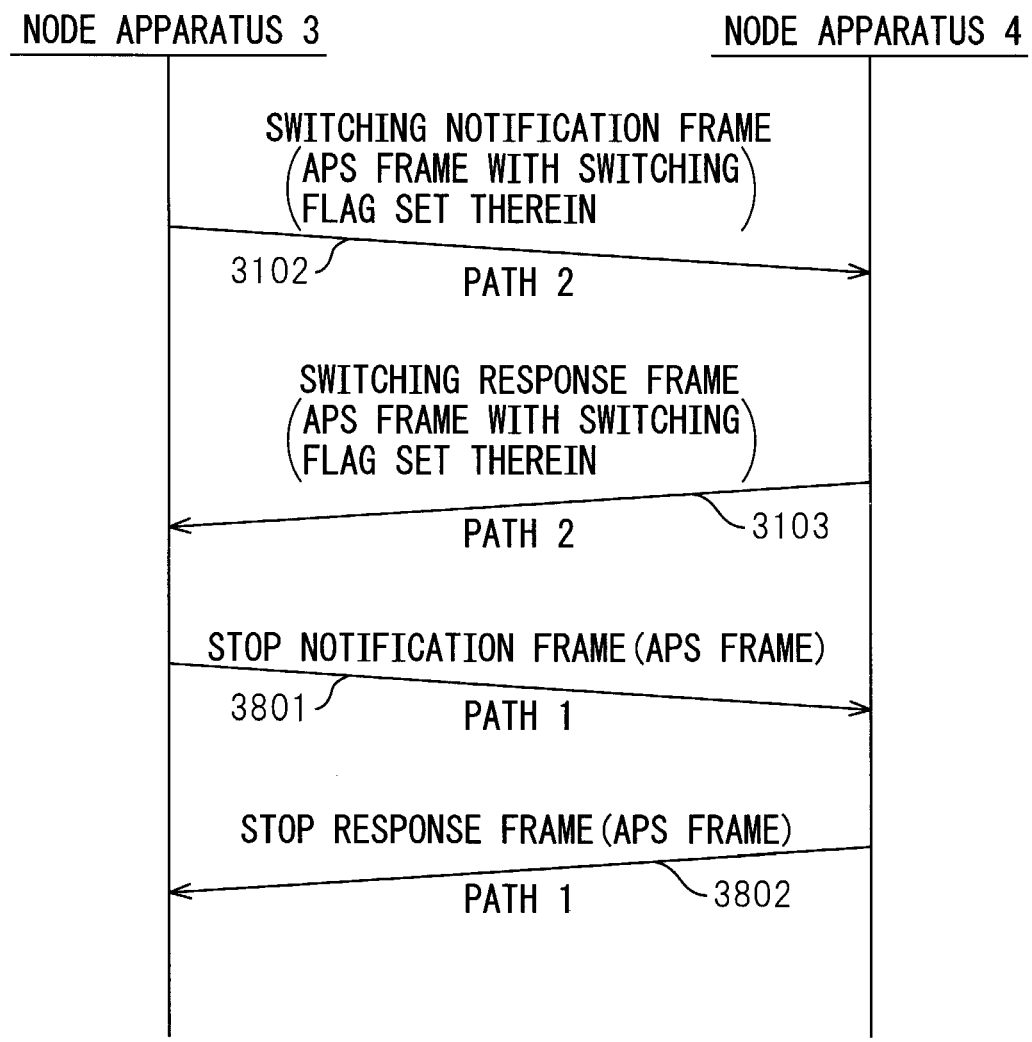
FIG. 37 is an explanatory diagram illustrating a second example of the APS frame transmit/receive process according to the embodiment.

FIG. 37 is an explanatory diagram illustrating a second example of the APS frame transmit/receive process according to the embodiment. The following operations 3801 and 3802 may be implemented as steps. In this example, instead of transmitting the stop notification frame and the stop response frame in the APS frame transmit/receive process of FIG. 31, the APS frame is transferred via the path 1 in operations 3801 and 3802.

When the path for receiving the APS frame has changed from the path 2, i.e., the new working path, to the path 1, i.e., the previous working path, the transmission stop determining unit 132 in the remote node determines that the initiating node has stopped transmitting the APS frame via the path 2. Likewise, when the path for receiving the APS frame has changed from the path 2, i.e., the new working path, to the path 1, i.e., the previous working path, the transmission stop determining unit 132 in the initiating node determines that the remote node has stopped transmitting the APS frame via the path 2.

Figure 38:
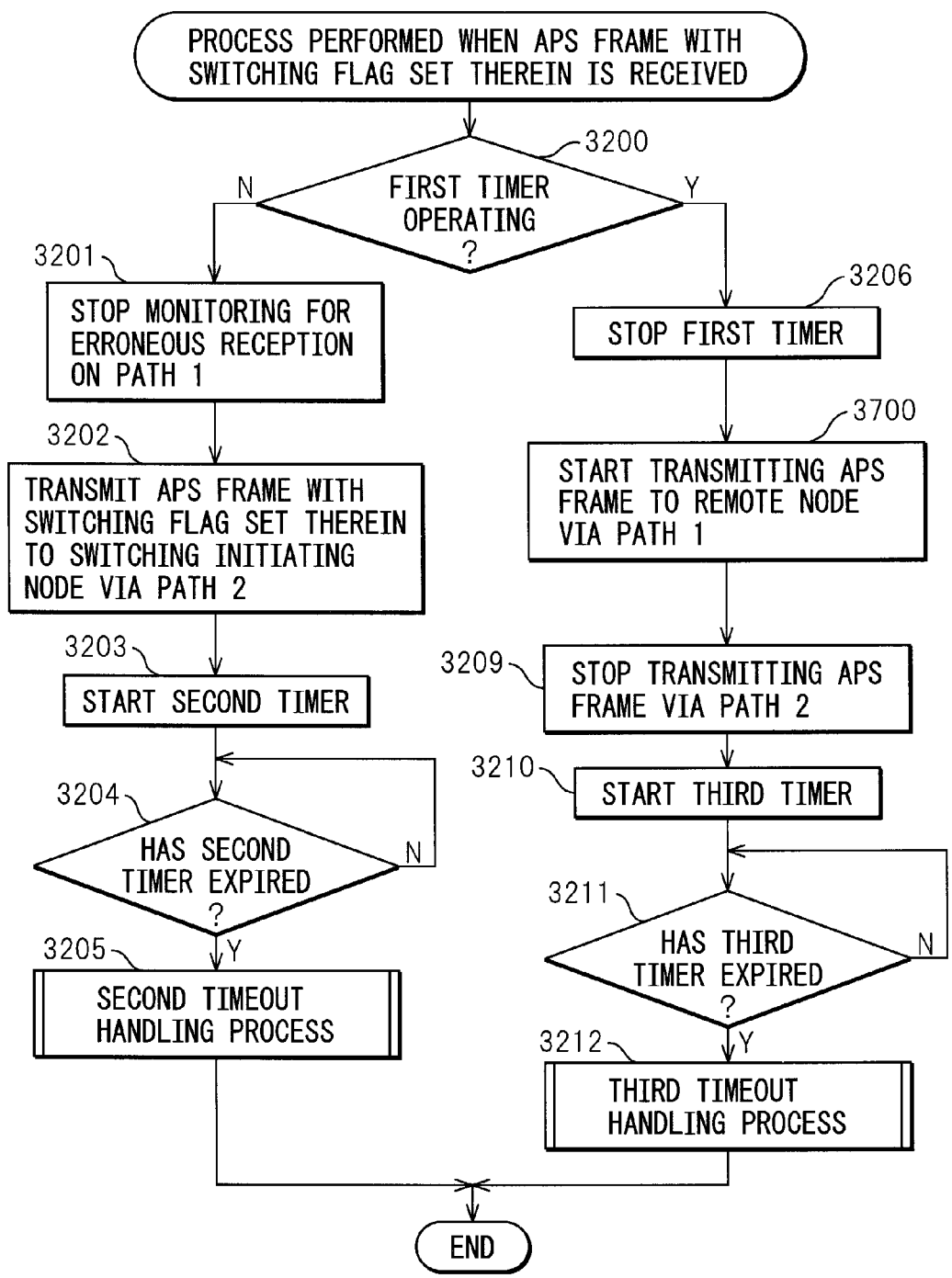
FIG. 38 is an explanatory diagram illustrating a second example of the process performed when the APS frame in which the switching flag is set is received.

FIG. 38 is an explanatory diagram illustrating a second example of the process performed when the APS frame in which the switching flag is set is received. The following operation 3700 may be implemented as a step. Operations 3200 to 3206 and 3209 to 3212 are the same as the corresponding operations described with reference to FIG. 32. In operation 3700 that follows operation 3206, the transmission path switching unit 134 in the node apparatus 3 causes the APS transmitting unit 114 to start transmitting the APS frame via the path 1, by switching the APS frame transmission path from the path 2 to the path 1. After operation 3700, the process proceeds to operation 3209. Operations 3700, 3209, and 3210 may be carried out in any order.

FIG. 39 is an explanatory diagram illustrating a first example of the process performed when the APS frame is received via the path 1. In an alternative embodiment, the following operations 3900 to 3908 may be implemented as steps.

In operation 3900, the APS processing unit 113 in the node apparatus that received the APS frame via the path 1 checks to see whether the second timer 137 is operating or not. If the second timer 137 is operating (Y in operation 3900), the receiving node apparatus is the remote node; therefore, the APS processing unit 113 proceeds to operation 3901. On the other hand, if the second timer 137 is not operating (N in operation 3900), the receiving node apparatus is the initiating node; therefore, the APS processing unit 113 proceeds to operation 3905.

Operations 3901 to 3904 are carried out at the node apparatus 4 which is the remote node. In operation 3901, the time counting operation of the second timer 137 is stopped. In operation 3902, the transmission path switching unit 134 causes the APS transmitting unit 114 to start transmitting the APS frame via the path 1, by switching the APS frame transmission path from the path 2 to the path 1.

In operation 3903, the APS transmitting unit 114 stops transmitting the APS frame via the path 2 as the APS frame transmission path is switched. In operation 3304, the transmission stop determining unit 132 determines that the node apparatus 3 has stopped transmitting the APS frame via the path 2, by detecting that the transmission path of the APS frame received from the node apparatus 3 has been switched to the path 1. The monitoring process start unit 133 causes the monitoring unit 130 to start monitoring whether or not the APS frame has been received via the path 2. Here, operations 3901 to 3904 may be carried out in any order.

Operations 3905 to 3908 are carried out at the node apparatus 3 which is the initiating node. In operation 3905, the failure detection unit 139 checks to see whether the third timer 138 is operating or not. If the third timer 138 is operating (Y in operation 3905), the process proceeds to operation 3906. On the other hand, if the third timer 138 is not operating (N in operation 3905), the process proceeds to operation 3908.

In operation 3906, the time counting operation of the third timer 138 is stopped. In operation 3907, the transmission stop determining unit 132 determines that the node apparatus 4 has stopped transmitting the APS frame via the path 2, by detecting that the transmission path of the APS frame received from the node apparatus 4 has been switched to the path 1. The monitoring process start unit 133 causes the monitoring unit 130 to start monitoring whether or not the APS frame has been received via the path 2. The order of operations 3906 and 3907 may be interchanged.

In operation 3908, the failure detection unit 139 determines that a failure has occurred that can cause a discrepancy between the operation of the initiating node and the operation of the remote node.

FIG. 40 is an explanatory diagram illustrating a second example of the second timeout handling process. If the second timer 137 has expired, i.e., if the node apparatus 4 has failed to receive the APS frame via the path 1, the node apparatus 4 proceeds to carry out the process from operation 3902 onward, as in the case where the APS frame has been received via the path 1.

According to this example, notification that the transmission of the APS frame on the new working path has been stopped can be provided without having to use the stop flag. This serves to save the amount of information allocated to the flags in the APS frame and to enhance the efficiency in the use of the flags in the APS frame.

Figure 41:
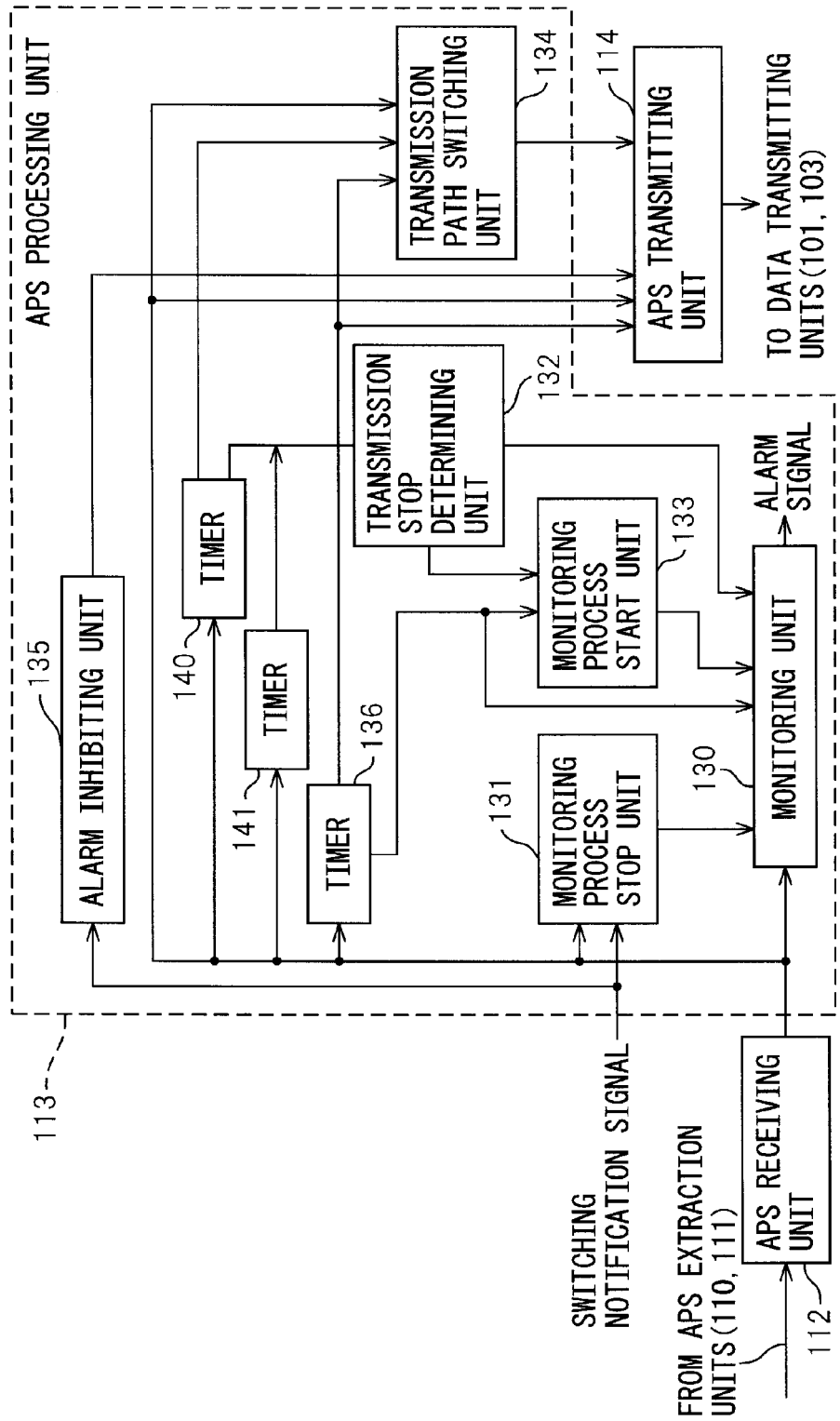
FIG. 41 is a block diagram illustrating a second example of the APS processing unit according to the embodiment.

FIG. 41 is a block diagram illustrating a second example of the APS processing unit 113 according to the embodiment. The same component elements as those depicted in FIG. 27 are designated by the same reference numerals as those used in FIG. 27. Reference numeral 140 is a fourth timer, and 141 is a fifth timer. The functions of the component elements 130 to 136, 140, and 141 are implemented by the CPU 120 of FIG. 26 executing the processing program 125.

The APS processing unit 113 includes the monitoring unit 130, monitoring process stop unit 131, transmission stop determining unit 132, monitoring process start unit 133, and transmission path switching unit 134. The APS processing unit 113 further includes the alarm inhibiting unit 135, first timer 136, fourth timer 140, and fifth timer 141.

The fourth timer 140 in the remote node monitors a certain time period that elapses after transmitting the switching response frame. The fifth timer 141 in the initiating node monitors a certain time period that elapses after transmitting the switching notification frame. When the fourth timer 140 expires, the transmission stop determining unit 132 in the remote node determines that the initiating node has stopped transmitting the APS frame via the new working path. When the fifth timer 141 expires, the transmission stop determining unit 132 in the initiating node determines that the remote node has stopped transmitting the APS frame via the new working path. When the fourth timer 140 expires, the transmission path switching unit 134 in the remote node switches the APS frame transmission path from the previous protection path to the new protection path.

Figure 42:
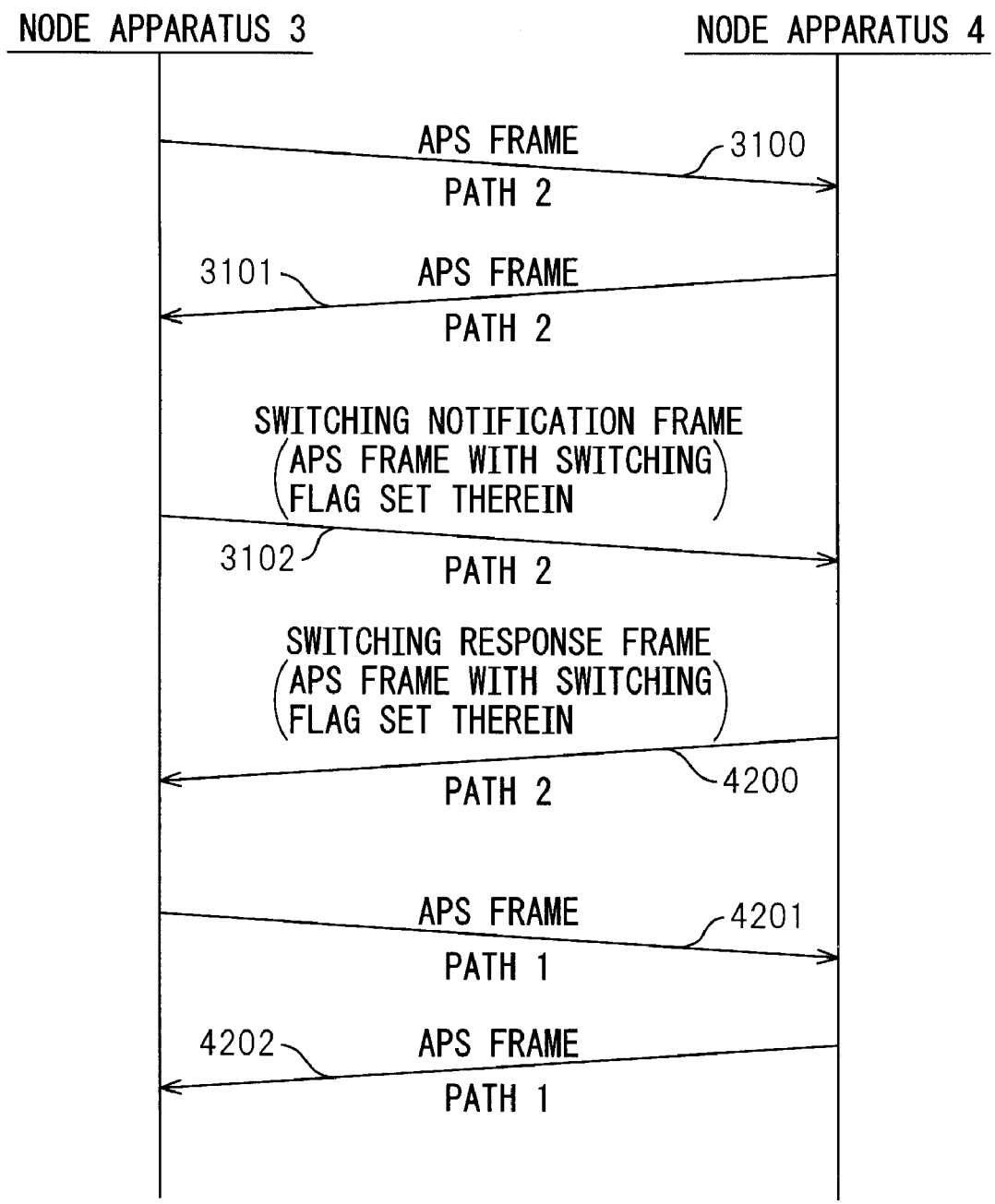
FIG. 42 is an explanatory diagram illustrating a third example of the APS frame transmit/receive process according to the embodiment.

The operation of the APS processing unit 113 of FIG. 41 will be described below. Operations 2801 to 2805 described with reference to FIG. 30 are carried out at the node apparatus 3 which is the initiating node. FIG. 42 is an explanatory diagram illustrating a third example of the APS frame transmit/receive process according to the embodiment. In operation 2802 of FIG. 30, the switching notification frame is transmitted from the node apparatus 3 to the node apparatus 4, as indicated in operation 3102 of FIG. 42.

Figure 43:
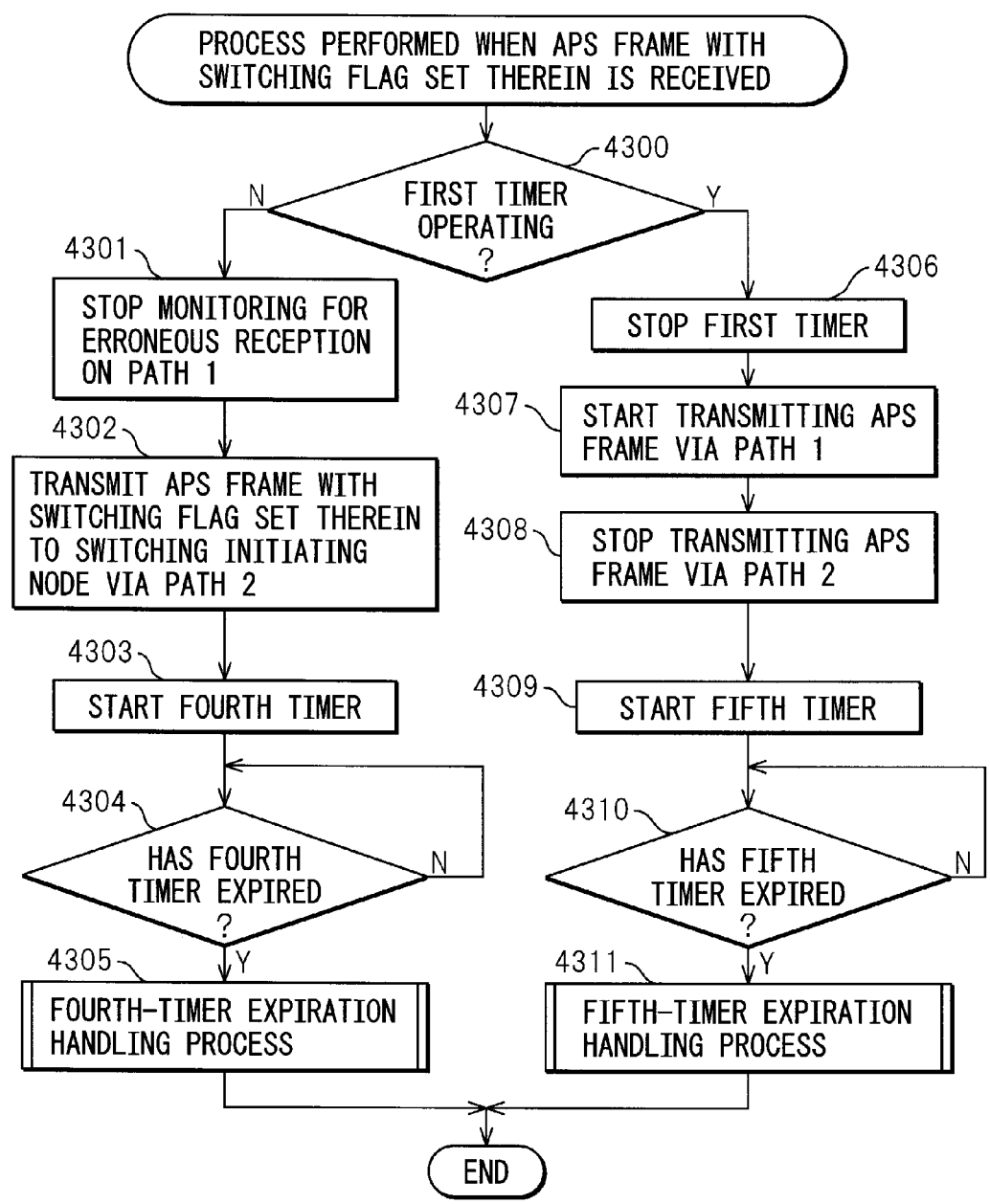
FIG. 43 is an explanatory diagram illustrating a third example of the process performed when the APS frame in which the switching flag is set is received.

FIG. 43 is an explanatory diagram illustrating a third example of the process performed when the APS frame in which the switching flag is set is received. In an alternative embodiment, the following operations 4300 to 4311 may be implemented as steps.

In operation 4300, the APS processing unit 113 in the node apparatus that received the APS frame in which the switching flag is set checks to see whether the first timer 136 is operating or not. If the first timer 136 is not operating (N in operation 4300), the receiving node apparatus is the remote node; therefore, the APS processing unit 113 proceeds to operation 4301. On the other hand, if the first timer 136 is operating (Y in operation 4300), the receiving node apparatus is the initiating node; therefore, the APS processing unit 113 proceeds to operation 4306.

Operations 4301 to 4305 are carried out at the node apparatus 4 which is the remote node. In operation 4301, the monitoring process stop unit 131 causes the monitoring unit 130 to stop monitoring whether or not the APS frame has been received via the path 1. In operation 4302, the APS frame transmitting unit 114 transmits the switching response frame to the node apparatus 3 via the path 2. In operation 4302, the switching response frame is transmitted from the node apparatus 4 to the node apparatus 3, as indicated in operation 4200 of FIG. 42.

In operation 4303 of FIG. 43, the fourth timer 140 starts. Operations 4301 to 4303 may be carried out in any order. In operation 4304, the fourth timer 140 monitors whether the certain time period has elapsed or not. If the certain time period has elapsed (Y in operation 4304), the node apparatus 4 performs in operation 4305 a fourth-timer expiration handling process to be described hereinafter. If the certain time period has not yet elapsed (N in operation 4304), the node apparatus 4 repeats operation 4304.

Figure 44A:
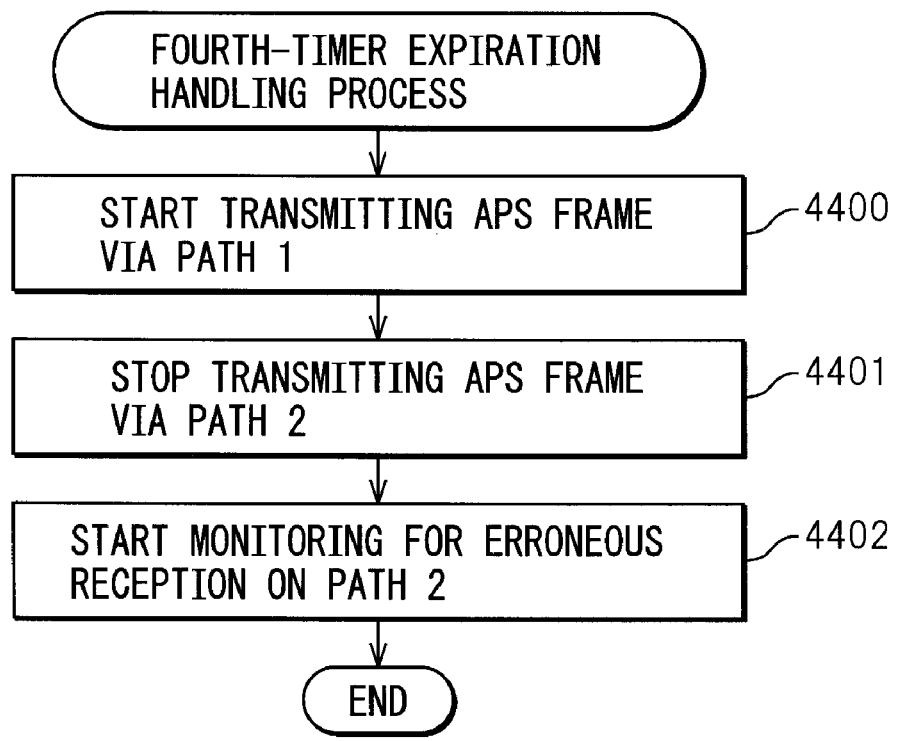
FIG. 44A is an explanatory diagram of a fourth-timer expiration handling process.

FIG. 44A is an explanatory diagram of the fourth-timer expiration handling process. In an alternative embodiment, the following operations 4400 to 4402 may be implemented as steps. Further, operations 4400 to 4402 may be carried out in any order.

In operation 4400, the transmission path switching unit 134 causes the APS transmitting unit 114 to start transmitting the APS frame via the path 1, by switching the APS frame transmission path from the path 2 to the path 1. In operation 4401, the APS transmitting unit 114 stops transmitting the APS frame via the path 2 as the APS frame transmission path is switched. Accordingly, the APS frame from the node apparatus 4 to the node apparatus 3 is transmitted via the path 1 as indicated in operation 4202 of FIG. 42.

Reference is made to FIG. 44. In operation 4402, the transmission stop determining unit 132 determines that the node apparatus 3 has stopped transmitting the APS frame via the path 2, since the fourth timer 140 has expired. The monitoring process start unit 133 causes the monitoring unit 130 to start monitoring whether or not the APS frame has been received via the path 2.

Reference is made to FIG. 43. Operations 4306 to 4311 are carried out at the node apparatus 3 which is the initiating node. In operation 4306, the time counting operation of the first timer 136 is stopped. In operation 4307, the transmission path switching unit 134 causes the APS transmitting unit 114 to start transmitting the APS frame via the path 1, by switching the APS frame transmission path from the path 2 to the path 1. In operation 4308, the APS transmitting unit 114 stops transmitting the APS frame via the path 2 as the APS frame transmission path is switched. Accordingly, the APS frame from the node apparatus 3 to the node apparatus 4 is transmitted via the path 1 as indicated in operation 4201 of FIG. 42.

In operation 4309, the fifth timer 141 starts. Operations 4307 to 4309 may be carried out in any order. In operation 4310, the fifth timer 141 monitors whether the certain time period has elapsed or not. If the certain time period has elapsed (Y in operation 4310), the node apparatus 3 performs in operation 4311 a fifth-timer expiration handling process to be described hereinafter. If the certain time period has not yet elapsed (N in operation 4311), the node apparatus 3 repeats operation 4311.

Figure 44B:
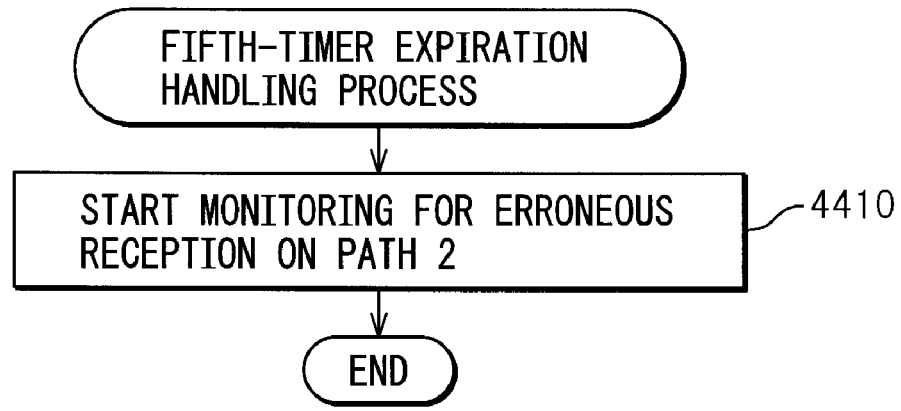
FIG. 44B is an explanatory diagram of a fifth-timer expiration handling process.

FIG. 44B is an explanatory diagram of the fifth-timer expiration handling process. The following operation 4410 may be implemented as a step. In operation 4410, the transmission stop determining unit 132 determines that the node apparatus 4 has stopped transmitting the APS frame via the path 2, since the fifth timer 141 has expired. The monitoring process start unit 133 causes the monitoring unit 130 to start monitoring whether or not the APS frame has been received via the path 2.

The length of the certain time period that the fourth timer 140 counts is set so that the fourth timer 140 expires after the transmission path switching unit 134 in the node apparatus 3 that received the switching response frame has switched the APS frame transmission path. Likewise, the length of the certain time period that the fifth timer 141 counts is set so that the fifth timer 141 expires after the transmission path switching unit 134 in the node apparatus 4 that transmitted the switching response frame has switched the APS frame transmission path.

As a result, after the node apparatus 4 has stopped transmitting the APS frame via the path 2, the monitoring unit 130 in the node apparatus 3 starts monitoring whether or not the APS frame has been received via the path 2. Likewise, after the node apparatus 3 has stopped transmitting the APS frame via the path 2, the monitoring unit 130 in the node apparatus 4 starts monitoring whether or not the APS frame has been received via the path 2. Therefore, according to the above example, the switching of the APS frame transmission path can be accomplished without causing the erroneous setting detection mechanism to generate an alarm.

According to the above example, notification that the transmission of the APS frame on the new working path has been stopped can be provided without having to use the stop flag. This serves to save the amount of information allocated to the flags in the APS frame and to enhance the efficiency in the use of the flags in the APS frame.

Figure 45:
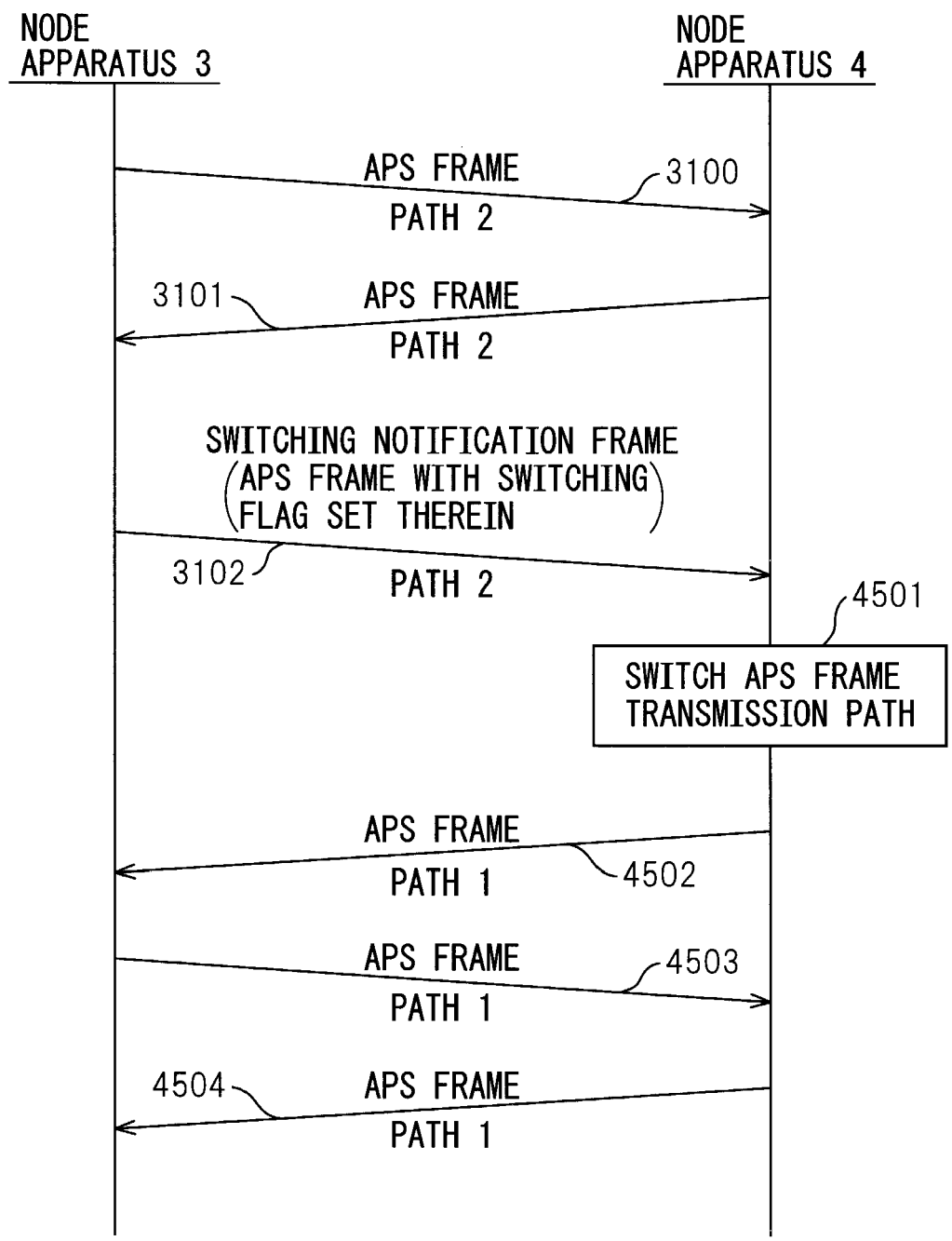
FIG. 45 is an explanatory diagram illustrating a fourth example of the APS frame transmit/receive process according to the embodiment.

There can occur cases where the node apparatus 4 as the remote node is not able to perform the processing as the remote node 4 according to the embodiment. In such cases, if the switching notification frame is transmitted from the node apparatus 3 to the node apparatus 4 in operation 2802 of FIG. 30 as indicated in operation 3102 of FIG. 45, the node apparatus 4 is unable to interpret the meaning of the switching notification frame. FIG. 45 is an explanatory diagram illustrating a fourth example of the APS frame transmit/receive process according to the embodiment. In an alternative embodiment, the following operations 4501 to 4504 may be implemented as steps.

Figure 46:
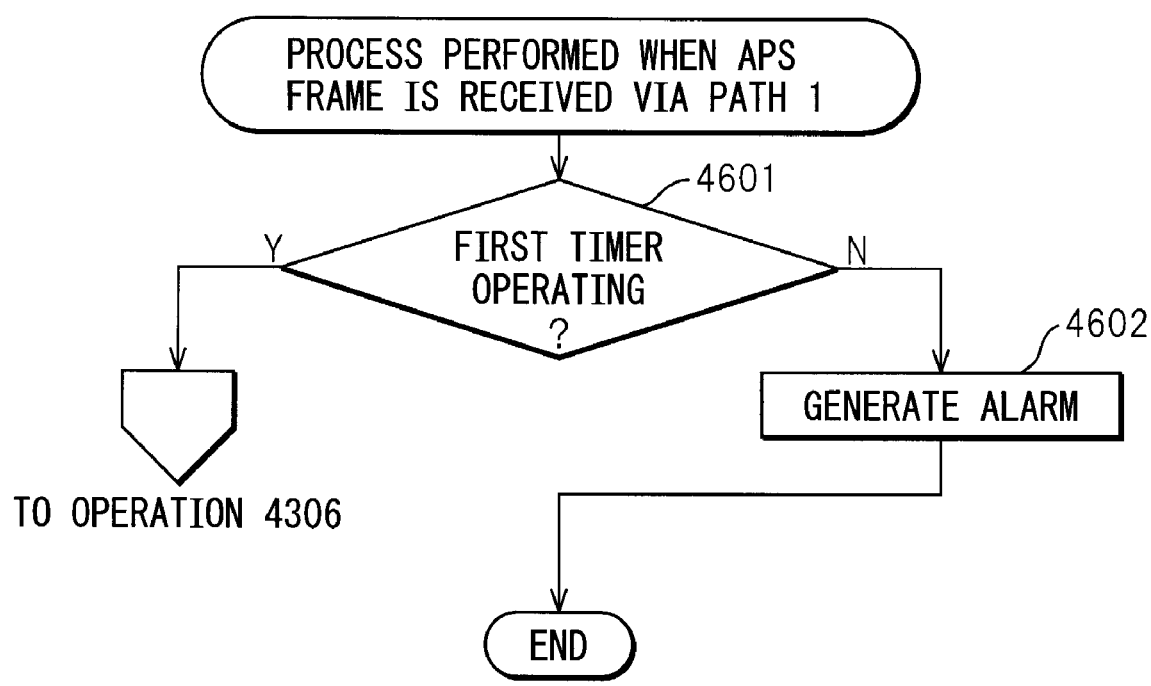
FIG. 46 is an explanatory diagram illustrating a second example of the process performed when the APS frame is received via the path 1.

In view of the above, the process depicted in FIG. 46 is included in the process that the APS processing unit 113 performs. FIG. 46 is an explanatory diagram illustrating a second example of the process performed when the APS frame is received via the path 1. In an alternative embodiment, the following operations 4601 and 4602 may be implemented as steps.

In operation 4501 of FIG. 45, the transmission path of the APS frame to be transmitted from the node apparatus 4 is switched by an operator's manual operation or by an input signal from some other external apparatus. As a result, in operation 4502, the node apparatus 4 transmits the APS frame via the path 1.

When the APS frame is received via the path 1, the node apparatus 3 in operation 4601 checks to see whether the first timer 136 is operating or not. If the first timer 136 is not operating (N in operation 4601), the transmission path switching for the APS frame is not yet initiated; therefore, the monitoring unit 130 generates an alarm in operation 4602. On the other hand, if the first timer 136 is operating (Y in operation 4601), the APS processing unit 113 proceeds to operation 4306 in FIG. 43.

According to the above example, if the APS frame transmission path is switched at the node apparatus 4 without interlinking the switching operation with some operation that the node apparatus 3 performs using the APS frame, the monitoring unit 130 can be prevented from generating an alarm. Accordingly, even when the remote node is a node apparatus that is not able to perform the processing according to the present embodiment, the switching of the APS frame transmission path can be effected without causing the monitoring unit 130 to generate an alarm.

Figure 47:
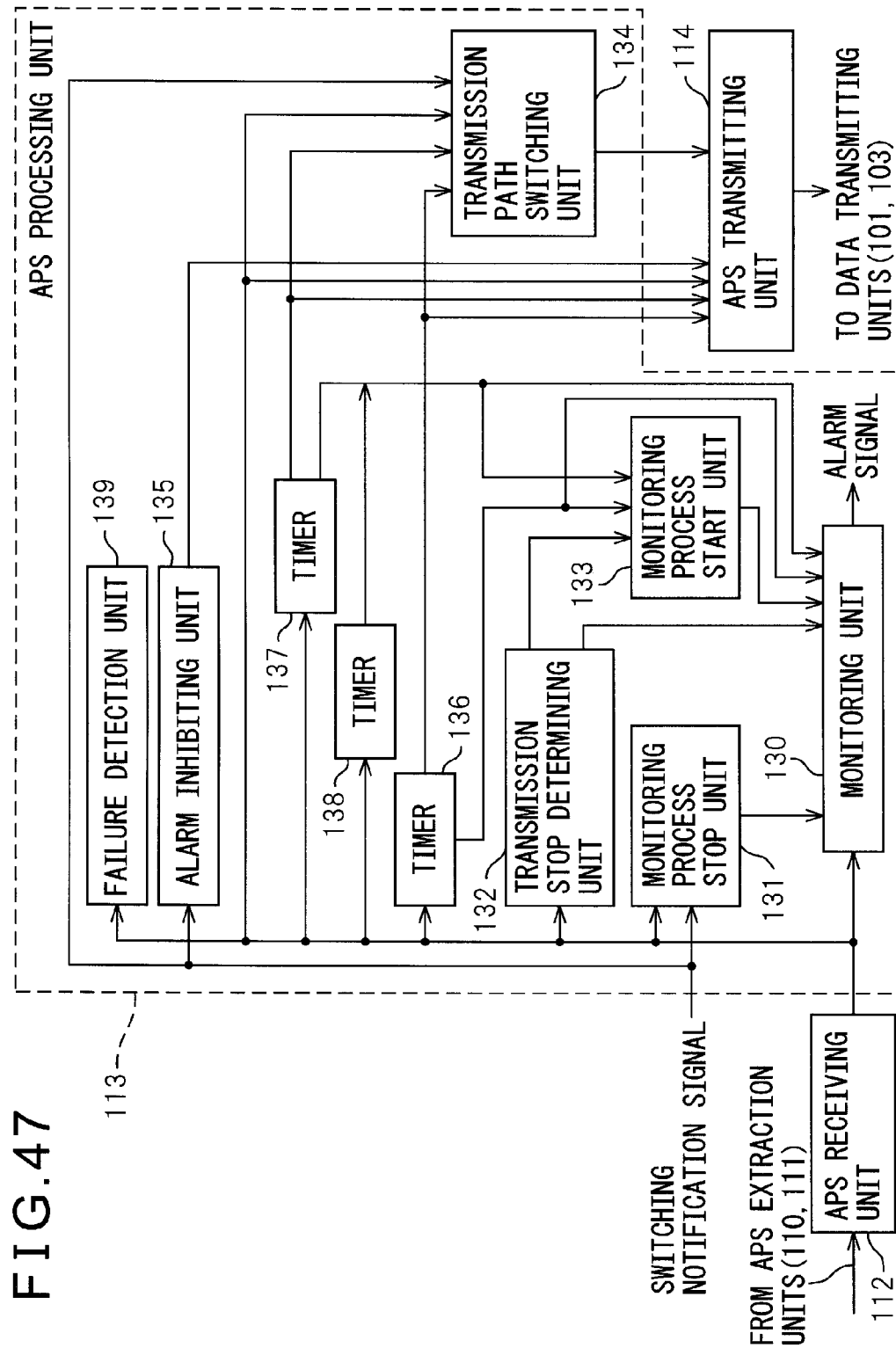
FIG. 47 is a block diagram illustrating a third example of the APS processing unit according to the embodiment.

FIG. 47 is a block diagram illustrating a third example of the APS processing unit 113 according to the embodiment. The same component elements as those depicted in FIG. 27 are designated by the same reference numerals as those used in FIG. 27. The functions of the component elements 130 to 139 are implemented by the CPU 120 of FIG. 26 executing the processing program 125.

The APS processing unit 113 includes the monitoring unit 130, monitoring process stop unit 131, transmission stop determining unit 132, monitoring process start unit 133, and transmission path switching unit 134. The APS processing unit 113 further includes the alarm inhibiting unit 135, first timer 136, second timer 137, third timer 138, and failure detection unit 139.

At the time of the working/protection switching, the transmission path switching unit 134 in the initiating node switches the APS frame transmission path from the new working path to the previous working path in accordance with the switching notification signal. If the first timer 136 has expired, the transmission path switching unit 134 in the initiating node switches the APS frame transmission path from the previous working path back to the new working path.

At the time of the working/protection switching, the alarm inhibiting unit 135 in the initiating node instructs the transmission path switching unit 134 to set the switching flag in the APS frame to be transmitted via the previous working path. The thus created switching notification frame is transmitted via the previous working path.

The monitoring unit 130 in the remote node does not generate an alarm even if the switching notification frame is received via the working path. In this way, the alarm inhibiting unit 135 in the initiating node can inhibit the monitoring unit 130 in the remote node from generating an alarm.

When the APS frame in which the switching flag is set is received, the transmission path switching unit 134 in the remote node switches the APS frame transmission path from the new working path to the previous working path. The APS transmitting unit 114 in the remote node returns the switching response frame to the initiating node.

When the switching response frame is received, the APS transmitting unit 114 in the initiating node creates the stop notification frame by resetting the switching flag in the APS frame and transmits the stop notification frame to the remote node. When the stop notification frame is received, the APS transmitting unit 114 in the remote node creates the stop response frame by resetting the switching flag in the APS frame and transmits the stop response frame to the initiating node.

When the APS frame in which the switching flag is reset is received from the initiating node, the transmission stop determining unit 132 in the remote node determines that the initiating node has stopped transmitting the APS frame via the new working path. On the other hand, when the APS frame in which the switching flag is reset is received from the remote node, the transmission stop determining unit 132 in the initiating node determines that the remote node has stopped transmitting the APS frame via the new working path.

Figure 48:
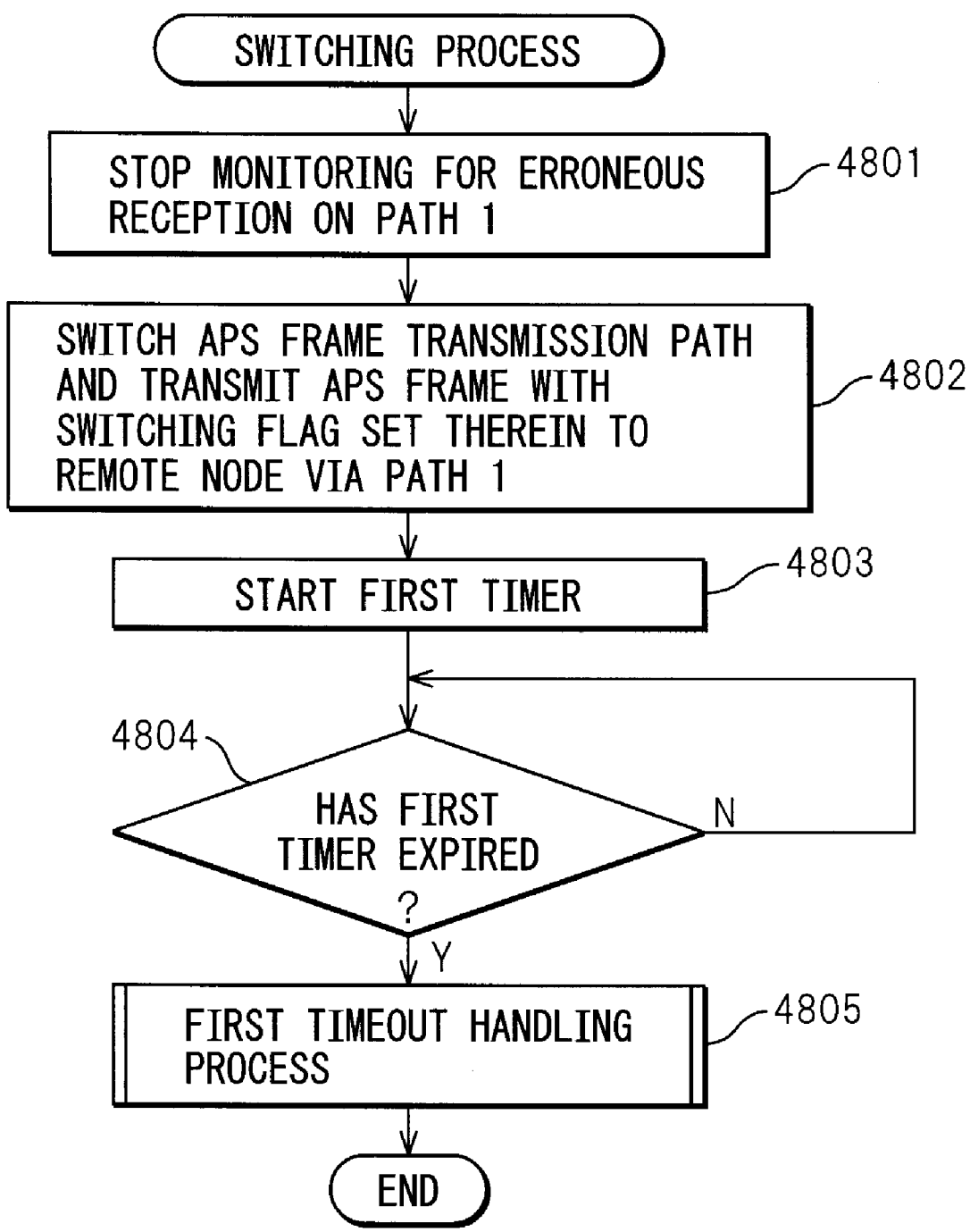
FIG. 48 is an explanatory diagram illustrating a second example of the switching process performed at the initiating node.

FIG. 48 is an explanatory diagram illustrating a second example of the switching process performed at the initiating node. In an alternative embodiment, the following operations 4801 to 4805 may be implemented as steps. In operation 4801, when the working/protection switching of the redundant paths occurs, the monitoring process stop unit 131 in the node apparatus 3 causes the monitoring unit 130 to stop monitoring whether or not the control frame has been received via the path 1.

In operation 4802, the transmission path switching unit 134 in the node apparatus 3 causes the APS transmitting unit 114 to start transmitting the APS frame via the path 1, by switching the APS frame transmission path from the path 2 to the path 1. At this time, the alarm inhibiting unit 135 instructs the transmission path switching unit 134 to set the switching flag in the APS frame.

Figure 49:
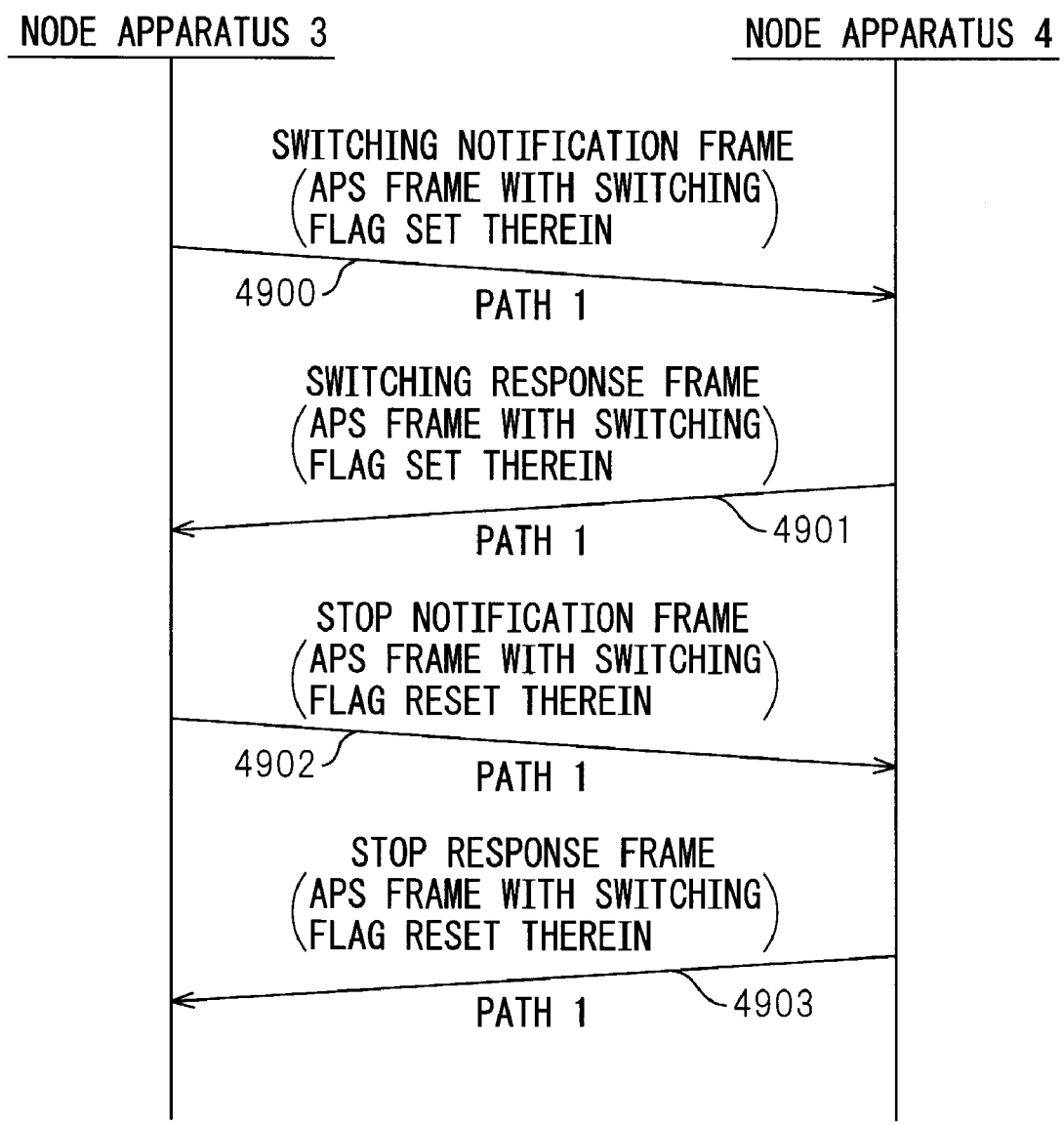
FIG. 49 is an explanatory diagram illustrating a fifth example of the APS frame transmit/receive process according to the embodiment.

FIG. 49 is an explanatory diagram illustrating a fifth example of the APS frame transmit/receive process according to the embodiment. In an alternative embodiment, the following operations 4900 to 4903 may be implemented as steps. In operation 4802 of FIG. 48, the switching notification frame is transmitted from the node apparatus 3 to the node apparatus 4 via the path 1 as indicated in operation 4900 of FIG. 49.

Reference is made to FIG. 48. In operation 4803, the first timer 136 starts. Here, the order of operations 4802 and 4803 may be interchanged. In operation 4804, the first timer 136 monitors whether the certain allowable waiting time has elapsed or not. If the certain allowable waiting time has elapsed (Y in operation 4804), the node apparatus 3 performs in operation 4805 the first timeout handling process to be described later. If the certain allowable waiting time has not yet elapsed (N in operation 4804), the node apparatus 3 repeats operation 4804 to wait for the switching response frame to arrive. The first timeout handling process 4805 here is the same as the first timeout handling process 2805 illustrated in FIG. 34.

Figure 50:
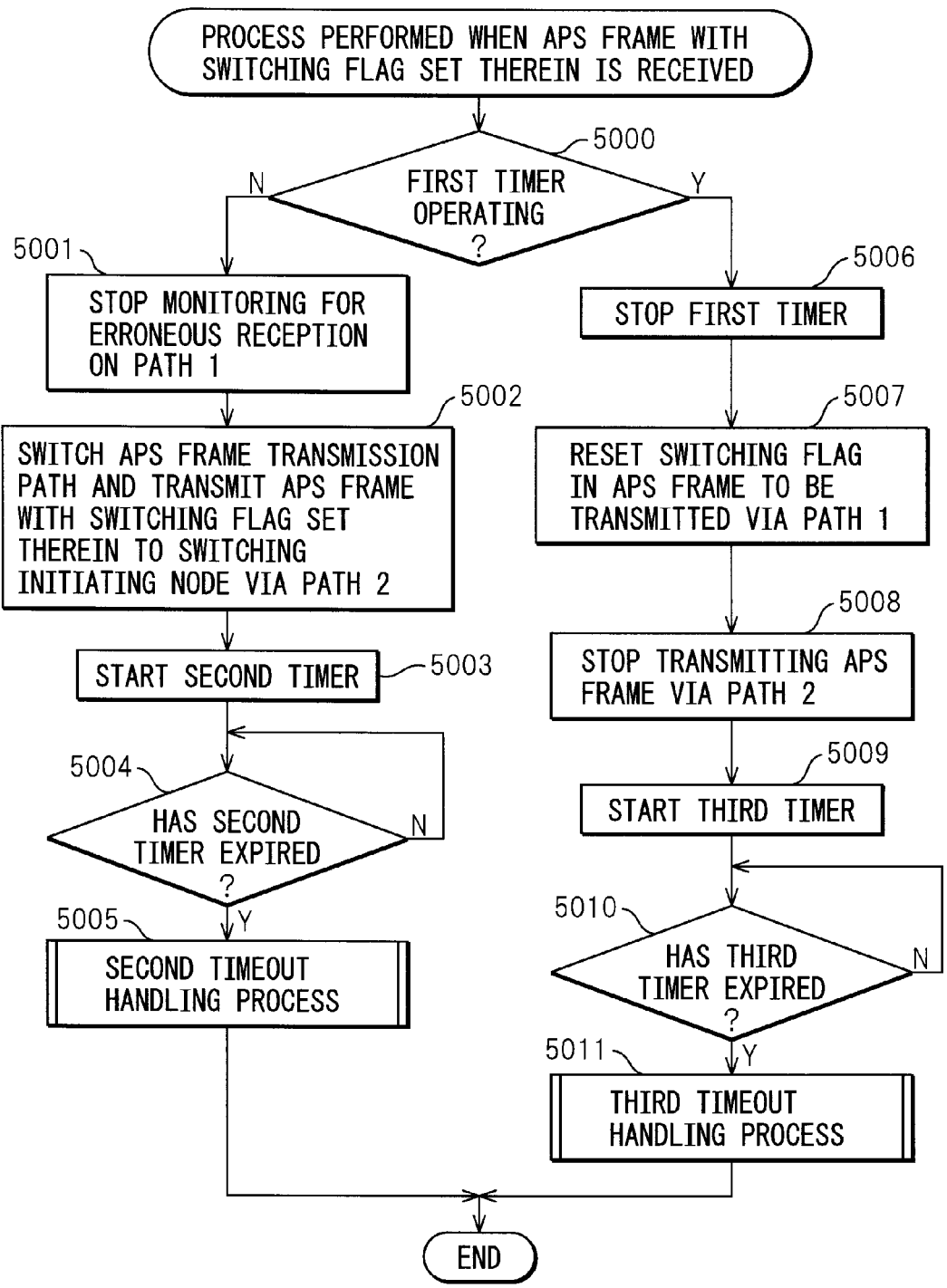
FIG. 50 is an explanatory diagram illustrating a fifth example of the process performed when the APS frame in which the switching flag is set is received.

FIG. 50 is an explanatory diagram illustrating a fourth example of the process performed when the APS frame in which the switching flag is set is received. In an alternative embodiment, the following operations 5000 to 5011 may be implemented as steps.

In operation 5000, the APS processing unit 113 in the node apparatus that received the APS frame in which the switching flag is set checks to see whether the first timer 136 is operating or not. If the first timer 136 is not operating (N in operation 5000), the receiving node apparatus is the remote node; therefore, the APS processing unit 113 proceeds to operation 5001. On the other hand, if the first timer 136 is operating (Y in operation 5000), the receiving node apparatus is the initiating node; therefore, the APS processing unit 113 proceeds to operation 5006.

Operations 5001 to 5005 are carried out at the node apparatus 4 which is the remote node. In operation 5001, the monitoring process stop unit 131 causes the monitoring unit 130 to stop monitoring whether or not the APS frame has been received via the path 1.

In operation 5002, the transmission path switching unit 134 causes the APS transmitting unit 114 to start transmitting the APS frame via the path 1, by switching the APS frame transmission path from the path 2 to the path 1. At this time, the alarm inhibiting unit 135 instructs the transmission path switching unit 134 to set the switching flag in the APS frame. In operation 5002, the switching response frame is transmitted from the node apparatus 4 to the node apparatus 3 via the path 1 as indicated in operation 4901 of FIG. 49.

In operation 5003 of FIG. 50, the second timer 137 starts. Operations 5001 to 5003 may be carried out in any order. In operation 5004, the second timer 137 monitors whether the certain allowable waiting time has elapsed or not. If the certain allowable waiting time has elapsed (Y in operation 5004), the node apparatus 4 performs in operation 5005 the second timeout handling process to be described later. If the certain allowable waiting time has not yet elapsed (N in operation 5004), the node apparatus 4 repeats operation 5004 to wait for the stop notification frame to arrive.

Operations 5006 to 5011 are carried out at the node apparatus 3 which is the initiating node. In operation 5006, the time counting operation of the first timer 136 is stopped. In operation 5007, the APS transmitting unit 114 resets the switching flag in the APS frame to be transmitted via the path 1. The APS frame in which the switching flag is thus reset is used as the stop notification frame. In operation 5007, the switching notification frame is transmitted from the node apparatus 3 to the node apparatus 4 via the path 1 as indicated in operation 4902 of FIG. 49.

In operation 5008, the APS transmitting unit 114 stops transmitting the APS frame via the path 2 as the APS frame transmission path is switched. In operation 5009, the third timer 138 starts. Operations 5007 to 5009 may be carried out in any order. Further, operation 5008 may be carried out immediately after or before operation 4802 of FIG. 48.

In operation 5010, the third timer 138 monitors whether the certain allowable waiting time has elapsed or not. If the certain allowable waiting time has elapsed (Y in operation 5010), the node apparatus 3 performs in operation 5011 the third timeout handling process to be described later. If the certain allowable waiting time has not yet elapsed (N in operation 5010), the node apparatus 3 repeats operation 5010 to wait for the stop response frame to arrive.

Figure 51:
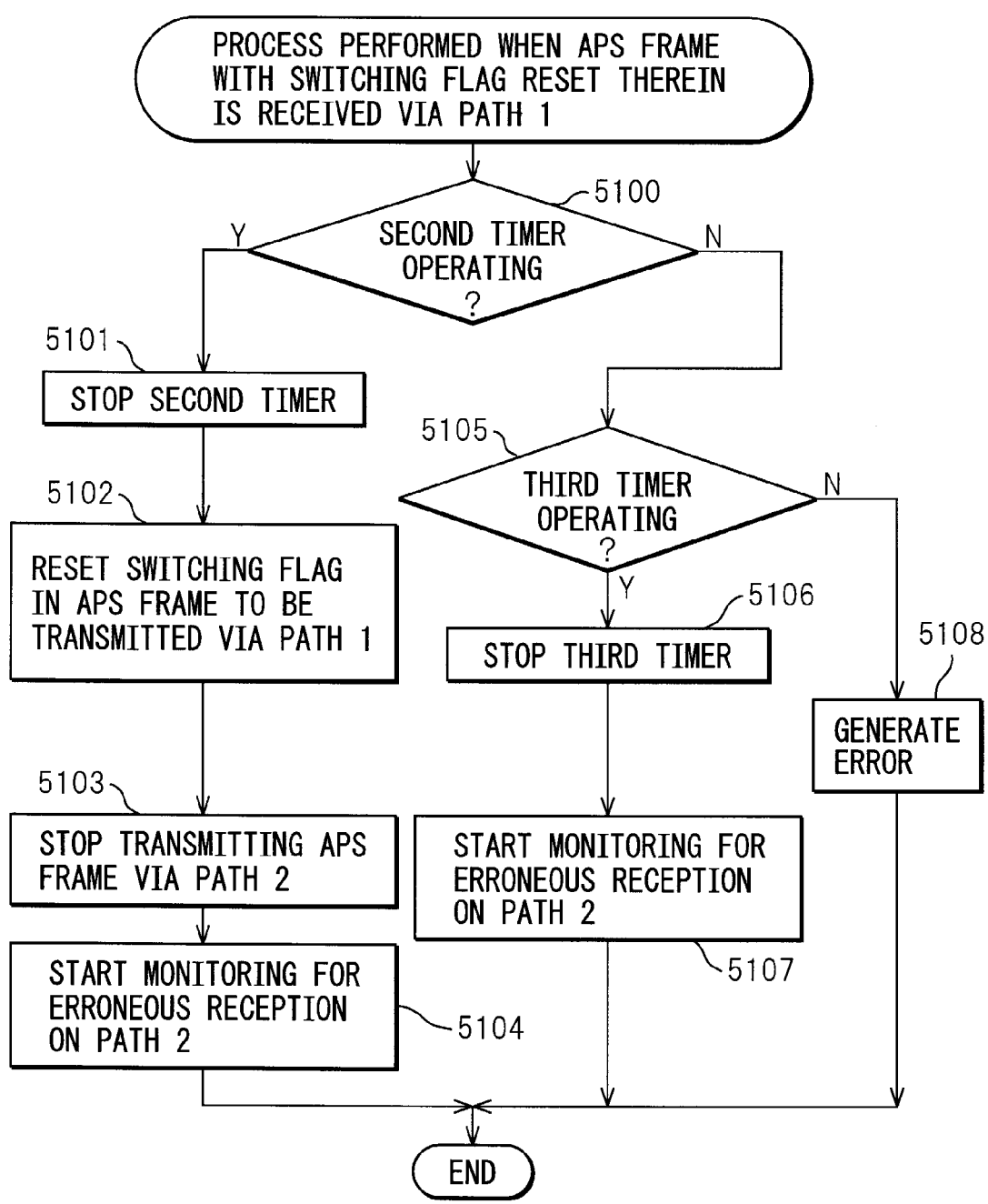
FIG. 51 is an explanatory diagram illustrating a third example of the process performed when the APS frame is received via the path 1.

FIG. 51 is an explanatory diagram illustrating a third example of the process performed when the APS frame is received via the path 1. In an alternative embodiment, the following operations 5100 to 5108 may be implemented as steps.

In operation 5100, the APS processing unit 113 in the node apparatus that received via the path 1 the APS frame in which the stop flag is set checks to see whether the second timer 137 is operating or not. If the second timer 137 is operating (Y in operation 5100), the receiving node apparatus is the remote node; therefore, the APS processing unit 113 proceeds to operation 5101. On the other hand, if the second timer 137 is not operating (N in operation 5100), the receiving node apparatus is the initiating node; therefore, the APS processing unit 113 proceeds to operation 5105.

Operations 5101 to 5104 are carried out at the node apparatus 4 which is the remote node. In operation 5101, the time counting operation of the second timer 137 is stopped. In operation 5102, the APS transmitting unit 114 resets the switching flag in the APS frame to be transmitted via the path 1. The APS frame in which the switching flag is thus reset is used as the stop response frame. In operation 5102, the switching response frame is transmitted from the node apparatus 4 to the node apparatus 3 via the path 1 as indicated in operation 4903 of FIG. 49.

In operation 5103, the APS transmitting unit 114 stops transmitting the APS frame via the path 2 as the APS frame transmission path is switched.

In operation 5104, the transmission stop determining unit 132 that received the stop notification frame determines that the node apparatus 3 has stopped transmitting the APS frame via the path 2. The monitoring process start unit 133 causes the monitoring unit 130 to start monitoring whether or not the APS frame has been received via the path 2. Operations 5101 to 5104 may be carried out in any order. Further, operation 5103 may be carried out immediately after or before operation 5002 of FIG. 50.

Operations 5105 to 5108 are carried out at the node apparatus 3 which is the initiating node. In operation 5105, the failure detection unit 139 checks to see whether the third timer 138 is operating or not. If the third timer 138 is operating (Y in operation 5105), the process proceeds to operation 5106. On the other hand, if the third timer 138 is not operating (N in operation 5105), the process proceeds to operation 5108.

In operation 5106, the time counting operation of the third timer 138 is stopped. In operation 5107, the transmission stop determining unit 132 that received the stop response frame determines that the node apparatus 4 has stopped transmitting the APS frame via the path 2. The monitoring process start unit 133 causes the monitoring unit 130 to start monitoring whether or not the APS frame has been received via the path 2. Here, the order of operations 5106 and 5107 may be interchanged. In operation 5108, the failure detection unit 139 determines that a failure has occurred that can cause a discrepancy between the operation of the initiating node and the operation of the remote node.

Figure 52A:
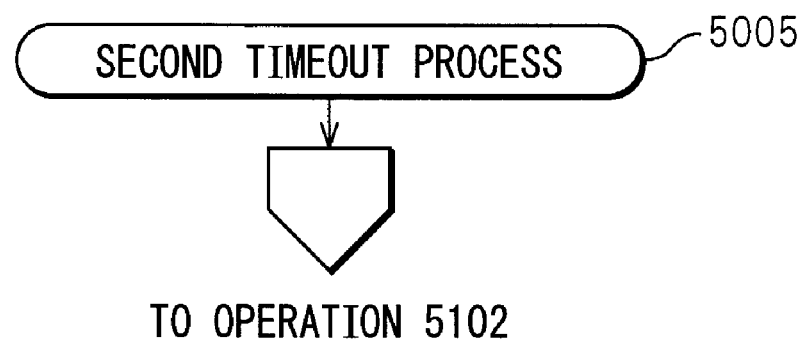
FIG. 52A is an explanatory diagram illustrating a third example of the second timeout handling process.

FIG. 52A is an explanatory diagram illustrating a third example of the second timeout handling process. If the second timer 137 has expired, that is, if the node apparatus 4 has failed to receive the stop notification frame, the node apparatus 4 proceeds to carry out the process from operation 5102 onward, as in the case where the stop notification frame has been successfully received.

Figure 52B:
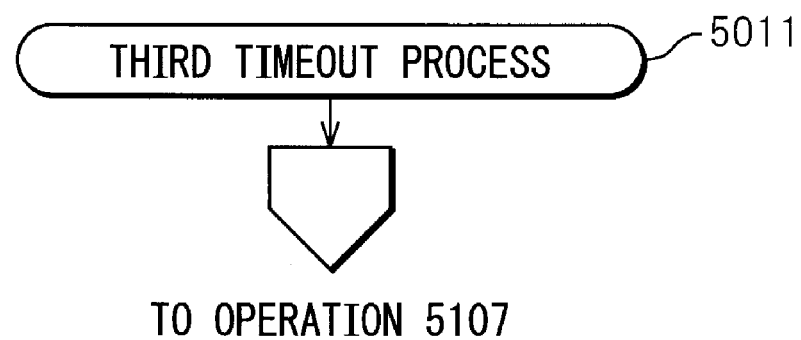
FIG. 52B is an explanatory diagram illustrating a second example of the third timeout handling process.

FIG. 52B is an explanatory diagram illustrating a second example of the third timeout handling process. If the third timer 138 has expired, i.e., if the node apparatus 3 has failed to receive the stop response frame, the node apparatus 3 proceeds to carry out the process from operation 5107 onward, as in the case where the stop response frame has been successfully received.

According to the present embodiment, since the monitoring unit 130 does not generate an alarm even if the switching notification frame is received via the working path, the APS frame transmission path can be switched at an early stage.

Further, according to the present embodiment, notification that the transmission of the control frame on the new working path has been stopped can be provided by changing the state of the switching flag. Accordingly, notification that the transmission of the APS frame on the new working path has been stopped can be provided without having to use the stop flag. This serves to save the amount of information allocated to the flags in the APS frame and to enhance the efficiency in the use of the flags in the APS frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method for processing a control frame for controlling path protection switching between redundant paths which include a working path and a protection path, said method comprising:
   at the time of working/protection switching of said redundant paths, stopping monitoring whether or not said control frame has been received via a previous working path which is the path used as said working path until said switching is completed, at a first node apparatus as one of two node apparatuses coupled mutually via said redundant paths;
   determining at said first node apparatus, whether a second node apparatus as the other of said two node apparatuses has stopped transmitting said control frame via a new working path which is the path used as said working path after said switching is completed; and
   starting at said first node apparatus, monitoring whether or not said control frame has been received via said new working path, when it is determined that said second node apparatus has stopped transmitting said control frame via said new working path.

2. The method for processing a control frame claimed in claim 1, comprising:

monitoring at said second node apparatus, whether or not said control frame has been received via said working path, and generating an alarm when said control frame has been received via said working path;

inhibiting said second node apparatus from generating an alarm by said first node apparatus during the working/protection switching of said redundant paths; and switching the path used to transmit said control frame from said first node apparatus to said second node apparatus from said new working path to said previous working path while the generation of said alarm by said second node apparatus is being inhibited.

3. The method for processing a control frame claimed in claim 2, comprising:

transmitting a specific control frame from said first node apparatus to said second node apparatus; and stopping monitoring by said second node apparatus, whether or not said control frame has been received via said previous working path, when said specific control frame is received at said second node apparatus.

4. The method for processing a control frame claimed in claim 3, comprising:

determining at said second node apparatus, whether said first node apparatus has stopped transmitting said control frame via said new working path;

causing said second node apparatus to start monitoring whether or not said control frame has been received via said new working path, when it is determined that said first node apparatus has stopped transmitting said control frame via said new working path;

starting at said second node apparatus, counting a certain time period when said specific control frame is received at said second node apparatus; and determining at said second node apparatus, that said first node apparatus has stopped transmitting said control frame via said new working path, when said certain time period expires.

5. The method for processing a control frame claimed in claim 3, comprising:

transmitting a response frame responding to said control frame from said second node apparatus to said first node apparatus;

counting at said second node apparatus a waiting time period for waiting for arrival of a second specific control frame that said first node apparatus that received from said second node apparatus a response frame responding to said first specific control frame transmits to said second node apparatus when said first node apparatus stops transmitting said control frame via said new working path; and causing said second node apparatus to start monitoring whether or not said control frame has been received via said new working path and to transmit a response frame responding to said second specific control frame, when said waiting time period expires.

6. The method for processing a control frame claimed in claim 5, comprising:

determining at said first node apparatus that a failure has occurred when a response to said second specific control frame is received before receiving a response to said first specific control frame.

7. The method for processing a control frame claimed in claim 2, comprising:

including specific information in said control frame by said first node apparatus; and inhibiting said second node apparatus from generating said alarm for receiving control frame including said specific information.

8. The method for processing a control frame claimed in claim 7, comprising:

causing said second node apparatus to stop monitoring whether or not said control frame has been received via said previous working path, when said control frame with said specific information included therein is received at said second node apparatus; and determining at said first node apparatus, that said second node apparatus has stopped transmitting said control frame via said new working path, when said control frame with said specific information not included therein is received after receiving from said second node apparatus said control frame with said specific information included therein that said second node apparatus returns when said second node apparatus stops monitoring the reception of said control frame on said previous working path.

9. The method for processing a control frame claimed in claim 1, comprising determining at said first node apparatus that said second node apparatus has stopped transmitting said control frame via said new working path, when a specific control frame is received at said first node apparatus from said second node apparatus.

10. The method for processing a control frame claimed in claim 1, comprising:

counting at said first node apparatus a certain time period during the working/protection switching of said redundant paths; and determining at said first node, that said second node apparatus has stopped transmitting said control frame via said new working path, when said control frame is received via said previous working path during counting said certain time period.

11. The method for processing a control frame claimed in claim 1, comprising:

determining at said first node apparatus, that said second node apparatus has stopped transmitting said control frame via said new working path, when the path to receive said control frame from said second node apparatus has changed from said new working path to said previous working path.

12. The method for processing a control frame claimed in claim 1, comprising:

starting at said first node apparatus, counting a certain time period when a response frame is received from said second node apparatus in response to a specific control frame transmitted thereto; and determining at said first node apparatus that said second node apparatus has stopped transmitting said control frame via said new working path, when said certain time period expires.

13. A node apparatus, said node apparatus being one of two node apparatuses coupled mutually via redundant paths which include a working path and a protection path, said one node apparatus comprising:

a monitoring unit which monitors whether or not a control frame for controlling path protection switching between said redundant paths has been received via said working path, and which generates an alarm when said control frame has been received via said working path;

a monitoring stop unit which, at the time of working/protection switching of said redundant paths, causes said monitoring unit to stop monitoring whether or not said control frame has been received via a previous working path which is the path used as said working path until said switching is completed;

a transmission stop determining unit which determines whether the other of said two node apparatuses has stopped transmitting said control frame via a new working path which is the path used as said working path after said switching is completed; and a monitoring start unit which causes said monitoring unit to start monitoring whether or not said control frame has been received via said new working path, when it is determined that said other node apparatus has stopped transmitting said control frame via said new working path.

14. A processing unit provided in one of two node apparatuses coupled mutually via redundant paths which include a working path and a protection path, said processing unit comprising:

a monitoring unit which monitors whether or not a control frame for controlling path protection switching between said redundant paths has been received via said working path, and which generates an alarm when said control frame has been received via said working path;

a monitoring stop unit which, at the time of working/protection switching of said redundant paths, causes said monitoring unit to stop monitoring whether or not said control frame has been received via a previous working path which is the path used as said working path until said switching is completed;

a transmission stop determining unit which determines whether the other of said two node apparatuses has stopped transmitting said control frame via a new working path which is the path used as said working path after said switching is completed; and a monitoring start unit which causes said monitoring unit to start monitoring whether or not said control frame has been received via said new working path, when it is determined that said other node apparatus has stopped transmitting said control frame via said new working path.

* * * * *